US009369635B1

(12) United States Patent
Hilla

(10) Patent No.: US 9,369,635 B1
(45) Date of Patent: Jun. 14, 2016

(54) DIRECTOR/CAMERA COMMUNICATION SYSTEM AND METHOD FOR WIRELESS MULTI-CAMERA VIDEO PRODUCTION

(71) Applicant: Apptopus, Inc., Grand Rapids, MI (US)

(72) Inventor: Kyle Hilla, Grand Rapids, MI (US)

(73) Assignee: APPTOPUS, INC., Grand Rapids, MI (US)

( * ) Notice: Subject to any disclaimer, the term of this patent is extended or adjusted under 35 U.S.C. 154(b) by 106 days.

(21) Appl. No.: 14/475,836

(22) Filed: Sep. 3, 2014

Related U.S. Application Data

(63) Continuation of application No. 13/345,370, filed on Jan. 6, 2012.

(60) Provisional application No. 61/430,757, filed on Jan. 7, 2011.

(51) Int. Cl.
*H04N 5/265* (2006.01)
*H04N 5/232* (2006.01)

(52) U.S. Cl.
CPC ........... *H04N 5/265* (2013.01); *H04N 5/23203* (2013.01)

(58) Field of Classification Search
CPC ...... H04N 5/772; H04N 5/907; H04N 9/8045
USPC .......... 386/200–234; 348/159, 211.11, 211.4, 348/211.8, 333.01, 362; 455/41.2; 725/80
See application file for complete search history.

(56) References Cited

U.S. PATENT DOCUMENTS

| 7,787,027 | B2 * | 8/2010 | Suzuki | H04N 1/00384 348/207.99 |
| 8,373,755 | B2 * | 2/2013 | Lee | H04N 5/232 348/159 |
| 8,477,227 | B2 * | 7/2013 | Hio | H04N 5/23203 348/143 |
| 2004/0150724 | A1 * | 8/2004 | Nozaki | H04N 1/00347 348/211.4 |
| 2005/0053352 | A1 * | 3/2005 | McKain | G11B 27/034 386/241 |
| 2005/0193421 | A1 * | 9/2005 | Cragun | H04N 5/247 725/80 |
| 2006/0280496 | A1 * | 12/2006 | Tanoue | H04N 1/00129 396/287 |
| 2007/0254640 | A1 * | 11/2007 | Bliss | H04M 1/72533 455/420 |
| 2008/0044155 | A1 * | 2/2008 | Kuspa | G11B 27/034 386/278 |
| 2010/0105325 | A1 * | 4/2010 | Halla | H04S 3/00 455/41.2 |
| 2012/0157063 | A1 * | 6/2012 | Zubas | H04N 7/183 455/414.1 |
| 2012/0293680 | A1 * | 11/2012 | Guan | H04N 5/247 348/222.1 |
| 2012/0310396 | A1 * | 12/2012 | Ojanpera | H04R 1/406 700/94 |
| 2015/0009347 | A1 * | 1/2015 | O'Donnell | G08C 17/02 348/211.2 |

\* cited by examiner

*Primary Examiner* — Thai Tran
*Assistant Examiner* — Stephen Smith
(74) *Attorney, Agent, or Firm* — McGarry Bair PC

(57) ABSTRACT

A director/camera communication system for wireless multi-camera video production incorporating software to manage multiple electronic devices, including video capture devices, enable wireless communications therebetween, and provide video editing functionality.

23 Claims, 83 Drawing Sheets

DIRECTOR/CAMERA COMMUNICATION SYSTEM AND METHOD FOR WIRELESS MULTI-CAMERA VIDEO PRODUCTION

CROSS-REFERENCE TO RELATED APPLICATION

This application is a continuation of U.S. patent application Ser. No. 13/345,370, filed Jan. 6, 2012, which claims the benefit of U.S. Provisional Patent Application No. 61/430,757, filed Jan. 7, 2011, both of which are incorporated herein by reference in their entirety.

BACKGROUND

Recorded video streams, such as children's sports, music videos, cinematic movies, journalistic reports, interviews, vlogs (video blogs) or any other known video stream, are typically captured with digital video recording equipment, such as a digital video camera or a digital still camera with video capture capability, so that the resulting video can be viewed at a later time, shared with family and friends through e-mail or posted via the internet to a personal or business website, Facebook®, You Tube®, other social media, or the like.

The simplest method for producing a video recording is for a user to capture video footage by either continuously shooting video without stopping until the event is finished or for the camera operator to perform what is called in camera editing. In camera editing refers to starting and stopping recording to simulate a video edited in post-production. The advantage to this method is when the video recording is complete, the editing, if any, is complete and the user has a finished video. The disadvantage to this method is that the simplicity of the video production can result in an amateurish or extremely boring video editing job and the editing process can be slow and cumbersome, involving starting and stopping recording continuously so that the camera operator can reposition himself for a new shot or angle, adding to the possibility of missing a potentially great shot.

Another method for producing a video recording is for multiple camera operators to capture video footage without stopping until finished and subsequently producing the final video after the video shooting is complete. The advantages to this method are the opportunity for an interesting variation of shots with multiple camera angles captured and the potential for missing a great shot is lessened because the camera operators do not have to stop recording. A major disadvantage to this method is that it can quickly become an expensive and time consuming endeavor with a substantial investment in equipment and the time required to edit the video in post-production.

When there are multiple camera operators capturing video footage during an event for post-production editing, there is a critical need to communicate and direct a unified vision during the video production. Often times the requisite communications may be conducted by yelling across a video shooting set or by communicating over electronic communications devices such as external headsets. Such types of communications can be disruptive to the camera operators, the footage being captured and the director.

Current conventional schemes address the time consuming nature of post-production editing by facilitating a system for multi-camera production using multiple digital video cameras with wired connections to a computer. These schemes are geared toward professional level users with education and experience in the field and a substantial investment in high-end equipment, such as a computer, multiple digital video cameras, cables to connect the cameras to the computer, additional video capture cards to handle multiple camera inputs, software to manage the incoming video feeds from the cameras to the computer, and some type of headset communication system to handle direction to the camera operators.

BRIEF SUMMARY

In one embodiment, the invention comprises a wireless video recording system comprising at least one field mobile communications device having a video camera recording function, a director mobile communications device, a communication link established between the director mobile communications device and each of the at least one field mobile communications device capable of streaming video from each of the at least one field mobile communications device to the director mobile communications device, and a data store accessible by the director mobile communications device and the at least one field mobile communications device over the communication link. The director mobile communications device has a selector interface configured to display real time video as viewed by the at least one field mobile communications device and to select at least one of the field mobile communications device as an active feed for storage to the data store, and can be configured to transmit at least one operational command to a selected one of the at least one field mobile communications device. Video recorded by at least one of the field mobile communications device and the director mobile communications device can be stored on the data store.

According to another embodiment, the at least one operational command comprises a command issued by the director mobile communications device to a selected at least one field mobile communications device which causes the selected at least one field mobile communications device to perform an action selected from the group consisting of: initiating recording, stopping recording, turning on a light on the selected field mobile communications device, turning off a light on the selected field mobile communications device, and initiating transfer of video from the at least one field mobile device to the data store or the director mobile communications device. The selected at least one field mobile communications device can comprise one of a single field mobile communications device and all of the field mobile communications devices having the communication link established with the director mobile communications device.

According to another embodiment, the wireless video recording system comprises at least a first field mobile communications device and a second field mobile communications device and the director mobile communications device is configured to switch recording video between the first field mobile communications device and the second field mobile communications device in real time.

According to yet another embodiment, the director mobile communications device is configured to discover and receive broadcast of a live video feed connection with at least one field mobile communications device over a communications network.

According to another embodiment, the director mobile communications device is configured to transmit at least one operation instruction to a selected one of the at least one field mobile communications device. The at least one operational instruction comprises an instruction issued by the director mobile communications device to a selected at least one field mobile communications device to direct a user operating the camera of the selected field mobile communications device to operate the camera of the selected field mobile communications device in a manner selected from the group consisting of: initiating recording, stopping recording, turning on a light on the selected field mobile communications device, turning off a light on the selected field mobile communications device, zooming the camera of the selected field mobile communications device, panning on the camera of the selected field mobile communications device, moving the camera of the selected field mobile communications device in a particular direction, or directing the camera of the selected field mobile communications device in a particular direction. The instruction can be issued in the form of at least one of an icon, a text message or a combination thereof visible on the selected at least one field mobile communications device. The instruction can be in the form of an oral instruction audibly perceptible by a user of the selected at least one field mobile communications device through the selected at least one field mobile communications device. At least one earphone can be coupled with the selected at least one field mobile communications device, and the oral instruction can be audible through the at least one earphone. The selected at least one field mobile communications device can comprise one of a single field mobile communications device, multiple field communication devices or all of the field mobile communications devices having the communication link established with the director mobile communications device.

According to another embodiment, a user of the director mobile communications device can transfer director capabilities to a selected one of the at least one field mobile communications device, whereby the current director mobile communications device becomes one of the at least one field mobile communications devices and the selected one of the at least one field mobile communications device becomes the director mobile communications device.

According to yet another embodiment, selector interface displays a video feed from the at least one field mobile communications devices and includes a selector for permitting a user of the director mobile communications device to indicate an active video feed selected from the at least one field mobile communications devices from which to record video. Further, a selector can permit a user of the director mobile communications device to indicate a video feed selected from the at least one field mobile communications devices to place on standby. Further, each of the at least one field mobile communications device records its video to the data store regardless of whether any portion of its video was indicated by the director mobile communications device as the active video feed at any time.

According to still another embodiment, the wireless video recording system further comprises an edit decision list comprising a list of video feed selections by the director during a recording session. The wireless video camera recording system can comprise at least a first field mobile communications device and a second field mobile communications device which are recording video simultaneously, and the director mobile communications device can be configured to create an edit decision list of the recorded video from the at least first and second field mobile communications devices in real time. The edit decision list can comprise data representative of (1) an active camera feed at a given time; and (2) at least one of a duration or an end time of the active camera feed. The director mobile communications device includes an interface having a first timeline corresponding to an active video feed and a second timeline corresponding to an active audio feed, and wherein a user of the director mobile communications device can select video from the first timeline from each of the at least one field mobile communications devices and audio from the second timeline from each of the at least one field mobile communications devices. The user of the director mobile communications device can at least one of compress, extend, cut, insert, or replace portions of the selected video and audio in the first and second timelines to edit the final video product.

According to another embodiment of the invention, the data store records video feeds from the active video feed from the at least one director mobile communications device and the at least one field mobile communications device. The data store can record video from each of the at least one field mobile communications device. The data store can be on at least one of the director mobile communications device, at least one field mobile communications device or a combination of the director mobile communications device and at least one of the at least one field mobile communications device. The data store can be a network attached storage device for receiving video feeds from at least one of the director mobile communications device or the at least one field mobile communications device.

According to another embodiment, the director mobile communications device comprises at least one of a smart phone, MP3 player device, or tablet. The at least one field mobile communications device comprises at least one of a smart phone, MP3 player device, or tablet.

According to another embodiment, the communication link can be at least one of a cellular network, a wireless network, 3G, 4G, WiMax, LTE or a Wi-Fi network.

DETAILED DESCRIPTION

In one embodiment, the invention relates to facilitating wireless multi-camera video production and communication between devices and between users. The Director/Camera Communication System for Wireless Multi-Camera Video Production has been created as an application which is easy to use software for mobile communication devices with digital video cameras and wireless networking capability. These devices could be smart phones such as iPhones®, Android® phones, Blackberrys®, or MP3 player devices such as iPod Touches® or tablet devices such as iPads® or Android® tablets, or a computer could be used as a director device. Throughout this document the term video includes both audio and data.

With the application a person can chose to be the director or a camera operator in a wireless multi-camera video production. The director can view streaming video and record video clips from multiple cameras in real time during a wireless multi-camera video production. The director can also communicate with the camera operators during the video production with camera move or angle requests, text messages or vocally. After the video production is concluded and saved the director has a single finished video, with automatically generated credits for all users involved in the multi-camera video production, ready for viewing within the application, or exporting to share through e-mail, post to the internet, etc. The director can easily resume a saved production at a later time.

The director/camera communication system for wireless multi-camera video production described herein is meant to act as a compact, convenient and integrated solution that takes advantage of existing mobile devices to create a simple and usable multi-camera video recording and communication system. Mobile devices are typically equipped with a variety of hardware features, including digital video recording and wireless network access. The invention provides an innovative bridge between these features, linking the video recording system and the wireless network communication hardware present in these devices over a wireless, wired, or hybrid network. Wireless network specifications such as Bluetooth®, Wi-Fi, 3G, 4G, WiMax, LTE, or other existing or future specification may be utilized to enable the bridge between devices. This bridge facilitates ad-hoc communication for a user of a device ("Director") to record video, audio and device dependent data streams from several other user's devices ("Cameras") with the goal being, to collate and combine the data from the camera devices into one continuous output composition (which is often a video). If a device is equipped with wireless networking but not a camera for video recording, the device can still be used for director functionality, which does not necessarily need a camera, although it is also within the scope of the invention to utilize the Director device also as a Camera device during a session.

Figure 1:
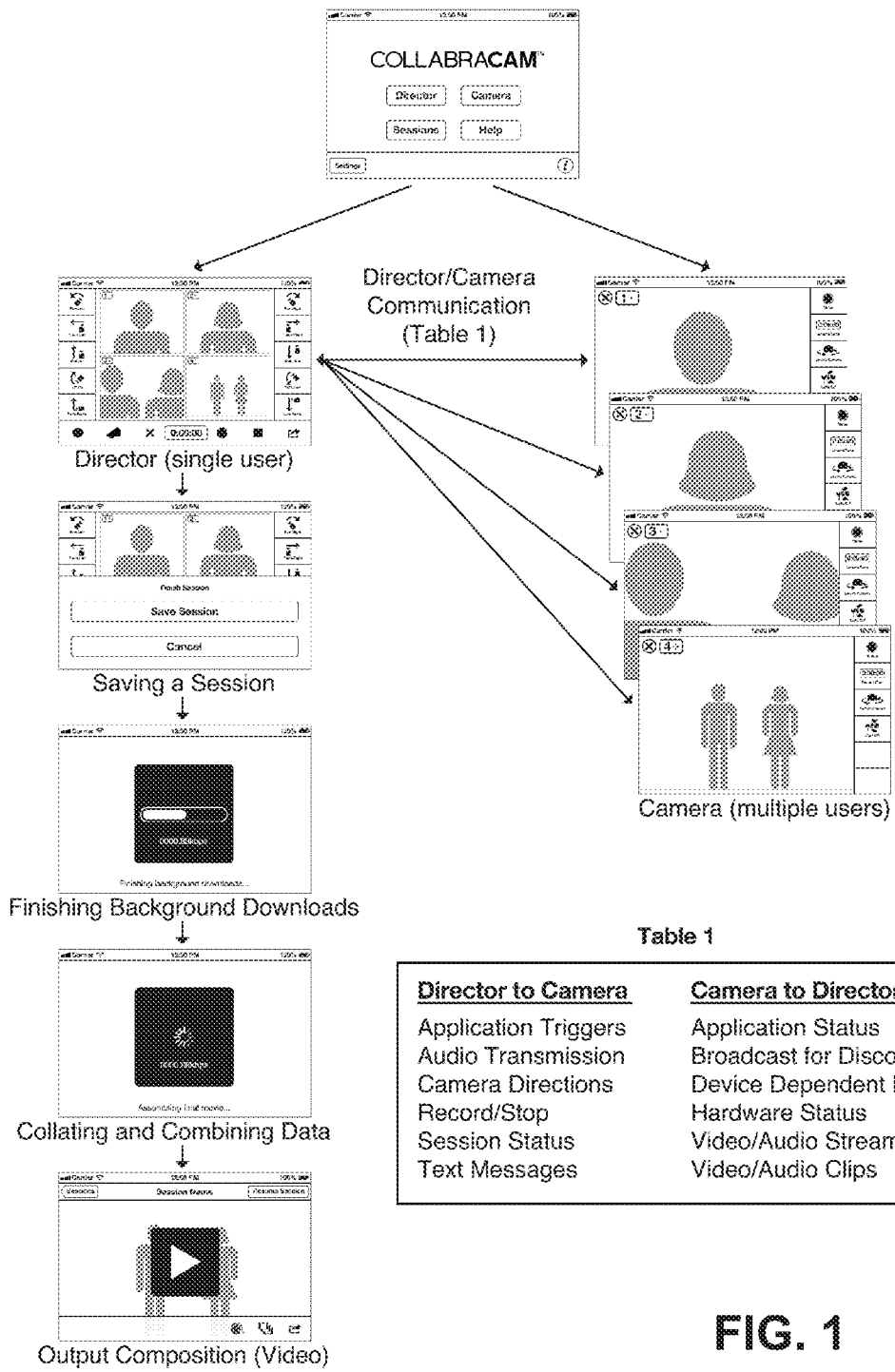
FIG. 1 is a schematic depiction of Director device and a Camera device communication link according to one embodiment of the present invention.

The invention described herein is software which may (A) perform as a Camera unit or device by broadcasting device data to a Director unit or device, (B) perform as a Director unit by receiving device data from Camera units, or (C) perform both features, as depicted in FIG. 1. Camera units perform their function by recording video, audio and device dependent data to be streamed to a receiving Director unit, and display or transmit communication from the same Director unit. In this manner, the Camera units can be considered field mobile communication devices in that the Camera units can record data remotely from the Director device. These communications may include chat messages, instructional text, application specific messages such as graphical icons that instruct a Camera unit's user to perform some further action, or vocal direction through the microphone of the Director's unit (or earphones with microphone) to the Camera unit's user through the Camera unit user's earphones.

In one example, the Director unit is able to instruct Camera units when to enable and disable its recording function, which causes a Camera unit to save some segment of recorded device data to be transmitted to the Director unit. This transmitted segment will be used by the Director to later compile a finished movie composed of recorded video and audio data segments saved by multiple separately connected cameras.

Alternatively, a Director unit can instruct all of the connected Camera units to record video for the entire duration of a multi-camera video capture session and while the Director unit acts as if it is "editing" from the cameras, the Director unit is actually creating an Edit Decision List with in and out points for the video from specific cameras at a given time when a Camera device is the live camera to non-destructively compile a fully edited video from the intact raw footage received from all of the Camera units after the session is saved. In this manner the raw footage can be later modified and re-edited from the existing edit points created in the Edit Decision List.

Director units may discover Camera units by using network auto-discovery mechanisms such as Bonjour for TCP/IP networks or any other suitable discovery protocol or they may explicitly locate Camera units through direct input of a Camera unit's details. Camera units may broadcast their availability and selectively allow/disallow the transmission of data to Director units based on user specific criteria. Conversely, it is also within the scope of the invention for Director units to broadcast availability for Camera units seeking to join a session.

The connected Camera units can stream live video and audio data to the responsible Director unit, providing the user controlling the Director unit with a first-person view of the subjects of the camera units' focus of study. The connected cameras may also send state information to the Director unit, advising the Director unit of local changes to the Camera unit's status, e.g., recording/standby status, light on/off, etc.

A Director unit can instruct Camera units using GDCAsyncSocket, a TCP library, with a custom proprietary client/server protocol, of when to record device data segments to be later collated and combined into a finished composition. These compositions may include audio and video data, device dependent metadata (such as geo-location for example), or some combination of both. A Director unit may also communicate certain messages to Camera units, providing instructional prompts, messages, and application triggers (application functionality whose initialization occurs upon reception of such messages) based on the current state of the Director unit. A Director unit is also responsible for the creation of a final data composition; this composition represents the captured video, audio and device dependent data from each of the Camera units that the Director unit has communicated with throughout the period that the Director unit was being executed on a mobile device.

A Director unit can also transmit instructions from the Director unit user to camera units using GDCAsyncSocket, a TCP library, with a custom built client/server protocol for Camera unit users to respond to by performing the instruction given in the communication. The instructions may be in the form of icons, text messages or vocal instruction which can be sent to one selected Camera unit, multiple selected Camera units or all Camera units. The Director unit can also receive acknowledgement that the instruction was received by the specified Camera units.

The transmission of the device data from Camera units to Director units may take several forms; Camera units may broadcast device data in real time to Director units using well known encoding and compression algorithms such as H264, GZip or any other suitable data stream compressor, or it may be sent after a Director unit has indicated that a given segment of data is finished being recorded. Live video streams may be sent over the local network via UDP, using the open source library liveMedia to accommodate RTSP video transmittal or possibly use any other suitable resource library. A Director unit can also stream a live edited video feed to be broadcast live to the internet or an Apple TV for display on an HDTV or monitor by use of HTTP Live Streaming protocol. Completed movie streams may be broadcast from device to device through the open source HTTP server Mongoose, which provides the lossless network transmission necessary for final session collation and export or any other possible method of transmission which will provide similar lossless quality. This data is requested by the Director unit and streamed to the Director unit's local data storage device to be later operated upon.

The Director unit has access to all "sessions" (files that represent a collection of data received from Camera units) that were created via the mobile device; these sessions represent all saved sessions created by the application's user. These sessions may be individually reviewed, allowing the application user to play back the content of a given session. These sessions may be exported to an external location, whether it is a mobile device's media library, e-mail account, file system, a cloud storage system, or any other possible location. These sessions may also be deleted, copied or transferred to another user awaiting the session transfer over a wireless, wired, or hybrid network.

Figure 2:
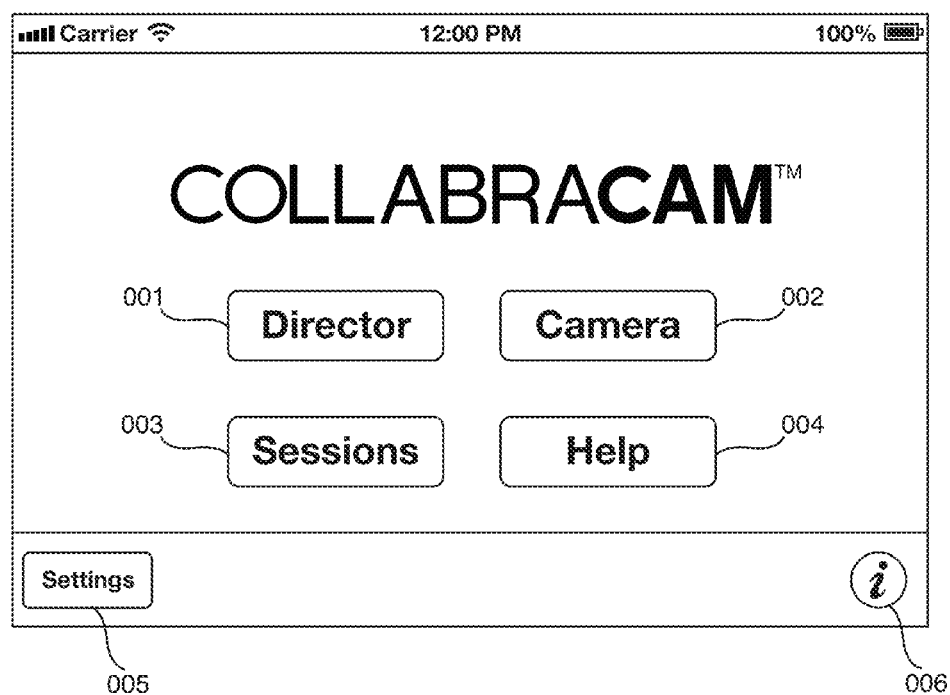
FIG. 2 illustrates a Home user interface (UI) according to an embodiment of the invention.

When users start a multi-camera video capture session with wireless touchscreen enabled devices, a user begins by tapping on the application icon in the main device User Interface (User Interface will be referred to as UI.) A splash screen is displayed to a user while the application loads and a Home UI 320, as depicted in FIG. 2, is displayed to a user. The Home UI 320 contains four main buttons, the Director button 001, Camera button 002, Sessions button 003 and Help button 004. The Home UI 320 also includes two secondary buttons located in the tool bar, the Settings button 005 and the Information button 006.

Figure 2A:
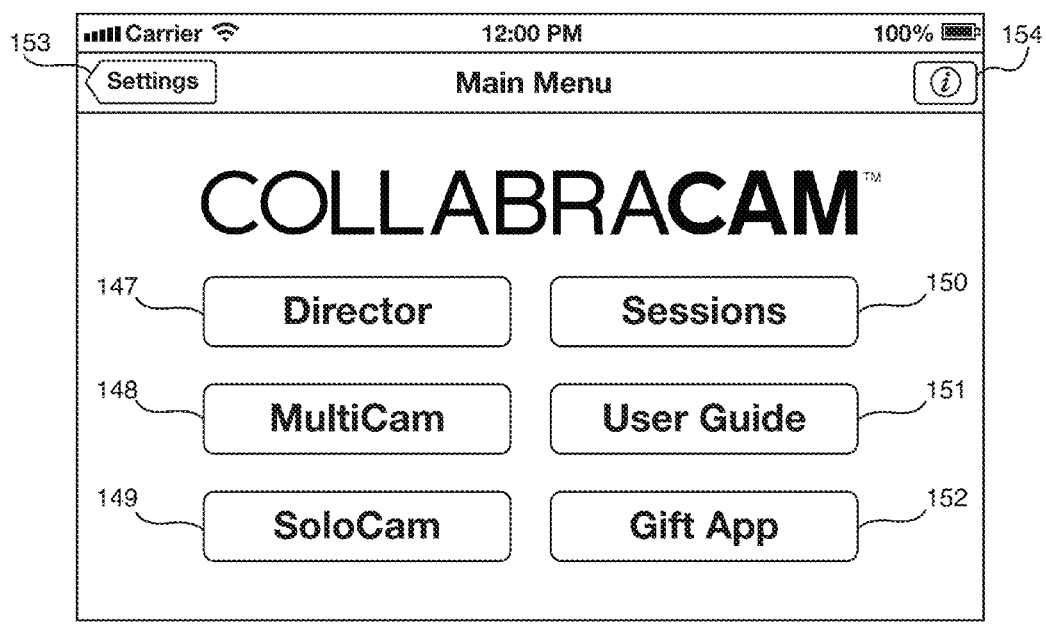
FIG. 2A illustrates an alternative Home UI according to an embodiment of the invention.

FIG. 2A illustrates another example of a Home UI 322 that is displayed to a user upon selection of the application icon. The Home UI 322 includes six main buttons, the Director button 147, MultiCam button 148, SoloCam button 149, Sessions button 150, User Guide button 151 and Gift App button 152. The Home UI 322 also includes two secondary buttons, the Settings button 153 and the Information button 154.

When a user taps the Director button 147, the Production Settings UI is displayed to the user. When a user taps the MultiCam button 148, a MultiCam UI is displayed to the user. When a user taps the SoloCam button 149, a Production Settings UI is displayed to the user. When a user taps the Sessions button 150, the Sessions UI is displayed to the user. When a user taps the User Guide button 151, the User Guide UI (Help UI) is displayed to the user. When a user taps the Gift App button 152, the application is exited and the App Store app is opened to the listing for the application where the user can gift the app to another user. When a user taps the Settings button 153, a Settings UI is displayed to the user. When a user taps the Information button 154, an Information UI is displayed to the user.

Figure 3:
FIG. 3 illustrates an Information UI or the About UI according to an embodiment of the invention.

When a user taps an Information button, either the Information button 006 of FIG. 2 or the Information button 154 of FIG. 2A, in the Home UI 320 or 322, respectively, an About UI 324, as depicted in FIG. 3, can be displayed to the user. The About UI 324 contains information about the application such as copyright, URLs, etc. There is a Navigation bar at the top of the screen which contains a Main Menu button 007. If a user taps the Main Menu button 007, the About UI 324 is exited and the Home UI 320 or 322 is displayed to the user. If a user taps a link 008, the application is exited and the link URL is opened in the internet browser of the device. A user must then exit the newly opened application and restart the application. If a user restarts the application after exiting from tapping a link, the application will restart back to the display of the About UI 324. A user must tap the Main Menu button 007 to exit the About UI 324 and return to the Home UI 320 or 322. While the Main Menu button 007 is illustrated as including the text "Main Menu," it is within the scope of the invention for the button 007 to include the text "Back" or include no text at all.

Figure 3A:
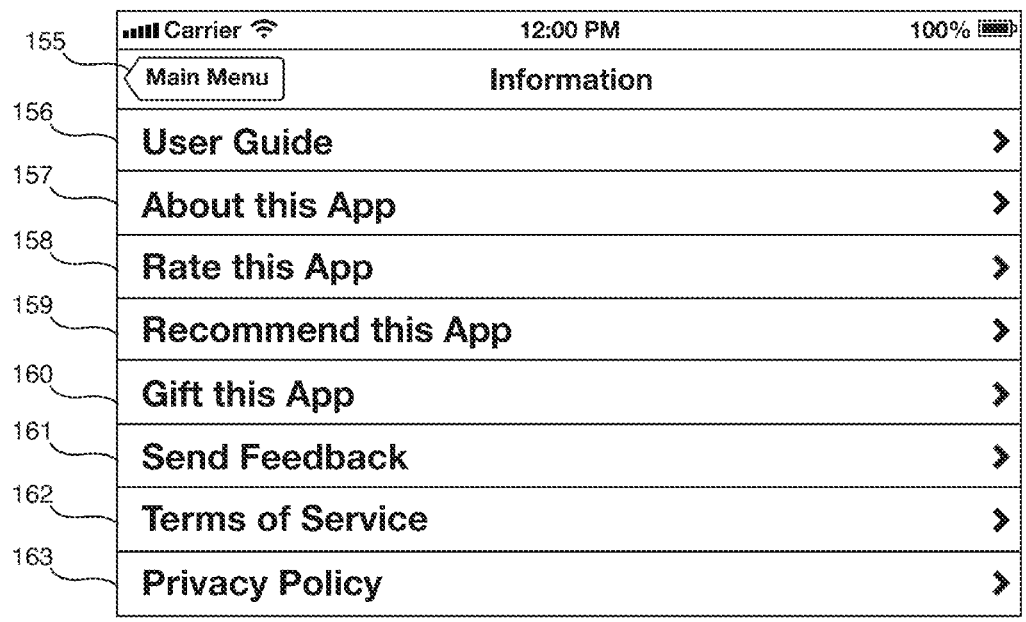
FIG. 3A illustrates an alternative Information UI according to an embodiment of the invention.

FIG. 3A illustrates an alternative Information UI 326 that can be displayed to a user upon selection of the Information button 006 of FIG. 2 or the Information button 154 of FIG. 2A. Similar to the About UI 324 of FIG. 3, the Information UI 326 of FIG. 3A includes a Main Menu button 155 that exits the Information UI 326 and returns to the Home UI 320 or 322. The Information UI 326 includes a plurality of table cells that when tapped may go one level deeper, perform a function and return to the Information UI 326 or may exit the application.

When a user taps the User Guide table cell 156, the User Guide UI is displayed to a user. When a user taps an About this App table cell 157, the Information UI 326 goes one level deeper to display version of the application, acknowledgements, company information, etc. When a user taps a Back button (not shown), which is typically labeled with the name of the UI the user would be returning to, the user exits that level and the Information UI 326 is displayed to the user. When a user taps a Rate this App table cell 158, the application is exited and the App Store application is opened to the listing for the application (not shown) where the user can write a review of the application. When a user taps a Recommend this App table cell 159, the application opens the device email program within the app, with a prewritten email which can be edited or added to by the user (not shown). After a user types in a recipient's email address and taps send, the Information UI 326 is again displayed to the user. When a user taps a Gift App table cell 160, the application is exited and the App Store app is opened to the listing for the application (not shown) where the user can gift the app to another user. When a user taps a Send Feedback table cell 161, the application is exited and the device web browser is opened to a feedback form for the application provided on an appropriate website (not shown). When a user taps a Terms of Service table cell 162, the application is exited and the device web browser is opened to the Terms of Service provided on an appropriate website (not shown). When a user taps the Privacy Policy table cell 163, the application is exited and the device web browser is opened to the Privacy Policy provided on an appropriate website (not shown). A user must tap the Main Menu button 155 to exit the Information UI 326 and return to the Home UI 320 or 322.

Figure 4:
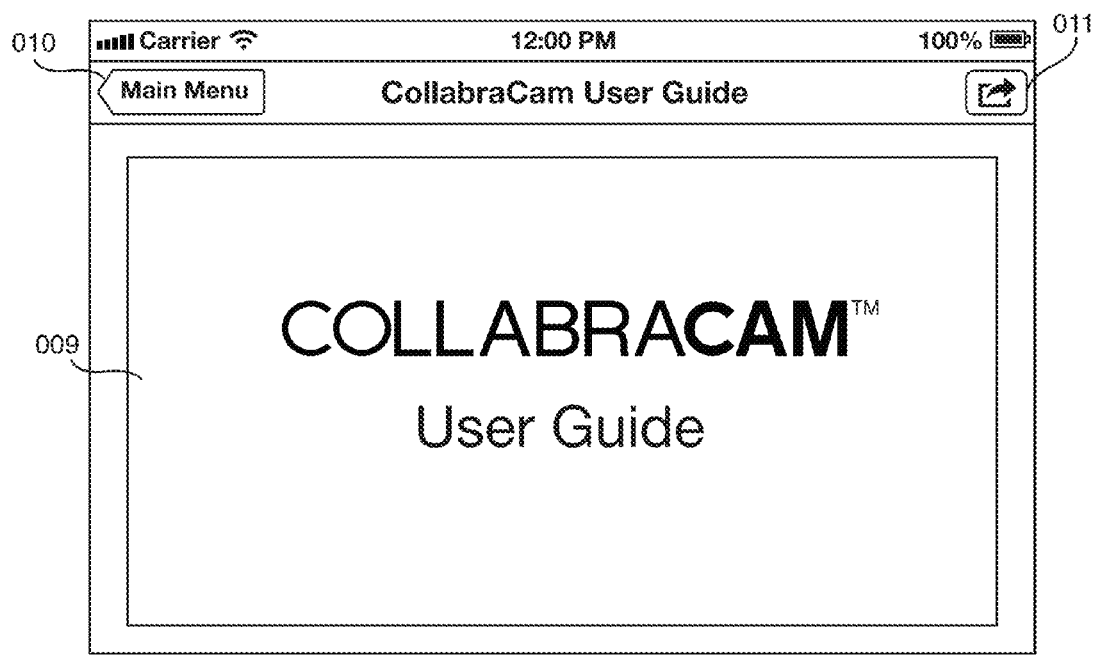
FIG. 4 illustrates a Help UI or the User Guide UI according to an embodiment of the invention.
Figure 5:
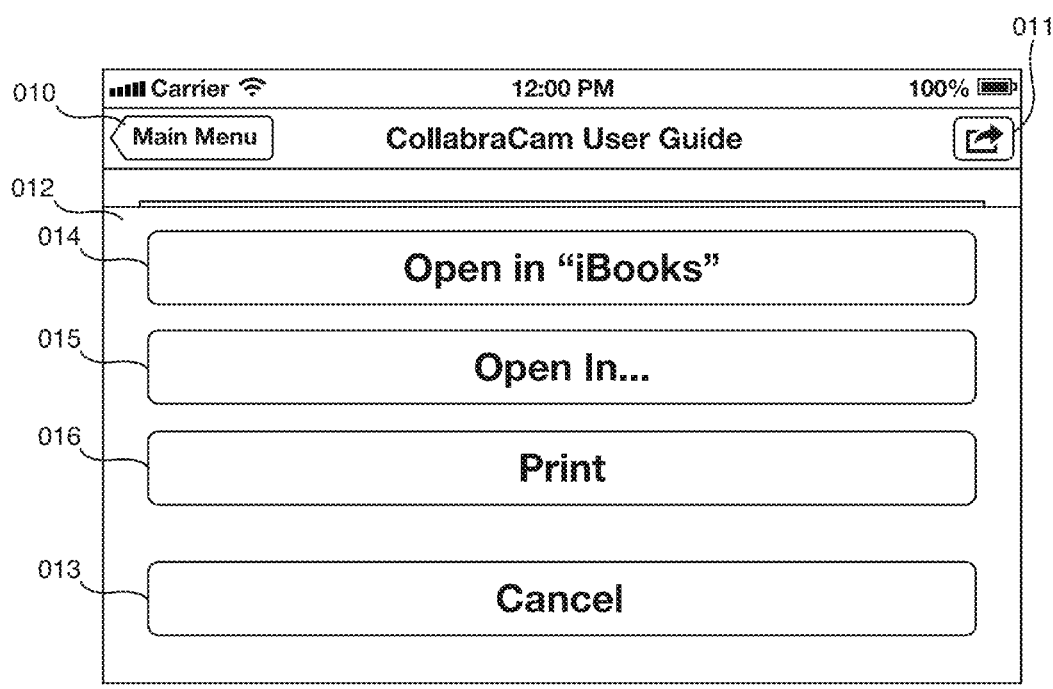
FIG. 5 illustrates the Help UI or the User Guide UI with an Action Sheet for opening a Help PDF in a default or 3rd party application, or for printing the Help PDF.

Referring back to FIG. 2, when a user taps the Help button 004 in the Home UI 320, or in FIG. 2A when a user taps the User Guide button 151 in the Home UI 322, a Help UI 328, as depicted in FIG. 4, is displayed to the user. The Help UI 328 contains a User Guide document 009, such as a PDF, to view within the application with information on how to use the application. There is a Navigation bar at the top of the screen which contains a Main Menu button 010 and an Action button 011. If a user taps the Main Menu button 010, the Help UI 328 is exited and the Home UI 320 or 322 is displayed to a user. If a user taps the Action button 011, an Action Sheet 012 is overlaid on the Help UI 328, as depicted in FIG. 5. An Action Sheet is an overlay on the current UI, with or without a label, with two or more labeled button choices, one of which is always a Cancel button; tapping the Cancel button always dismisses the Action Sheet from the screen. The Action Sheet 012 contains four default device UI created button options: a Cancel button 013, a button 014 to open the PDF in a default device application, such as iBooks, for example, a button 015 to open the PDF in a third party application and a button 016 to wirelessly print the PDF document.

If a user taps the Cancel button 013, the Action Sheet 012 is dismissed from the screen. If a user taps one of the default device UI created button options to open the PDF in a default device application or a third party application, the application is exited and the PDF document is opened in a default device application or third party application. A user must exit the newly opened application and restart the application to continue. If a user restarts the application after exiting from the Help UI 328, the application will restart back to the display of the Help UI 328. If a user taps the default device UI created button option to print the PDF, the default device Print Dialogue UI is displayed to a user with printing options. In the Print Dialogue UI there is a Navigation bar at the top of the screen which contains a Cancel button. If a user taps the Cancel button, the default device Print Dialogue UI is exited and the Help UI 328 is displayed to a user. A user has multiple printing options and can choose to print or cancel without printing, without exiting the application. If a user prints the PDF, the document is wirelessly sent to the printer, the default device Print Dialogue UI is exited and the Help UI 328 is displayed to a user. A user must tap the Main Menu 010 button to exit the Help UI 328 and return to either the Home UI 320 or 322.

Figure 6:
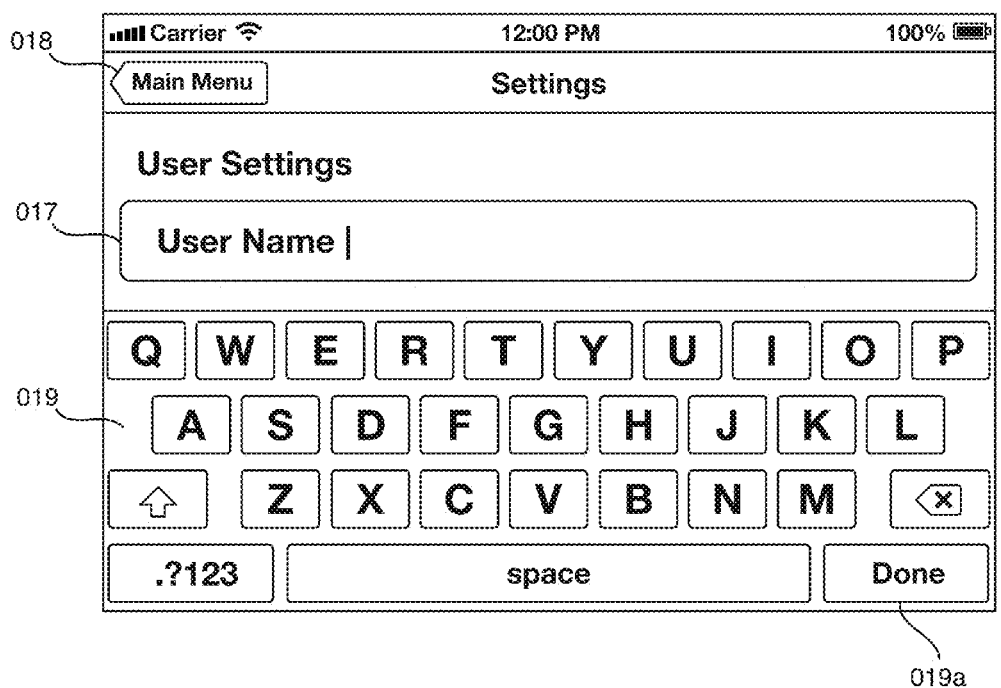
FIG. 6 depicts a Settings UI according to an embodiment of the invention.—Redesigned with more options in FIG. 6A, 6B, 6C FIGS. 6A-C illustrate an alternative Settings UI according to an embodiment of the invention.

Referring again to FIG. 2, when a user taps the Settings button 005 in the Home UI 320 or the Settings button 153 in the Home UI 322 as depicted in FIG. 2A, the Settings UI 330, as depicted in FIG. 6, can be displayed to a user. The Settings UI 330 has a single text entry field for a user name 017. There is a Navigation bar at the top of the screen which contains a Main Menu button 018. If a user taps the Main Menu button 018, the Settings UI 330 is exited and the Home UI 320 or 322 is displayed to the user. If a user taps on the User Name text field 017, a cursor appears in the text field and a keyboard 019 is overlaid on the screen to facilitate text entry.

Text input by a user in the User Name text field 017 is used in the Director UI for connection purposes and in the credits for a director and for camera operators. If a user does not enter a user name into the User Name text field 017, the default device name will be displayed in the Director UI and in the credits. If a user enters a user name and taps the Done button 019a on the keyboard 019, the keyboard 019 is dismissed from the screen and the user name is saved. The Settings UI 330 can always be revisited if a user wants to change or edit the user name. A user must tap the Main Menu button 018 to exit the Settings UI 330 and return to the Home UI 320 or 322.

Figure 6A:
Figure 6B:
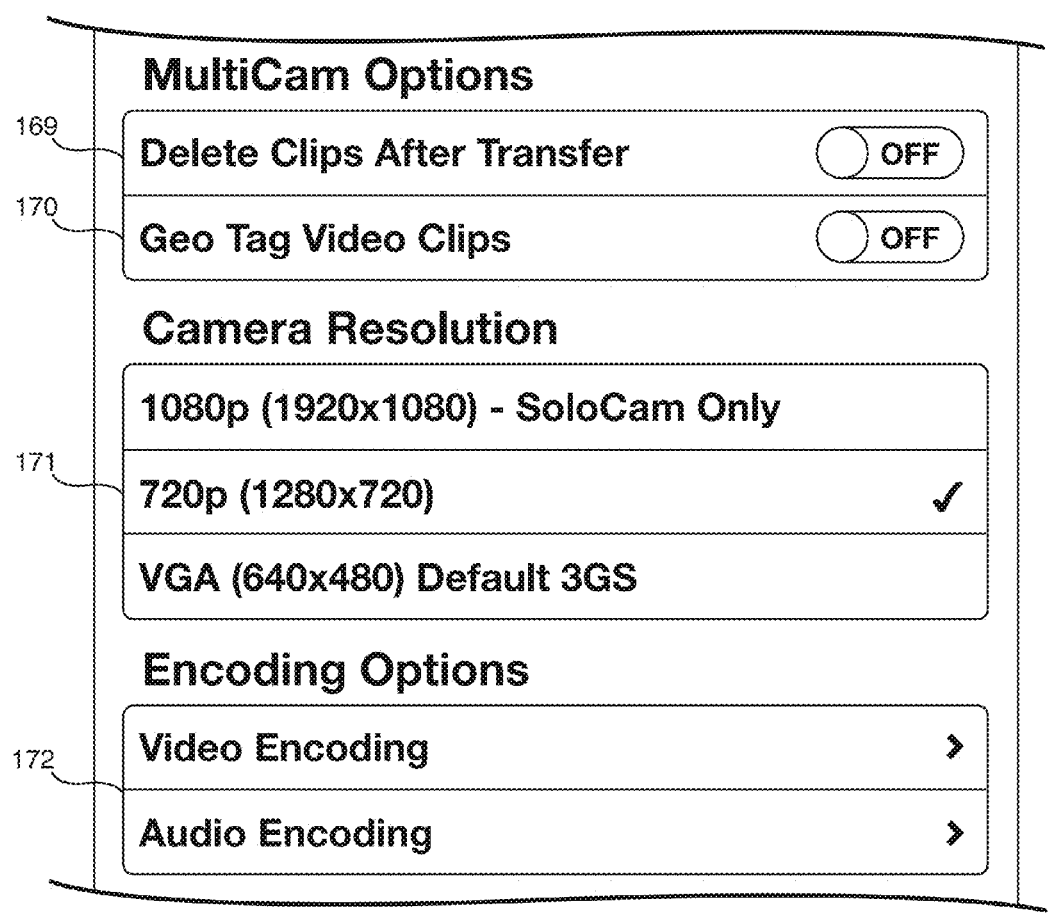
Figure 6C:
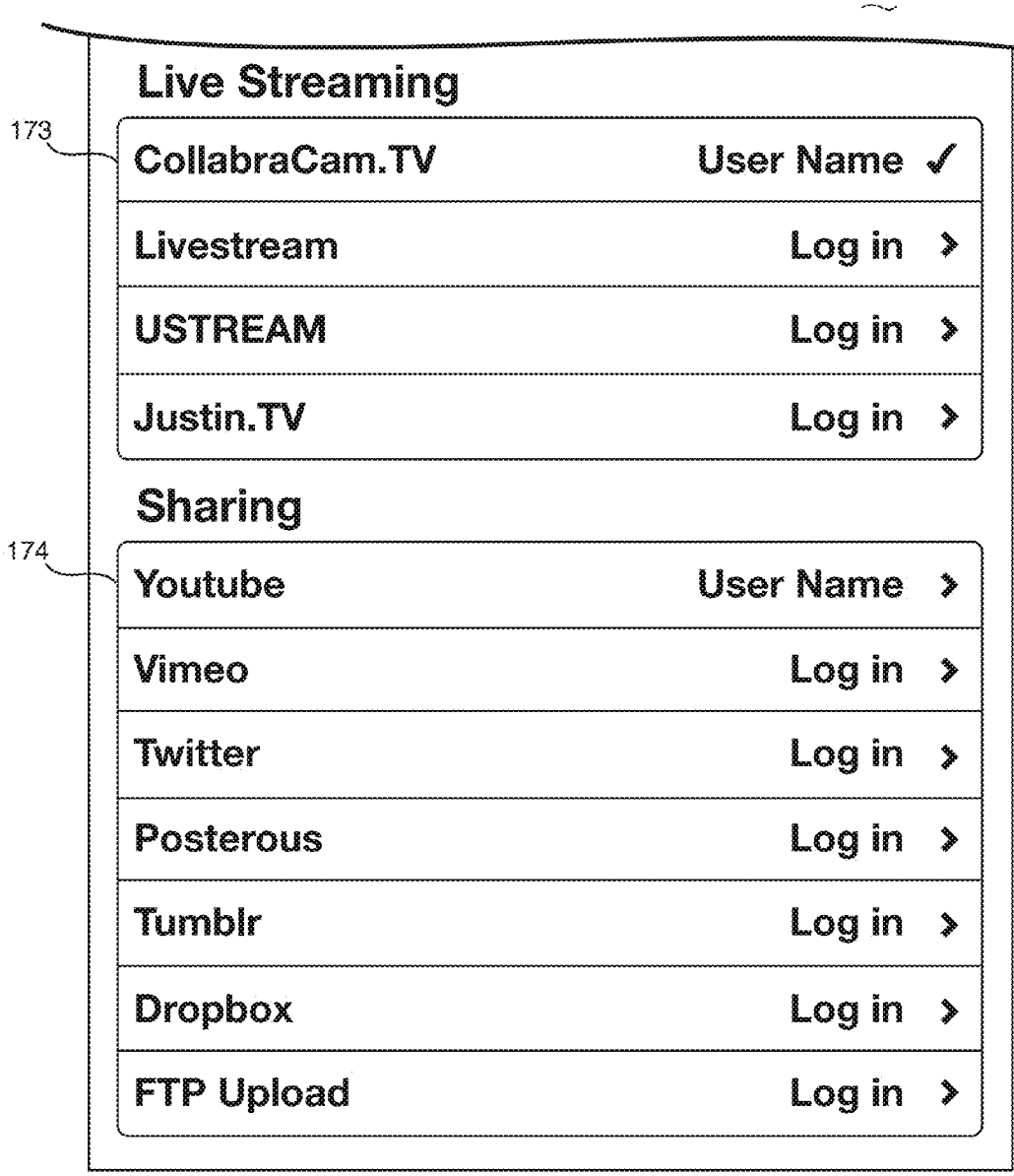

FIGS. 6A-C illustrate an alternative Settings UI 332, which is similar to the Settings UI 330 of FIG. 6, except the Settings UI 332 includes many additional options. Similar to the Settings UI 330, the user can return to the Home UI 320 or 322 using the Main Menu button 164. The user can enter his/her name for connection purposes in the Settings UI 332 and for use in an automatically generated credits video clip which is added to every session in the User Name text field 165. When a user taps in the User Name text field a keyboard is displayed overlaid on the screen (not shown) and the user can enter his/her name for display in the credits clips in a manner similar to that described above with respect to the Settings UI 330 of FIG. 6. When a user taps the "x" button in the text field the text field will be cleared. When a user taps the Done button on the keyboard the keyboard is dismissed from the screen. If a user does not fill in this field the device name in the device's Settings app will be used in the credits.

Referring to FIG. 6A, in the Director/SoloCam Options, the user can choose to set the default copyright of a video to ©User Name, the name input into the User Name text field 165, by turning the Copyright Defaults to User Name option 166 to ON using the tap and slide toggle switch. The default for this option is set to OFF. If a user has this option turned on and the user has not entered copyright information in the Production Settings UI 336, the copyright will display @User Name, as will be discussed in greater detail below. The user can choose to geo tag the edited video with geo-location information of where the video was shot by turning the Geo Tag Video option 167 ON using the tap and slide toggle switch; the default for this option is set to OFF.

Still referring to FIG. 6A, the user can choose whether video is transferred to the Director unit from the Camera unit after a session or during a session in the Director Video Transfer table 168. When a user selects the After Session table cell, the video is transferred from the Camera unit after the session is saved. When a user selects the During Session table cell, the video is transferred from the Camera unit in the background during the session. If a user selects During Session for this option, but the user later selects All Cameras Capture Video in the Production Settings UI 336, as will be discussed below with respect to FIG. 7A, that setting will override transferring video during the session and videos will be transferred after the session. When a user taps one of the table cells the tapped table cell is highlighted with a checkmark to denote that the option is selected.

Referring now to FIG. 6B, under MultiCam Options, the user can choose to have video deleted from the Camera unit after successful transfer of video from the Camera unit to the Director unit to save space on the Camera unit and eliminate the need to manually delete the video by turning a Delete Clips After Transfer option 169 ON; the default for this option is set to OFF. The user can choose to geo tag the recorded video on the Camera unit with the geo-location information of where the video was shot by turning the Geo Tag Video Clips option 170 ON; the default for this option is set to OFF. If a camera operator has the Geo Tag Video Clips option 170 set to ON in the MultiCam Options, then the geo-location information is deleted from the videos after they are received by the Director unit from the Camera units if the Director unit has the Geo Tag Video option FIG. 6A 167 OFF.

Still referring to FIG. 6B, the user can select the resolution for recording video using the Camera Resolution table 171. When a user sets the option on the Director unit, the device tells the Camera units the resolution at which to record video. When a user sets this option and is a SoloCam user, it sets the resolution at which the device records video. When a user of a Camera unit sets this option and is a MultiCam user, the setting is overridden by the setting on the Director's unit. When a user taps one of the table cells the tapped table cell is highlighted with a checkmark to denote that that option is selected. The user can choose more advanced video or audio encoding options using the Encoding Options table 172. When the user taps one of the table cells the screen goes to a deeper Settings UI level with advanced encoding options (not shown). When the user taps the Back button in the deeper Settings UI level, the application returns to the top level Settings UI 332 with the focus still at the Encoding Options table 172.

Referring now to FIG. 6C, the user can input logins and passwords for live streaming services and select a live streaming service for broadcasting a live stream of the edited feed to the internet in the Live Streaming table 173. When a user taps Log in in one of the table cells for one of the services, the screen goes to a deeper UI level where the user can enter log in and password information for the user's account with that live streaming service (not shown). When a user taps the Back button in the deeper Settings UI level, the application returns to the top level Settings UI 332 with the focus still at the Live Streaming options table 173. When a user taps the service name after entering login and password information the field is highlighted with a checkmark as the desired service for live streaming broadcast to the internet if a user chooses a live streaming option in the Production Settings UI 336 of FIG. 7A, which will be discussed below.

The user can input logins and passwords for video, social media and blogging services to upload the final edited video to any of those services through the Sharing options table 174. When a user taps Log in for one of the services, the screen goes to a deeper UI level where the user can enter log in and password information for the account to that service (not shown). When a user taps the Back button in the deeper Settings UI level, the application returns to the top level Settings UI 332, with the focus still at the Sharing options table 174. If a user has entered login and password information for a service, the user can then share a video and post to that service in the Individual Session UI of the video the user wants to share (see FIG. 27A, discussed below). A user must tap the Main Menu button 164 to exit the Settings UI 332 and return to the Home UI 320 or 322.

Figure 7:
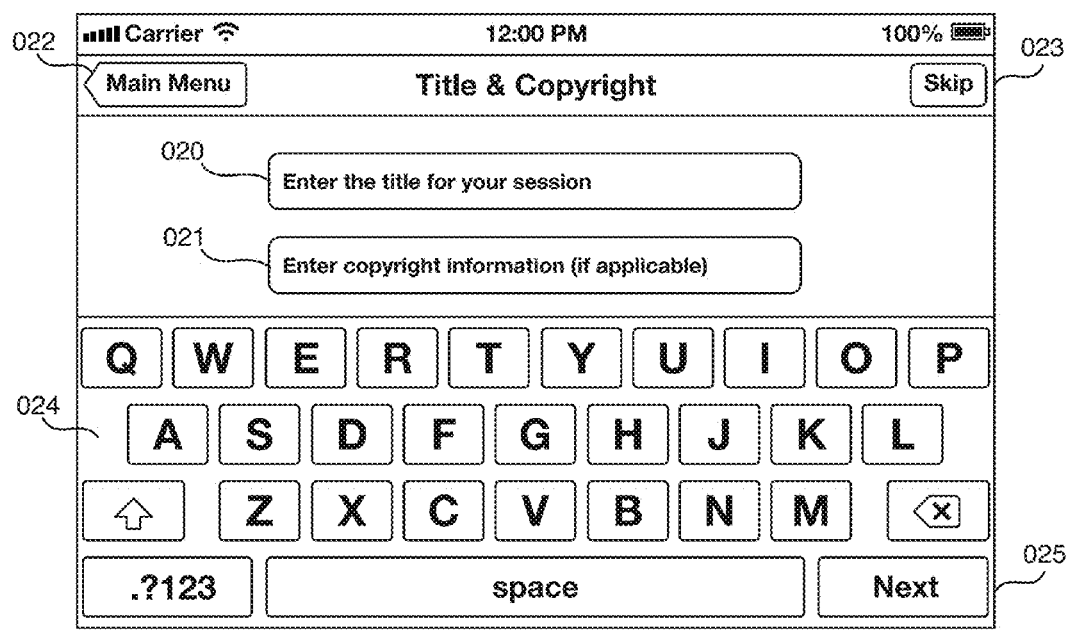
FIG. 7 illustrates a Title and Copyright UI according to an embodiment of the invention.

Referring back to FIG. 2, when a user chooses to be the director (while the user is considered a director the user will be referred to as "the director") and taps the Director button 001 in the Home UI 320 or the Director button 147 in the Home UI as depicted in FIG. 2A, the Title and Copyright UI 334, as depicted in FIG. 7, can be displayed to the director. The Title and Copyright UI 334 contains a Title text field 020 and a Copyright text field 021. There is a Navigation bar at the top of the screen which contains a Main Menu button 022 and a Skip button 023. If the director taps the Main Menu button 022, the Title and Copyright UI 334 is exited and the Home UI 320 or 322 is displayed to a user. If the director taps the Skip button 023 without entering any text in the Title or Copyright text fields 020 and 021, the Title and Copyright UI 334 is exited and a Director UI 350 or 356, which will be described in more detail below, can be displayed to the director; in addition, the title displayed in the credits will be "Untitled" and there will be no display of copyright information in the credits. If the director taps on the Title text field 020, a cursor appears in the Title text field 020 and a keyboard 024 is overlaid on the screen to facilitate text entry. The director can tap on the Copyright text field 021 first and skip the Title text field 020 to enter copyright holder information in the Copyright text field 021 without entering a title in the Title text field 020. This would result in the title displayed in the credits as "Untitled," but there would be copyright information in the credits.

Text input by the director in the Title text field 020 is the title for the video displayed in the credits, the name for a session in the Sessions UI and Individual Session UI and it is also part of the file folder and naming structure of an exported video and/or video clips. If the director enters a title and taps a Next button 025 on the keyboard 024, the Copyright text field 021 is given focus; the cursor appears in the Copyright text field 021 and the Next button changes to a Done button (not shown) to denote that the next time the director taps the button, text entry in the Title and Copyright UI 334 is complete and the Director UI 350 or 356 will be displayed to the director. Text input by the director into the Copyright text field 021 is displayed in the credits. The director only needs to input copyright holder information in the Copyright text field 021, the copyright symbol and current year are automatically added in front of the copyright holder information in the credits. If the director enters copyright holder information and taps the Done button, the Title and Copyright UI 334 is exited and the Director UI is displayed to the director. If the director chooses not to enter copyright holder information and taps the Done button, there will be no copyright notice in the credits, the Title and Copyright UI 334 is exited and the Director UI 350 or 356 will be displayed to the director.

Figure 7A:
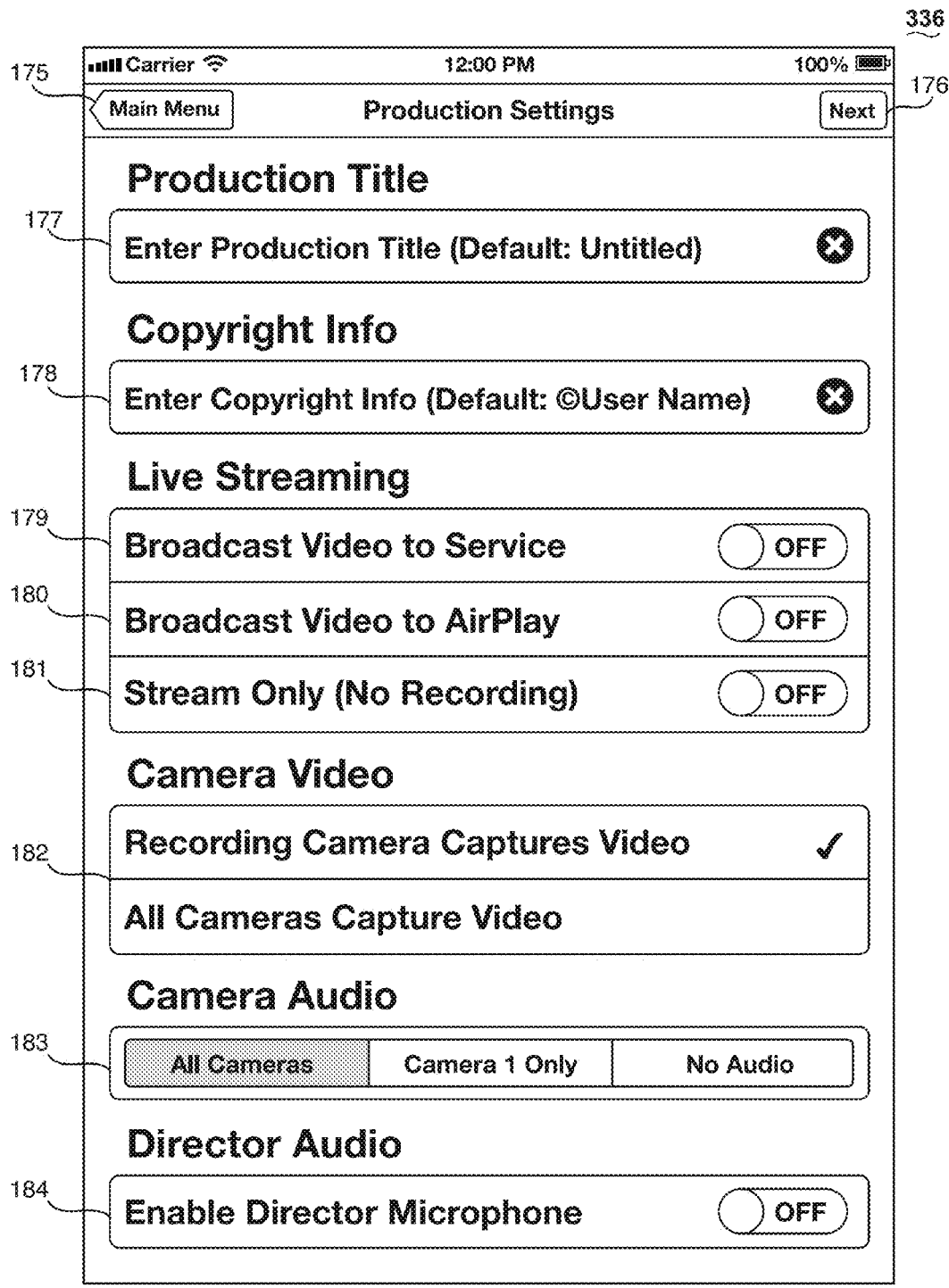
FIG. 7A illustrates a Production Settings UI according to an embodiment of the invention.

FIG. 7A illustrates a Production Settings UI 336, which is an alternative to the Title and Copyright UI 334, and is displayed when the user selects the Director button 001 of the Home UI 320 or the Director button 147 of the Home UI 322. The Production Settings UI 336 includes a Main Menu button 175 that returns the user to the Home UI 320 or 322 and a Next button 176. The user can choose to set all or some of the Production Settings UI 336 or accept the default settings by selecting the Next button 176. When a user taps the Next button 176 the Director UI 350 or 356 or the Camera UI in Solo-Camera Production mode 342 or the SoloCam UI 346 is displayed to a user, depending on whether the user is the director or a camera operator.

The user can enter a title for the session by tapping the Production Title text field 177. When the user taps the Production Title text field 177 a keyboard appears overlaid on the screen (not shown). If a user chooses not to enter a title the default title for the session is Untitled. A user can delete all of the text input into the text field 177 by tapping the "x" button at the end of the field. When the user taps Next (not shown) on the keyboard the focus shifts to the Copyright Info text field 178 and the Next button changes to a Done button (not shown).

The user can enter copyright information for the session in the Copyright Info text field 178. A user can skip the Production title text field 177 and the title would default to "Untitled" and tap on the Copyright Info text field 178 to type in copyright information. A user can skip the input of copyright information, and if a user set the copyright to default to ©User Name in the Settings UI 332, it will generate a copyright notice in the credits clip with the copyright symbol and the User Name input in the Settings UI 332 or the device name if a user name was not input in the Settings UI 332. The copyright symbol is automatically added before any text input into the Copyright Info text field 178. If a user did not set the copyright to default to ©User Name in the Settings UI 332 and does not enter copyright holder information there will be no copyright notice in the credits. When the user taps the done button on the keyboard the keyboard is dismissed from the screen.

The Production Settings UI 336 also includes Live Streaming options. The user can choose to broadcast a live stream of the edited feed to the internet by toggling the Broadcast Video to Service option 179 to ON. The live stream will broadcast the live edited video stream to the service selected in the Settings UI 332. The user can also choose to broadcast a live stream of the edited feed to a TV or monitor with an AppleTV device on the network the user is connected to by setting the Broadcast Video to AirPlay option 180 to ON. Alternatively, the user can choose to not record video to save space on the devices and only broadcast a live stream to the internet or an AppleTV by switching the Stream Only (No Recording) option 181 to ON. This option will not be enabled unless one of the previous Live Streaming options 179 or 180 is turned ON. The default for each of the options 179, 180 and 181 under Live Streaming is set to OFF.

The Production Settings UI 336 also includes a Camera Video options table 182. The user can choose to have only the recording camera capture the video or to have all the cameras capture video regardless of which camera is currently "recording." The default setting can be to have a Recording Camera Captures Video cell selected. If a user selects the Recording Camera Captures Video cell, only the current recording camera records a video clip. If a user selects an All Cameras Capture Video cell, then all of the cameras record video for the entire duration of the session. If any options previously set in the Settings UI 332 or in the Production Settings UI 336 conflict with the All Cameras Capture Video option, then a user will not be able to choose this option. When a user taps on one of the table cells the tapped table cell is highlighted with a checkmark to denote that the option is selected.

The user can choose the audio capture settings for the cameras before the start of the session using the Camera Audio button 183. The Camera Audio button 183 can be a three way toggle button where only one of the buttons can be selected and highlighted. The default can be set to the All Cameras option. When a user taps All Cameras, all the cameras will record audio during the session. When a user taps the Camera 1 Only option, camera 1 will be the only camera to record audio during the session. When a user selects the No Audio option, none of the cameras will record audio during the session.

The user can enable the director's microphone before the session by setting the Enable Director Microphone option 184 to ON. If the director's microphone is enabled before the session the director will be able to record voice-over audio during the session. If the director's microphone is enabled and the director taps a Megaphone button 227 in the Director UI 356 of FIG. 14A (described below) to communicate with the Camera units through audio, the director audio recording will go silent so it is not recorded in the session. Once the director ends the audio communication with the Camera units, the director audio recording will begin again. If the user selected the SoloCam button 149 in the Home UI 322, some of the options in the Production Settings UI 336 which are not relevant to a solo camera session will not be displayed.

Figure 8:
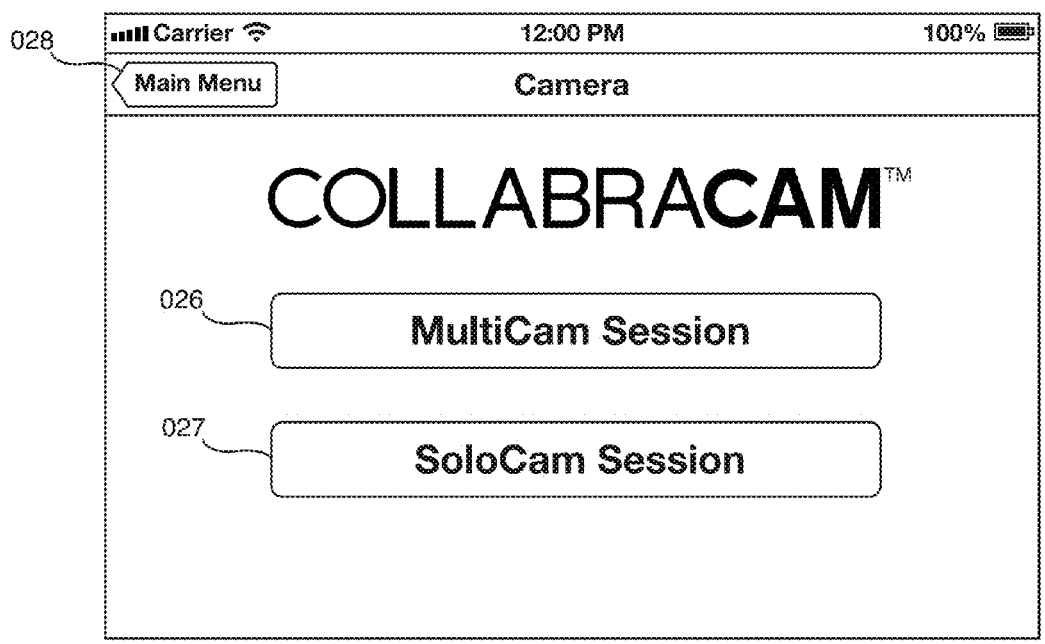
FIG. 8 illustrates a Camera Selection UI according to an embodiment of the invention.
Figure 9:
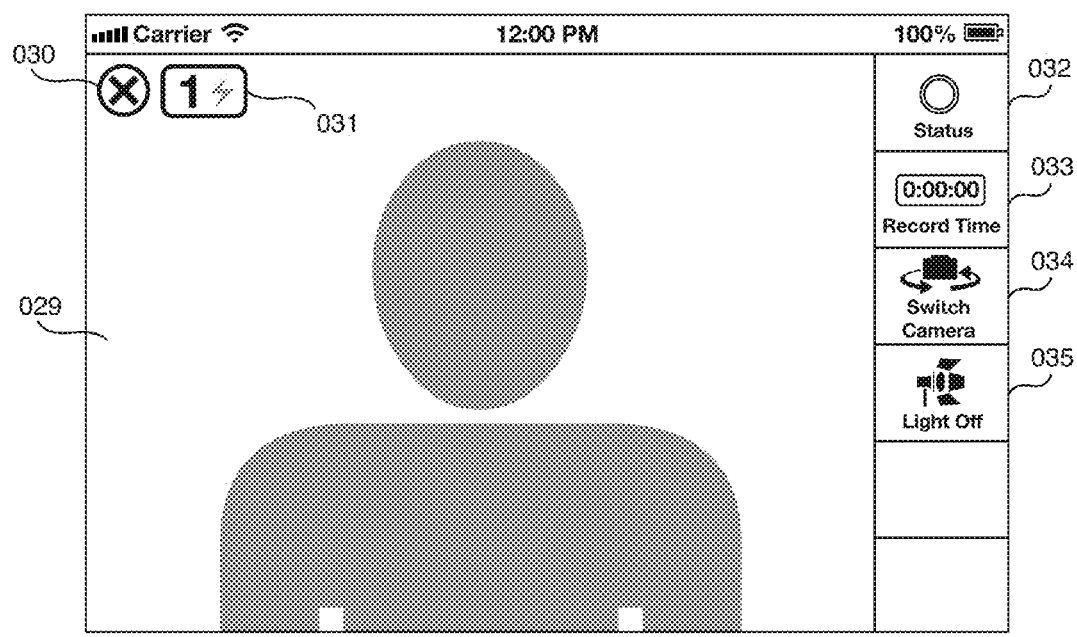
FIG. 9 illustrates a Camera UI in Multi-Camera Production mode according to an embodiment of the invention.

Referring back to FIG. 2, when a user chooses to be a camera operator (while the user is considered a camera operator the user will be referred to as "a camera operator" or "the camera operator") and taps the Camera button 002 in the Home UI 320, a Camera Selection UI 338, as depicted in FIG. 8, is displayed to a camera operator. The Camera Selection UI 338 contains two buttons, the MultiCam Session button 026 and the SoloCam Session button 027. There is a Navigation bar at the top of the screen which contains a Main Menu button 028. If a user taps the Main Menu button 028, the Camera Selection UI 338 is exited and the Home UI 320 is displayed to a user. If a user taps the MultiCam Session button 027, a Camera UI Multi-Camera Production mode 340, as depicted in FIG. 9, is displayed to a camera operator and a camera operator's device camera becomes a broadcast server of video to the Director's unit. If a user taps the SoloCam Session button 027, the Title and Copyright UI 334 or the Production Settings UI 336 is displayed to the camera operator. After the camera operator enters title and copyright holder information, or taps the Skip button 023 or the Next button 176 as described in the previous paragraphs, the Title and Copyright UI 334 or the Production Settings UI 336 is exited and the Camera UI Solo-Camera Production mode 342 is displayed to the camera operator.

In FIG. 8 when a user chooses to participate in a multi-camera video capture session as a camera operator and taps the MultiCam Session button 026, the Camera UI in Multi-Camera Production mode 340, as depicted in FIG. 9, is displayed to a camera operator. The Camera UI in Multi-Camera Production mode 340 consists of the video display 029 which shows the video from a camera operator's device camera. A Quit button 030 is displayed in the upper left corner of the video display. A Camera Number with Light Indicator icon 031 is displayed to the right of the Quit button 030 once the Director's unit connects to a camera operator's device.

Figure 10:
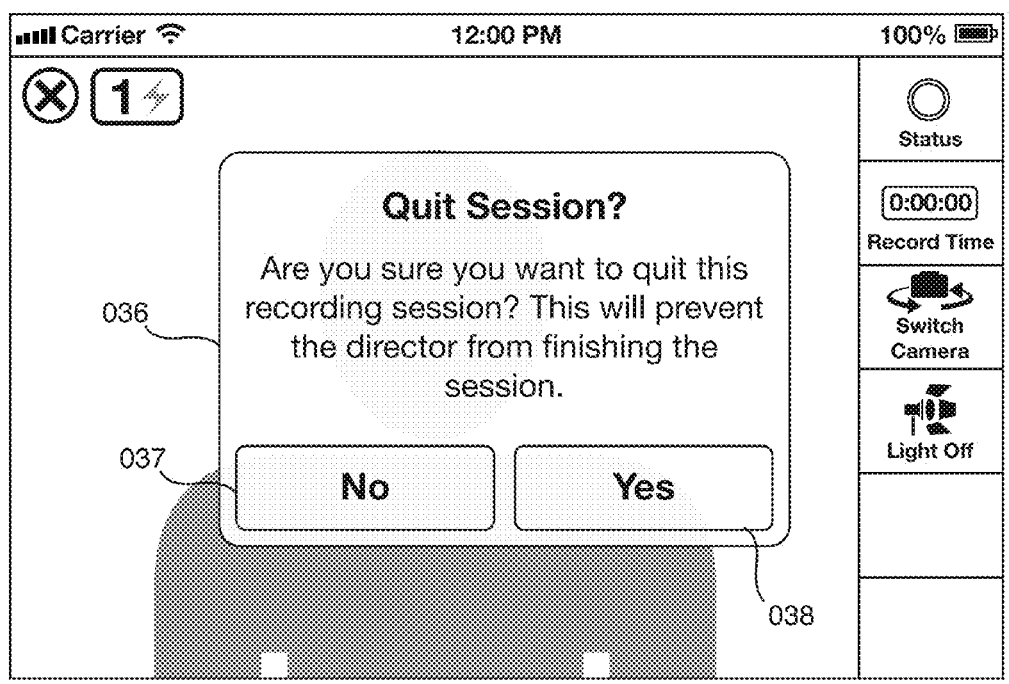
FIG. 10 illustrates the Camera UI in Multi-Camera Production mode of FIG. 9 with a Quit Modal Alert.

If a camera operator taps the Quit button 030, a Modal Alert 036 is overlaid on the Camera UI 340, as depicted in FIG. 10. The Modal Alert 036 is a secondary step in the quitting process to ensure that it was not an accidental tap and a camera operator does want to quit the session in progress. A Modal Alert 036 is an overlay displayed on the current UI with or without a label, which contains an informative text alert to a user with at least one button choice. A button must be tapped by a user to dismiss the Modal Alert 036 and exit to the underlying UI. The Modal Alert 036 questions a camera operator, "Quit Session? Are you sure you want to quit this recording session? This will prevent the director from finishing the session." The Modal Alert 036 contains a No button 037 and a Yes button 038. If a camera operator taps the No button 037, the Modal Alert 036 is dismissed from the screen and a camera operator can continue to participate in the multi-camera video capture session in progress. If a camera operator taps the Yes button 038, the Camera UI 340 is exited and the Home UI 320 is displayed to a user.

Referring back to FIG. 9, the Camera Number with Light Indicator icon 031 reflects a camera operator's position in the Director UI of the Director's unit and the status of the camera operator's device light. The Light Indicator 031 (lightning bolt) is transparent black when a camera operator's device light is off and solid black when the light is on (not shown). A Status light 032 is an icon with a simulated light. Initially the Status light 032 is dark or unlighted. The Status light 032 icon simulates illumination with blue light with the label "Standby" when a camera operator's device is put on standby by the Director's unit. The Status light 032 icon simulates illumination with red light with the label "Recording" when the Director's unit initiates video recording on the digital storage medium of a camera operator's device. The Status light 032 icon reverts to the dark or unlighted state when a camera operator's device is not on standby or recording video.

A Time Counter 033 displays the total record time of the multi-camera video capture session. A Switch Camera button 034 switches between the back facing (facing away from the user) and front facing (facing the user) cameras of a camera operator's device, if the device has the capability. The default for a camera operator's device camera is the back facing camera. A Light button 035 turns the camera operator's device light on or off, if the device has the capability. The default for a camera operator's device light is off. The Light button 035 label is "Light On" and the light icon depicts a light which is on to denote that if the button is tapped, the device's light will be turned on. If a camera operator taps the Light button 035, the camera operator's device light is turned on, the Light Indicator 031 changes to solid black and the button label changes to "Light Off" and the light icon depicts a light which is off to denote that if the button is tapped again the device's light will be turned off. If a camera operator taps the Light button 035 again to turn the device's light off, the Light Indicator reverts back to transparent black and the button reverts back to the original state (not shown).

Figure 9A:
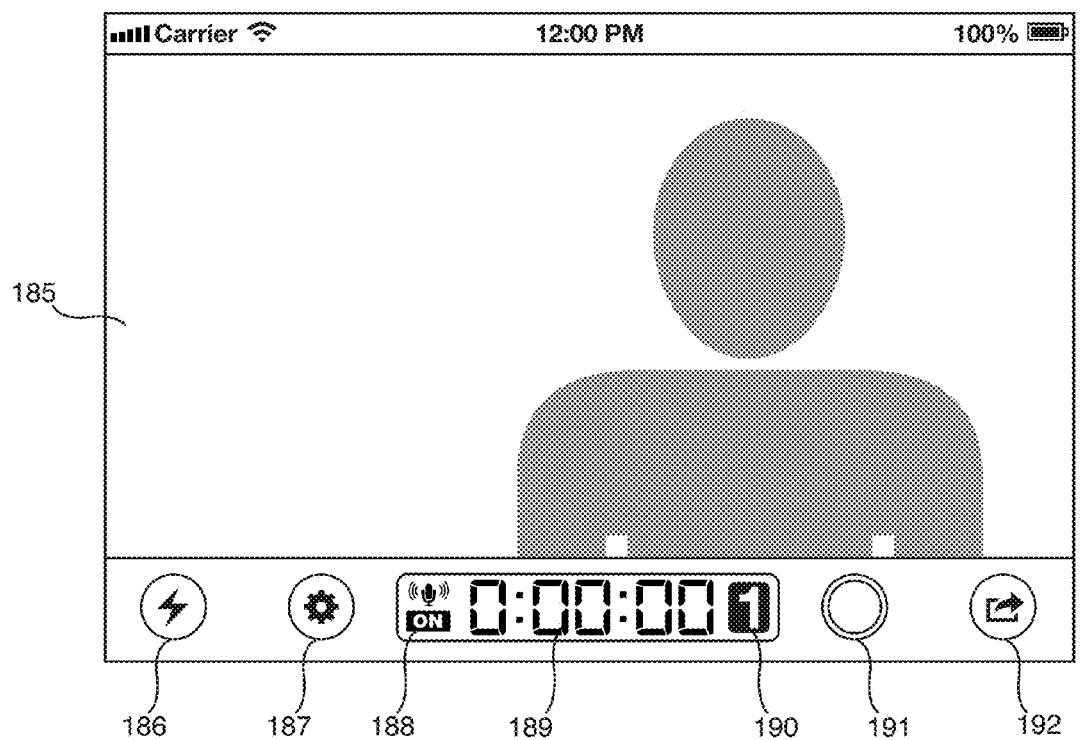
FIG. 9A illustrates a MultiCam UI according to an embodiment of the invention.

FIG. 9A illustrates a MultiCam UI 344, which is similar to the Camera UI in Multi-Camera Production mode 340 of FIG. 9, but with additional options and a view that supports a 16:9 aspect ratio. The MultiCam UI 344 includes a video display 185 which shows the video from a camera operator's device camera. A Light button 186 allows the camera operator to selectively turn the device's light on and off. When the camera operator taps the Light button 186 the device's light turns on and the button remains highlighted until the camera operator taps the Light button 186 again to turn the device's light off.

Figure 9B:
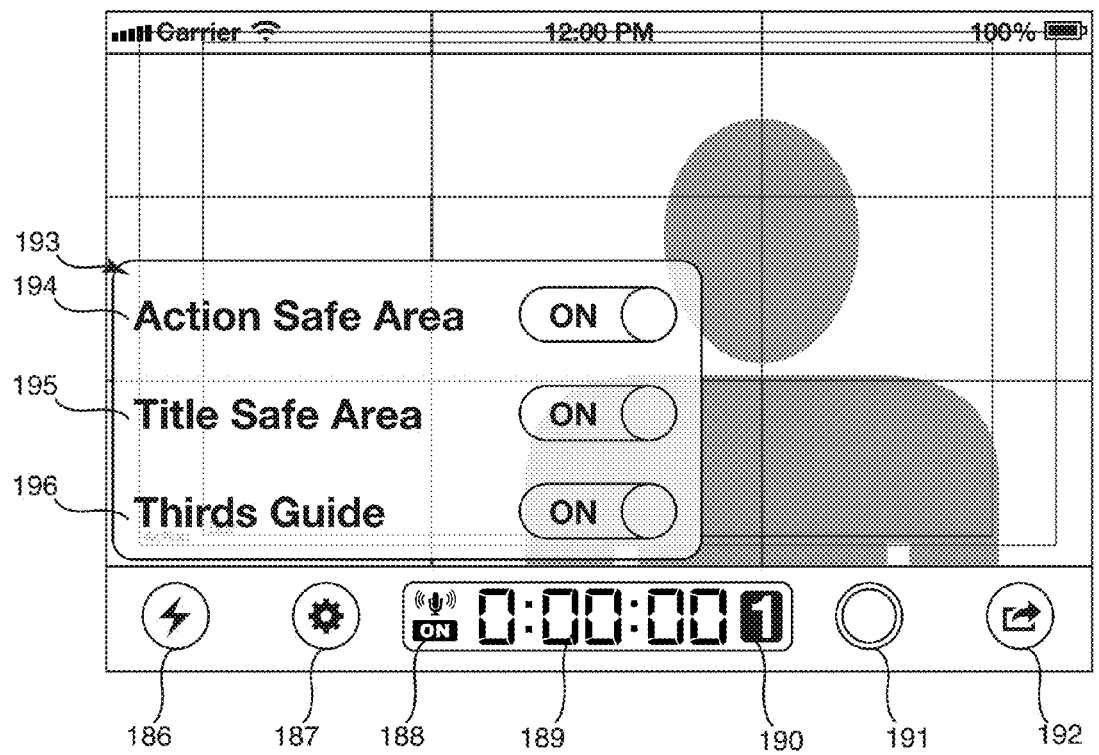
FIG. 9B illustrates a Camera Overlay Options popover in the MultiCam UI of FIG. 9A.

The MultiCam UI 344 also includes an Options button 187. When the camera operator taps the Options button 187, the Camera Overlay Options popover 193 is displayed to the camera operator, as illustrated in FIG. 9B, and the Options button 187 remains highlighted until a camera operator taps the Options button 187 again to dismiss the camera overlay options from the screen.

Figure 9C:
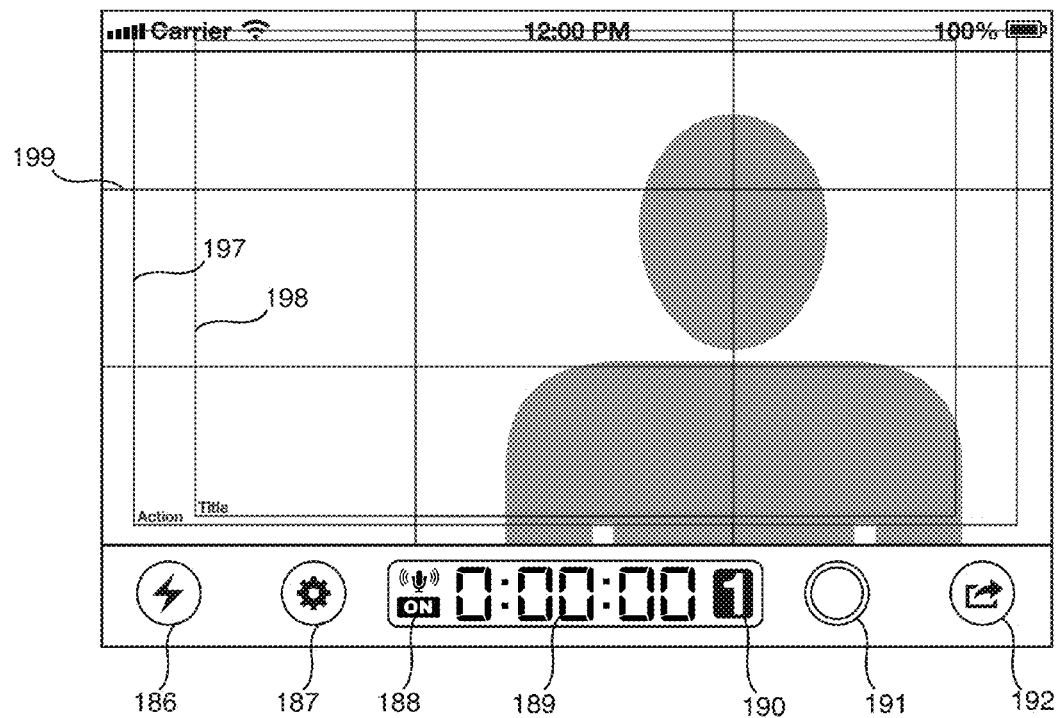
FIG. 9C illustrates a Camera Overlay in the MultiCam UI of FIG. 9A.

When the camera operator turns the Action Safe Area toggle switch 194 to ON, the Action Safe Overlay 197 is overlaid on the video display, as illustrated in FIG. 9C. The Action Safe Overlay 197 denotes that the area within the overlay is safe and will display on a TV. When the camera operator turns the Title Safe Area toggle switch 195 to ON, the Title Safe Overlay 198 is overlaid on the video display, as illustrated in FIG. 9C. The Title Safe Overlay 198 denotes that the area within the overlay is safe for titling later in post-production and will display on a TV. When a camera operator turns the Thirds Guide toggle switch 196 to ON, the Thirds Guide Overlay 199 is overlaid on the video display, as illustrated in FIG. 9C. The Thirds Guide Overlay 199 is for framing subjects and objects within the frame for interesting composition using the rule of thirds.

Referring again to FIG. 9A, an Audio Status Indicator 188 displays the status of the camera operator's device microphone. If the device's microphone is turned off the indicator does not display the audio waves and the icon below the microphone says OFF (not shown). If the device's microphone is turned on the Audio Status Indicator 188 displays the audio waves and the icon below the microphone says ON.

The MultiCam UI 344 also includes a Time Counter 189 and a Camera Number 190. The Time Counter 189 syncs with the director's time counter to display the current record time of the session to the camera operator. The Camera Number 190 reflects a camera operator's position in the Director UI on the Director's unit. If a camera operator taps the Time Counter 189 it will temporarily display the size of the free space on the camera operator devices' storage medium before the storage medium is full (not shown).

A Status light 191 is an icon with a simulated light that is initially dark or unlighted. The Status light icon 191 simulates illumination with blue light when a camera operator's device is put on standby by the Director's unit. The Status light icon 191 simulates illumination with red light when the camera operator's device is the live camera and the Director's unit initiates video recording on the digital storage medium of the camera operator's device or the camera operator's device camera is the live camera when all cameras are recording. When all the devices are recording, the director can add an edit point to an Edit Decision List or broadcast the edited feed with one of the live streaming options described previously.

Figure 10A:
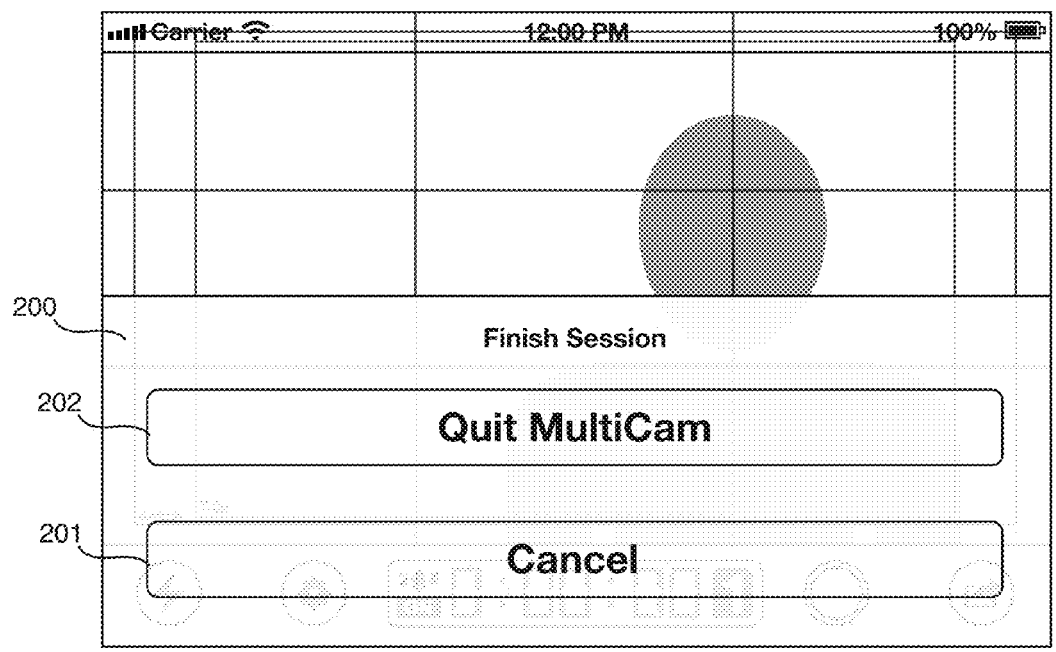
FIG. 10A illustrates an Action sheet for quitting the MultiCam UI of FIG. 9A.
Figure 10B:
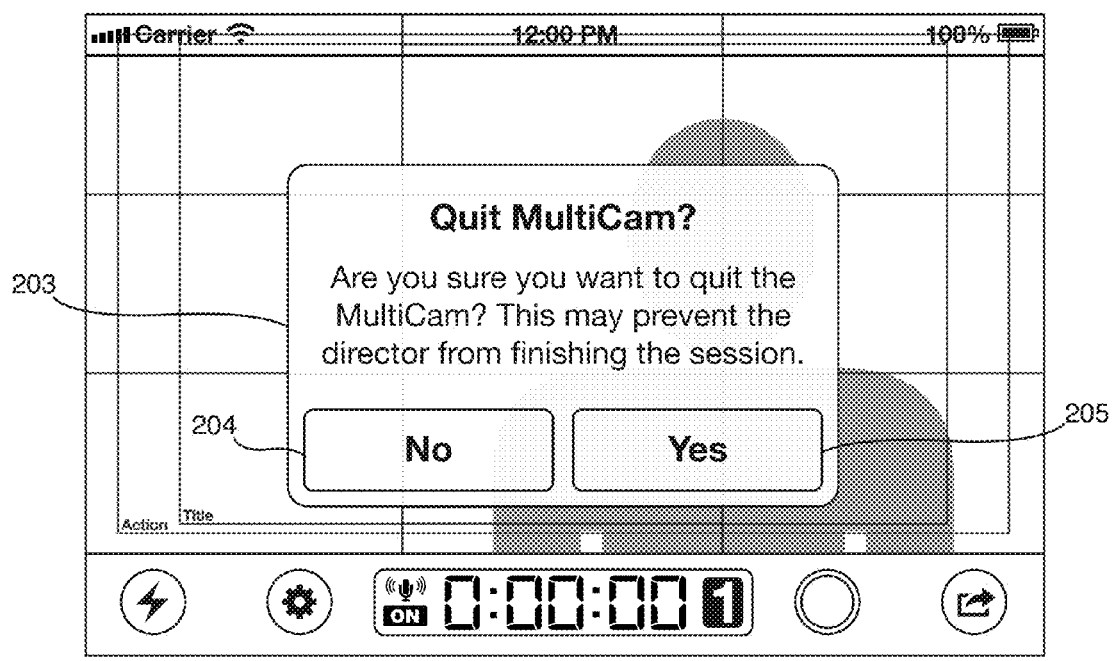
FIG. 10B illustrates a Modal Alert for quitting the MultiCam UI of FIG. 9A.

The MultiCam UI 344 also includes an Action button 192. When the camera operator taps the Action button 192, a Finish Session Action sheet 200, such as illustrated in FIG. 10A, is displayed to the camera operator. If the camera operator taps the Cancel button 201 in the Action sheet 200, the Action sheet is dismissed from the screen and the camera operator remains in the MultiCam UI 344. If a camera operator taps the Quit MultiCam button 202 the Action sheet 200 is dismissed and a Modal Alert 203 is overlaid in the middle of the screen, as illustrated in FIG. 10B. The Modal Alert 203 questions a camera operator "Quit MultiCam? Are you sure you want to quit the MultiCam? This may prevent the director from finishing the session." If a camera operator taps the No button 204 the Modal Alert 203 is dismissed from the screen and the camera operator can continue to participate in the multi-camera video capture session in progress. If a camera operator taps the Yes button 205 the MultiCam UI 344 is exited and the Home UI 322 is displayed to the user.

Figure 11:
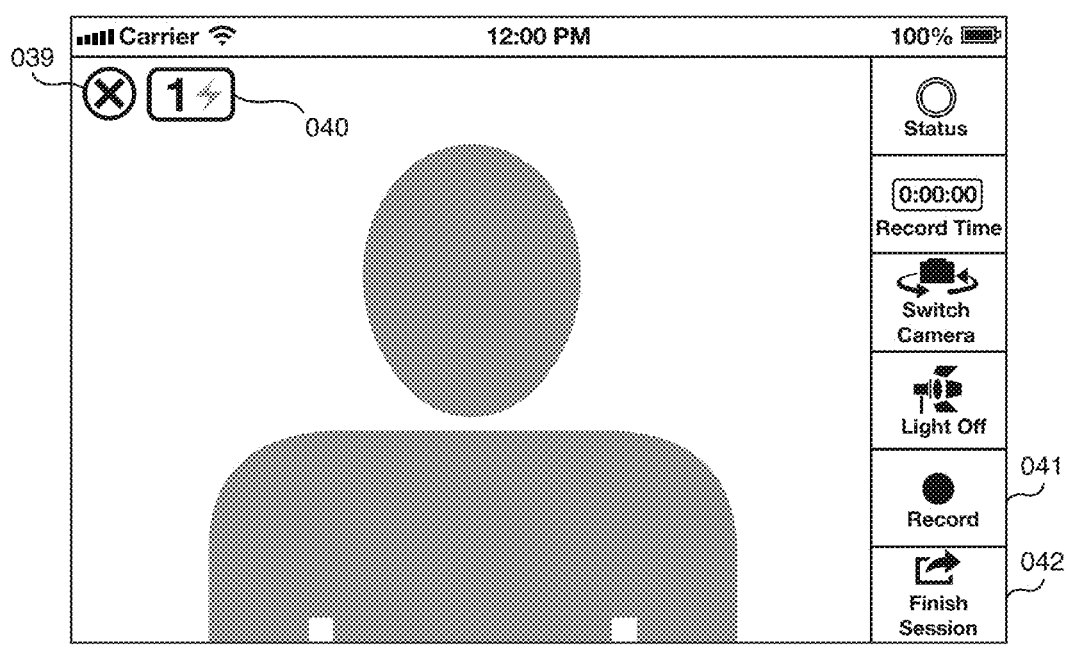
FIG. 11 illustrates the Camera UI in Solo-Camera Production mode.

Referring back to FIG. 8, when a user chooses to engage in a solo-camera video capture session and taps the SoloCam Session button 026, a Camera UI in Solo-Camera Production mode 342, as depicted in FIG. 11, is displayed to the camera operator. Solo-Camera Production mode is for one camera operator to use the application without connecting to a director; this allows a single camera operator to record multiple clips during a solo-camera video capture session which are combined into one video with automatically generated credits. The Camera UI in Solo-Camera Production mode 342 has some notable differences and additional buttons, which are not in the Camera UI in Multi-Camera Production mode 340. A Camera Number with Light Indicator 040 is immediately displayed adjacent to a Quit button 039 (in Solo-Camera Production mode the camera number defaults to 1). A Record/Stop button 041 is an additional button in the Camera UI in Solo-Camera Production mode 342, which is not in the Camera UI in Multi-Camera Production mode 340.

Figure 12:
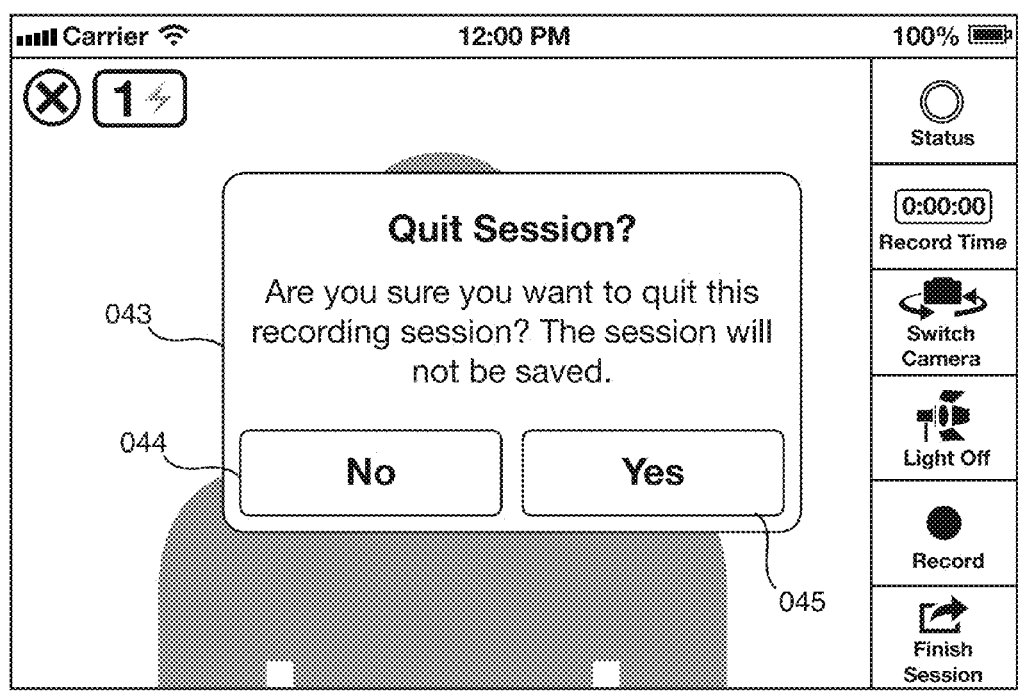
FIG. 12 illustrates the Camera UI in Solo-Camera Production mode of FIG. 11 with a Quit Modal Alert.

If the camera operator taps the Record button 041, video recording is started on the camera operator's device and the button changes to the Stop button (not shown). If the camera operator taps the Stop button, video recording is stopped, the video clip is saved to the digital storage medium of the camera operator's device and the Stop button reverts to the Record button 041. If the camera operator taps a Quit button 039, a Modal Alert 043 is overlaid on the Camera UI, as depicted in FIG. 12. The Modal Alert 043 is a secondary step in the quitting process to ensure that it was not an accidental tap and the camera operator does want to quit the session in progress. The Modal Alert questions the camera operator with slightly different wording, "Quit Session? Are you sure you want to quit this recording session? The session will not be saved." The Modal Alert contains a No button 044 and a Yes button 045. If the camera operator taps the No button, the Modal Alert is dismissed from the screen and the camera operator can continue the solo-camera video capture session in progress. If the camera operator taps the Yes button, the Camera UI is exited and the Home UI 320 is displayed to a user.

Figure 13:
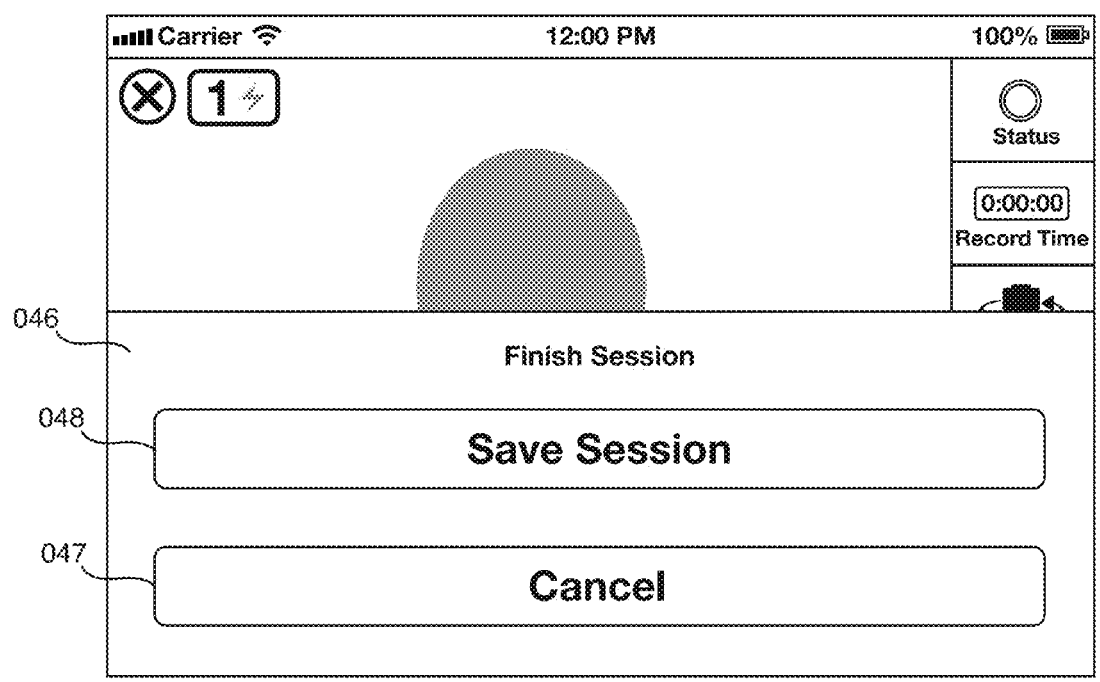
FIG. 13 illustrates the Camera UI in Solo-Camera Production mode with Action Sheet for saving a session.
Figure 26:
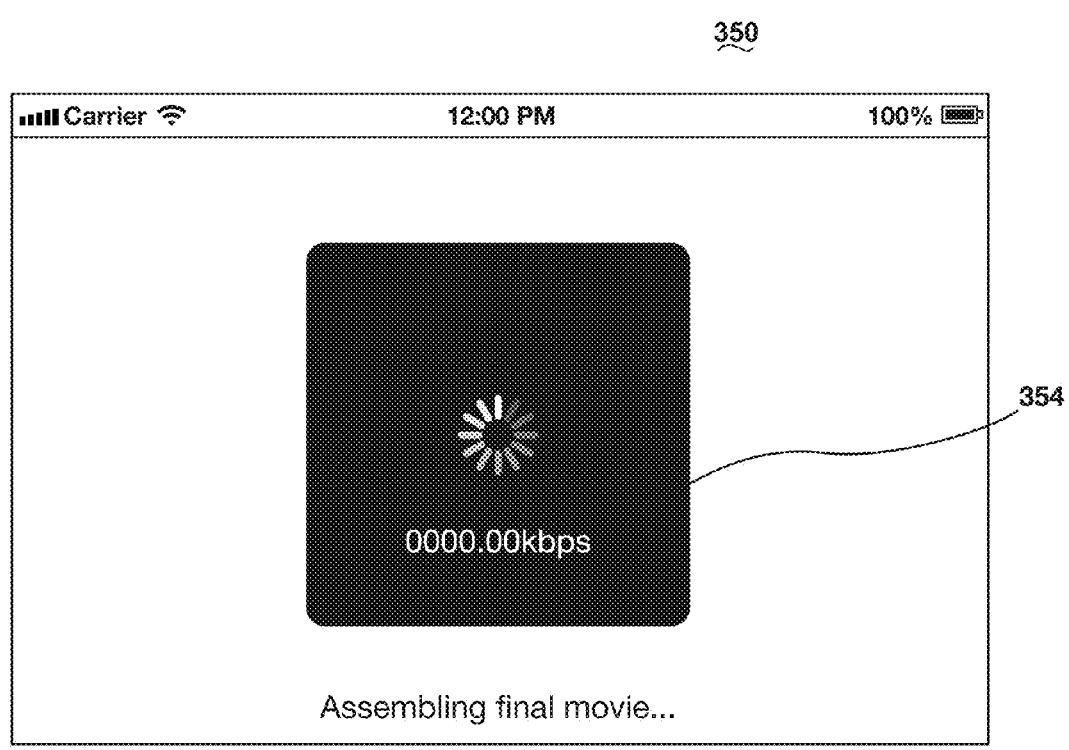
FIG. 26 illustrates the progress of the assembly of a final movie.
Figure 27:
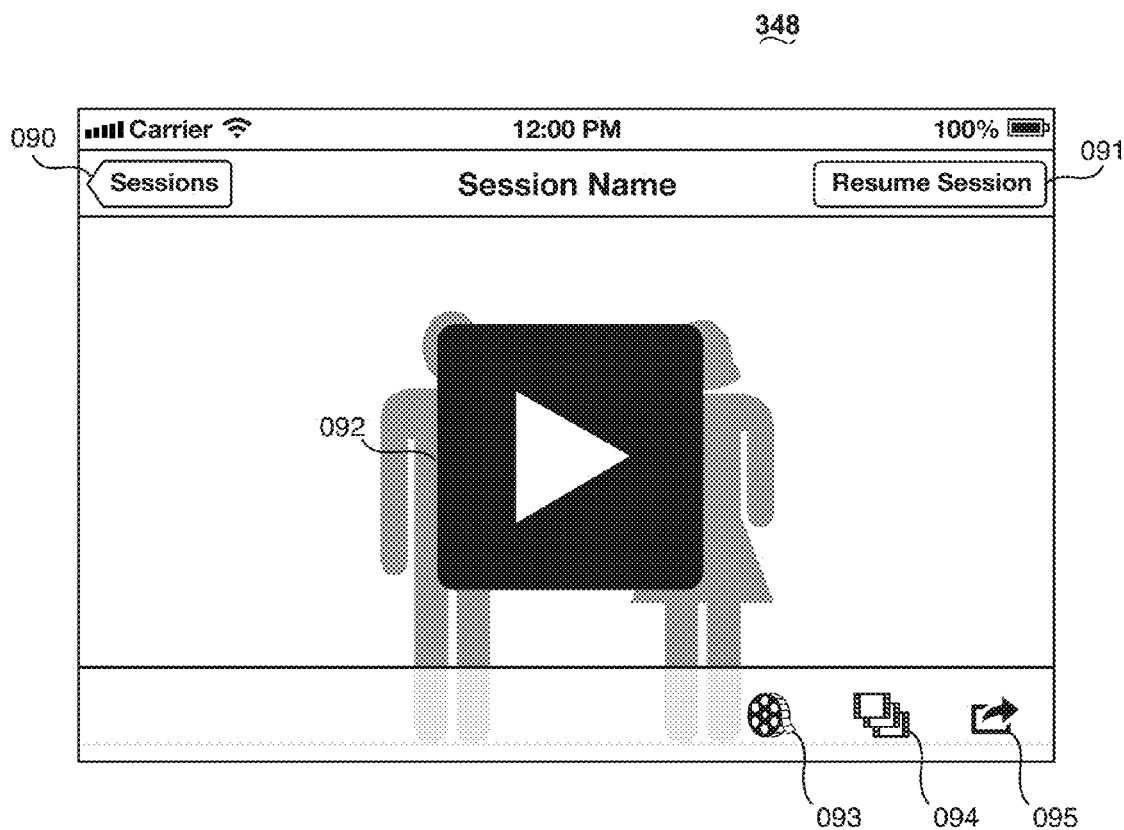
FIG. 27 illustrates an Individual Session UI according to an embodiment of the invention.
Figure 27A:
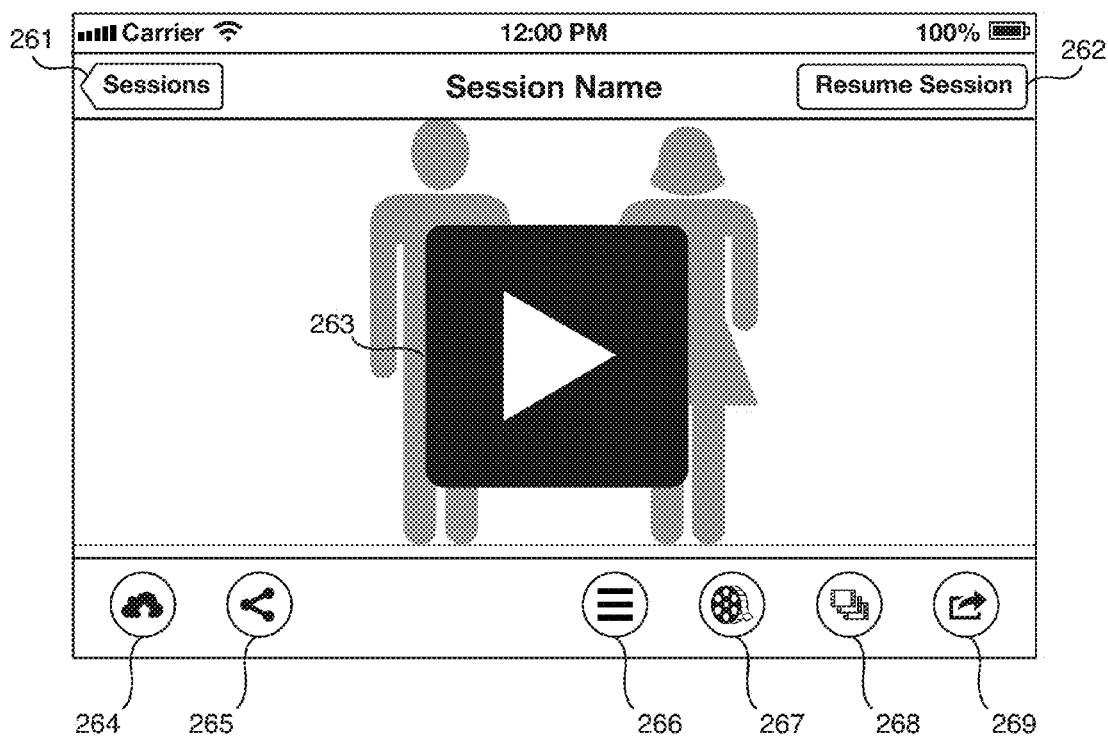
FIG. 27A illustrates an alternative Individual Session UI according to an embodiment of the invention.

Referring again to FIG. 11, the Action button 042 is an additional button in the Camera UI in Solo-Camera Production mode 342. When the camera operator chooses to end a solo-camera video capture session in progress, the camera operator must tap the Action button 042 to save the session. If the camera operator taps the Action button 042, an Action Sheet 046 is overlaid on the Camera UI, as depicted in FIG. 13. The Action Sheet 046 labeled "Finish Session" contains two buttons, a Cancel button 047 and a Save Session button 048. If the camera operator taps the Cancel button 047, the Action Sheet 046 is dismissed from the screen and the camera operator can continue the solo-camera video capture session in progress. If the camera operator taps the Save Session button 048 the session is saved, the Camera UI is exited, an asynchronous progress indicator with assembly rate is displayed while the final movie is assembled, as depicted in FIG. 26, and the credits are generated in the background crediting the camera operator as the director and the camera operator. When the final movie assembly is complete the Individual Session UI 348 or 374 of the solo-camera video capture session is displayed to the camera operator, as depicted in FIG. 27 and FIG. 27A respectively, which will later be described in detail.

Figure 11A:
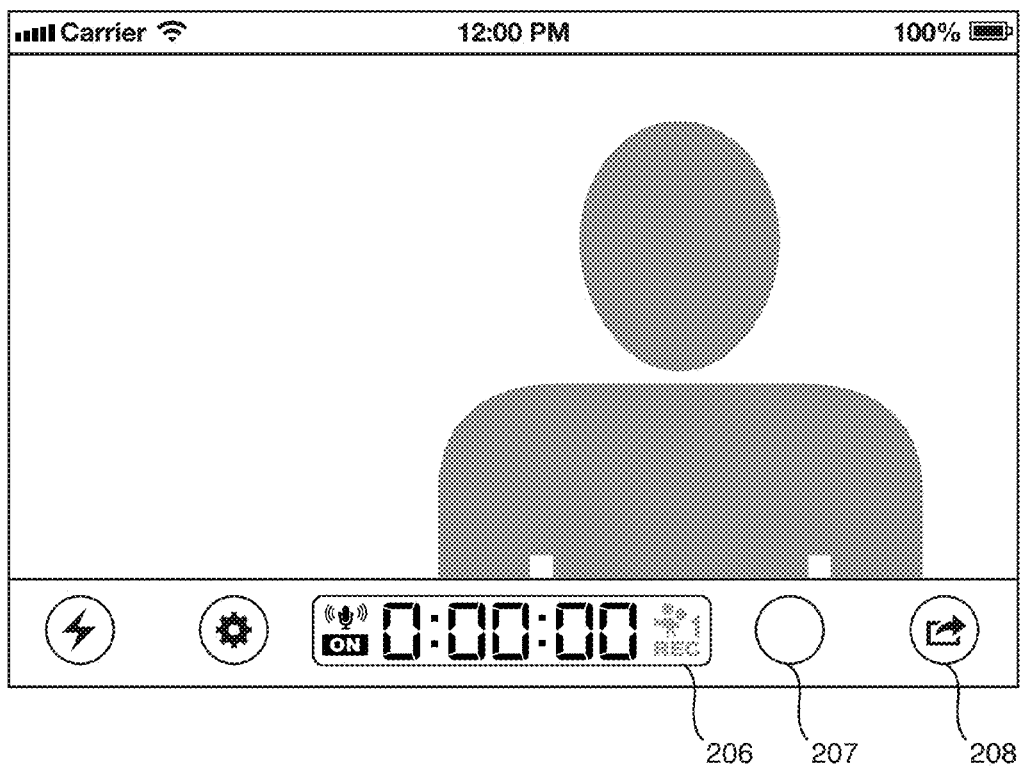
FIG. 11A illustrates a SoloCam UI according to an embodiment of the invention.

FIG. 11A illustrates a SoloCam UI 346, which is similar to the Camera UI in Solo-Camera Production mode 342, except for additional options and a view that supports a 16:9 aspect ratio. The SoloCam UI 346 includes a Recording indicator 206. When the camera operator enters the SoloCam UI 346, the Recording indicator 206 defaults to display the Camera One icon with REC below it and the Recording indicator 206 is grayed out until the camera operator starts recording. When the camera operator starts recording the Recording indicator 206 darkens to indicate that a recording is in process.

The SoloCam UI 346 also includes a Record/Pause button 207. When the camera operator taps the red Record button 207, video recording is started on the camera and the button 207 toggles to display the Pause button (not shown). When the camera operator taps the Pause button 207 video recording is stopped on the camera and the button toggles back to display the Record button 207.

Figure 12A:
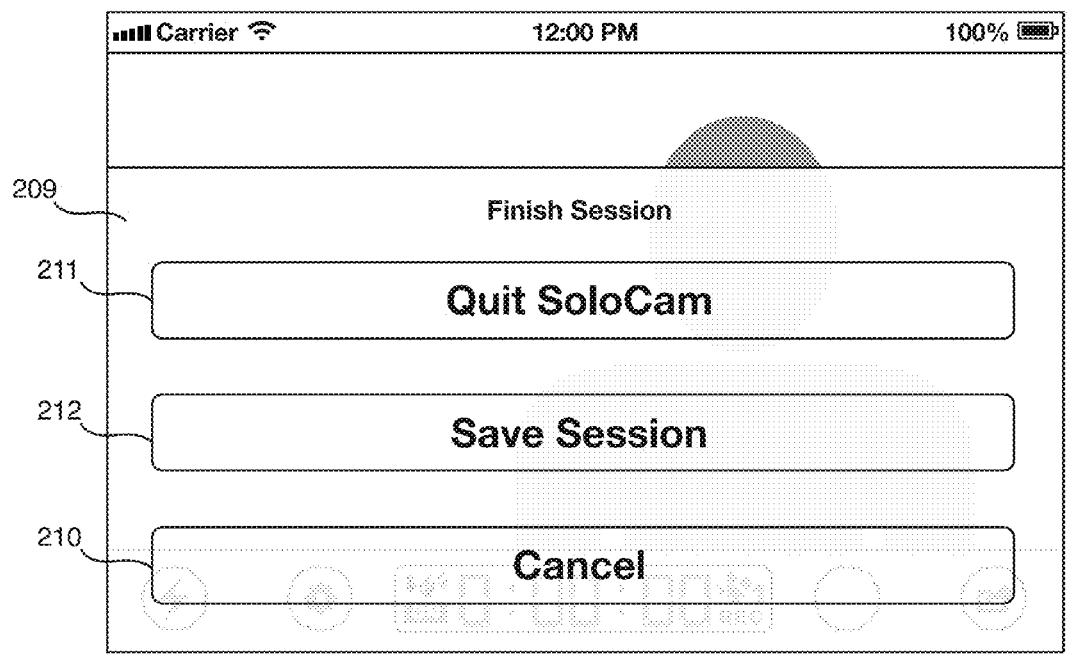
FIG. 12A illustrates an Action sheet for quitting or saving a session in the SoloCam UI of FIG. 11A.
Figure 12B:
FIG. 12B illustrates a Modal Alert for quitting the SoloCam UI of FIG. 11A.

When the camera operator taps an Action button 208, a Finish Session Action sheet 209 is displayed to the user, as illustrated in FIG. 12A. If the camera operator taps a Cancel button 210, the Action sheet 209 is dismissed from the screen and the user remains in the SoloCam UI 346. If the camera operator taps a Quit SoloCam button 211 the Action sheet 209 is dismissed and a Modal Alert 213 is overlaid in the middle of the screen, as illustrated in FIG. 12B. The Modal Alert 213 questions the camera operator "Quit SoloCam? Are you sure you want to quit the SoloCam? This recording session will not be saved." If the camera operator taps a No button 214, the Modal Alert 213 is dismissed from the screen and the camera operator can continue with the solo-camera video capture session in progress. If the camera operator taps a Yes button 215, the SoloCam UI 346 is exited and the Home UI 322 is displayed to the user. If the camera operator taps a Finish Session button 212, the session is saved, the SoloCam UI 346 is exited, an asynchronous progress indicator with assembly rate is displayed while the final movie is assembled, as depicted in FIG. 26, and the credits are generated in the background crediting the camera operator as the director and the camera operator. When the final movie assembly is complete, an Individual Session UI 348 or 374 of the solo-camera video capture session is displayed to the camera operator, as depicted in FIG. 27 or FIG. 27A respectively, which will be described below.

Figure 14:
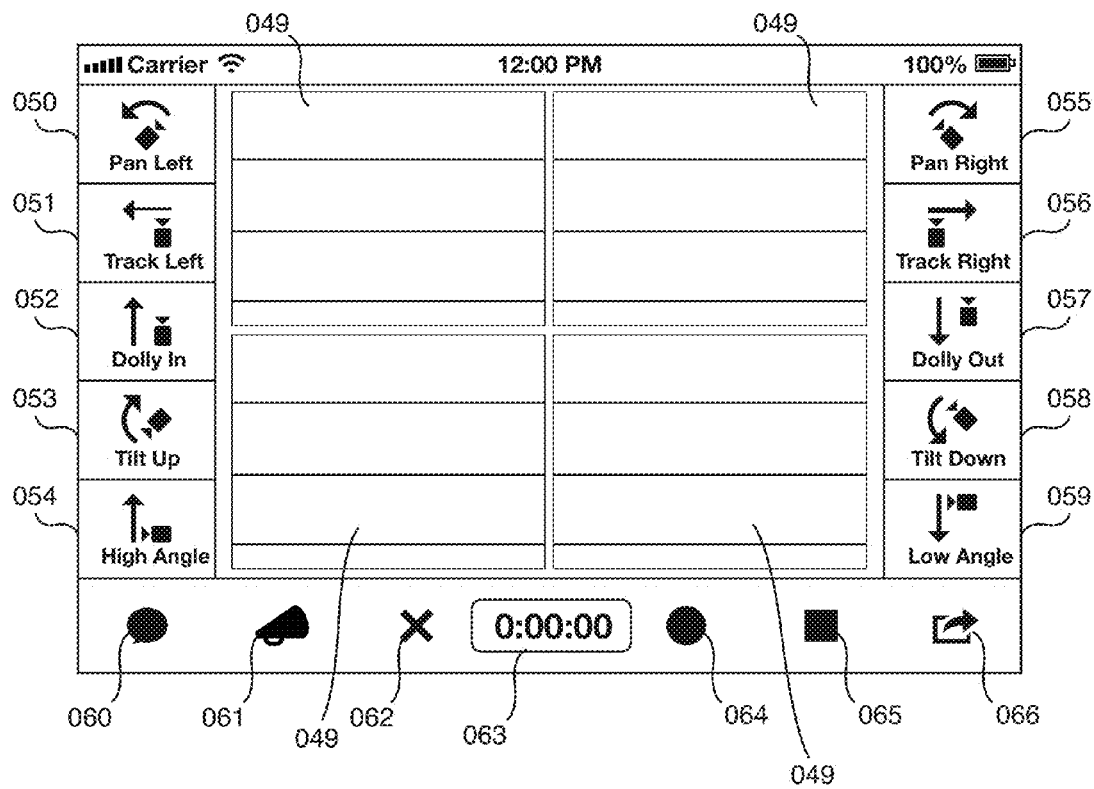
FIG. 14 illustrates a Director UI according to an embodiment of the invention.

The Director UI 350, as depicted in FIG. 14, contains four camera views 049 which will display real time video streams from up to four camera devices which are connected to a director device over a wireless network. The following is a general summary of the Director UI 350 and features will later be described in detail. On both sides of the Director UI 350 there are groups of buttons to facilitate silent communication from the director to the camera operators with desired camera moves or angles. The buttons on the left side of the Director UI 350 are: Pan Left 050, Track Left 051, Dolly In (Zoom In) 052, Tilt Up 053 and High Angle 054. The buttons on the right side of the Director UI 350 are: Pan Right 055, Track Right 056, Dolly Out (Zoom Out) 057, Tilt Down 058 and Low Angle 059. These buttons may be used to transmit operational instructions between the Director device and the one or more Camera devices. Operational instructions refer to action(s) that a Director requests a camera operator to perform that the Director cannot automatically control using the Director device. Operational instructions are different from operational commands in that an operational command refers to action(s) that the one or more Camera devices performs that can be controlled automatically by the Director device.

The Director UI 350 has a Tool bar at the bottom of the screen which contains: the Message button 060, the Megaphone button 061, the Quit button 062, the Time Counter 063, the Record button 064, the Stop button 065 and an Action button 066. If the director taps the Message button 060, the director can send a short text message to a camera operator.

If the director taps the Megaphone button 061, the director can give vocal instructions to all camera operators at once through the director device's microphone to the camera operators through the camera operator's earphone(s), which can be any suitable type of electrical device worn by a user that is held close to or inserted into the ear of a user to receive audio communication, non-limiting examples of which include headphones, earbuds and headsets.

Figure 15:
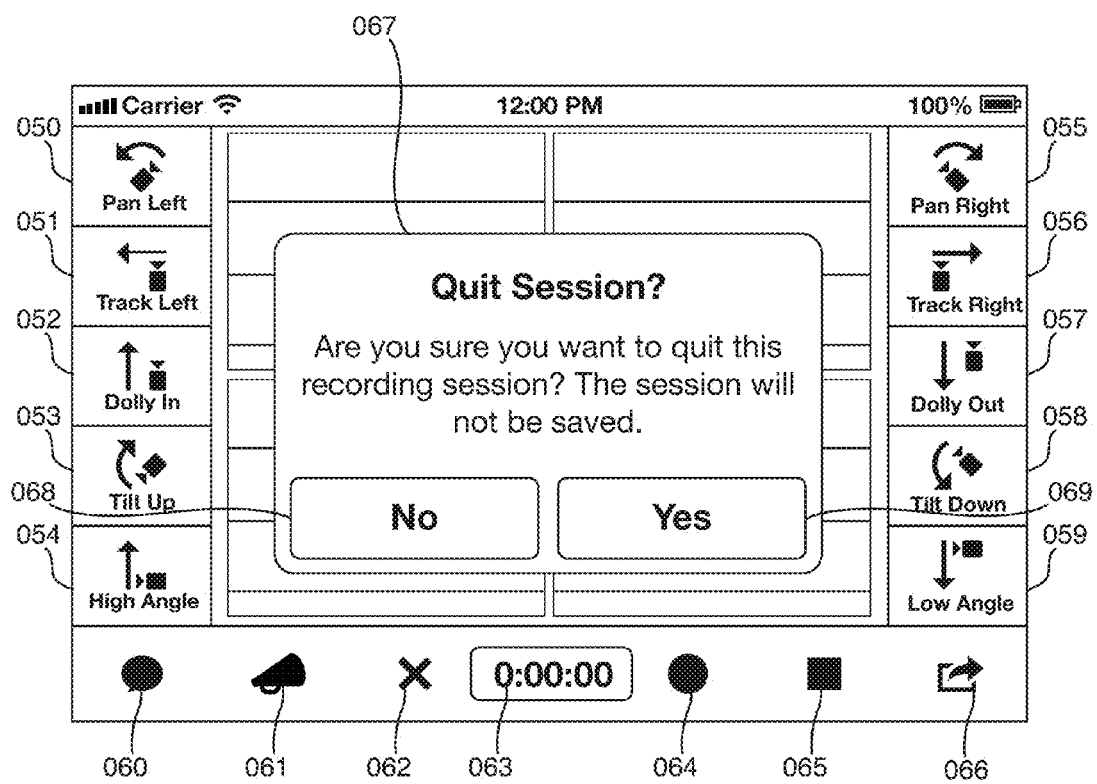
FIG. 15 illustrates the Director UI of FIG. 14 with the Quit Modal Alert.

If the director taps the Quit button 062, a Modal Alert 067 is overlaid on the Director UI 350, as depicted in FIG. 15. The Modal Alert 067 questions the director, "Quit Session? Are you sure you want to quit this recording session? The session will not be saved." The Modal Alert 067 contains a No button 068 and a Yes button 069. If the director taps the No button 068, the Modal Alert 067 is dismissed from the screen and the wireless multi-camera video capture session in progress can be continued. If the director taps the Yes button 069, the session is cancelled without saving, the Director UI 350 is exited and the Home UI 320 or 322 is displayed to the user. The Modal Alert 067 is a secondary step in the quitting process to ensure that it was not an accidental tap and the director does want to quit the session in progress.

Figure 24:
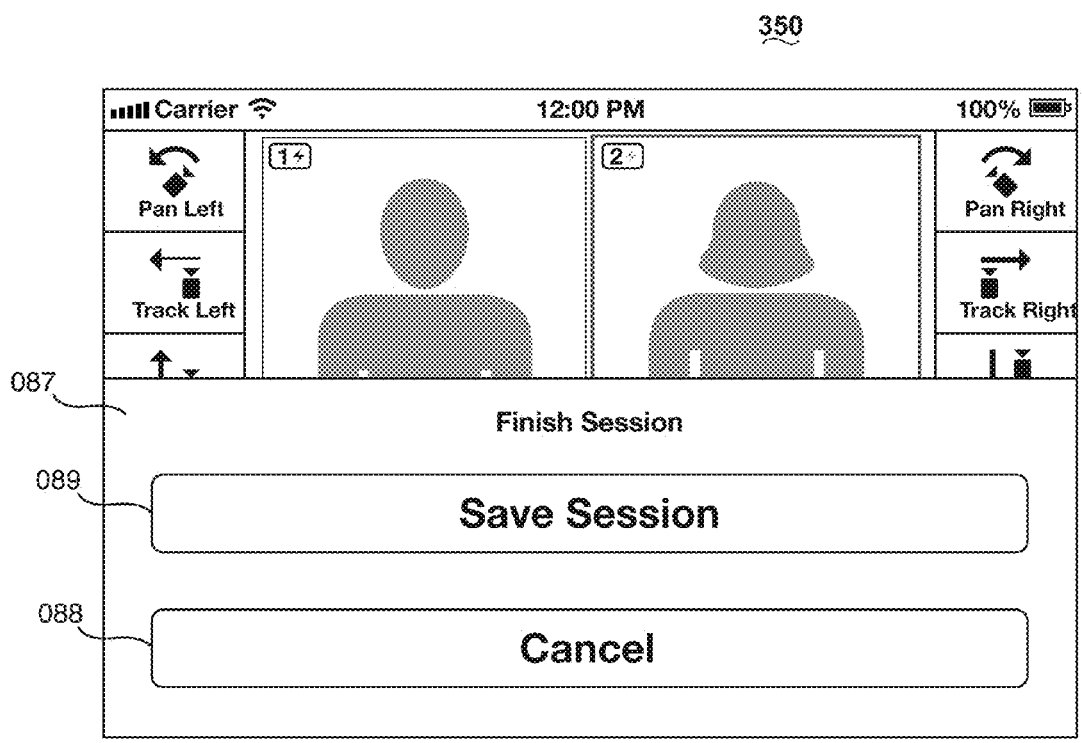
FIG. 24 illustrates the Director UI with an Action Sheet for saving a session according to an embodiment of the invention.

Referring again to FIG. 14, the Time Counter 063, displays the total record time of the session. If the director taps the Record button 064, the director's device can transmit an operational command with a custom proprietary client/server protocol over the network to initiate recording on a camera operator's device. If the director taps the Stop button 065, recording is stopped on a camera operator's device. If the director taps the Action button 066, an Action Sheet 087 is overlaid on the Director UI 350, as depicted in FIG. 24, allowing the director to save the session or cancel and dismiss the Action Sheet 087 and continue the multi-camera session in progress.

Figure 14A:
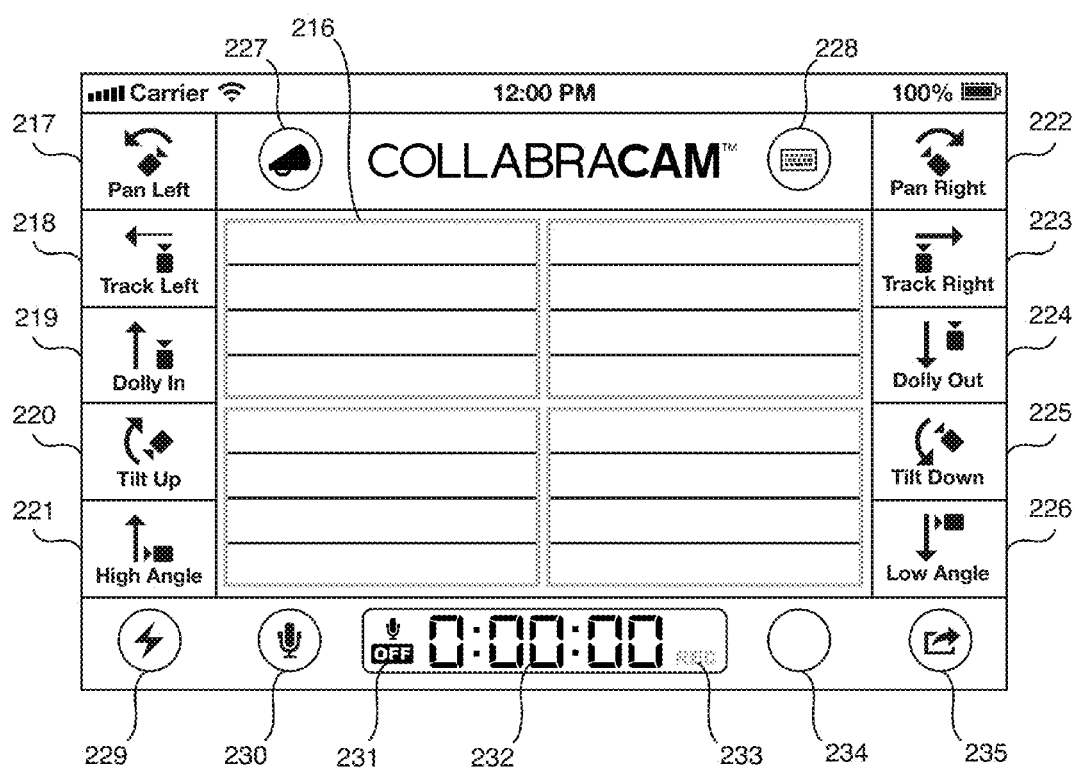
FIG. 14A illustrates an alternative Director UI according to an embodiment of the invention.

FIG. 14A illustrates a Director UI 356 which is similar to the Director UI 350 of FIG. 14, except for the appearance of some of the buttons, some additional buttons, some additional indicators in the area of the Time Counter 232 and support for 16:9 aspect ratio. The Director UI 356 includes four camera views 216, which can display real time video streams from up to four camera devices. The Director UI 356 includes the same silent communication buttons 217-226 that perform the same function as the silent communication buttons 050-059 as the Director UI 350. The Director UI 356 also includes a Megaphone button 227 for audio communication from the director to camera operators and a Keyboard button 028 for text communication from the director to camera operators in a Tool bar at the top of the screen.

The Director UI 356 also includes a Tool bar at the bottom of the screen which includes a Light button 229, a Microphone button 230, an Audio indicator 231, a Time Counter 232, a Recording indicator 233, a Record button 234 and an Action button 235. When the director taps the Light button 229 the device's light turns on and the button remains highlighted until the director taps the Light button 229 again to turn the device's light off. When the director taps the Microphone button 230 the device's microphone is activated and will record audio from the director device's microphone if it was enabled in FIG. 7A 184 when recording from a camera or cameras and the button remains highlighted until the director taps the Microphone button 230 again to disable the device's microphone. If the director pauses recording with the cameras the audio recording with the director's device pauses as well. If the director taps the Megaphone button 227 to communicate with a camera(s) during a session, the director's audio, if enabled and recording will be silent during that time. Audio Indicator 231 works the same as with a camera. Time Counter 232 displays the record/streaming time of the production. Initially the Recording Indicator 233 just displays REC grayed out. When a camera is put on standby the camera icon and the camera number is displayed above REC grayed out. If the director initiates recording on a camera the camera Recording Indicator 233 is solid black. The camera number changes to reflect the currently recording camera. If the director taps the Record button 234, it toggles to display a Pause button (not shown).

Figure 15A:
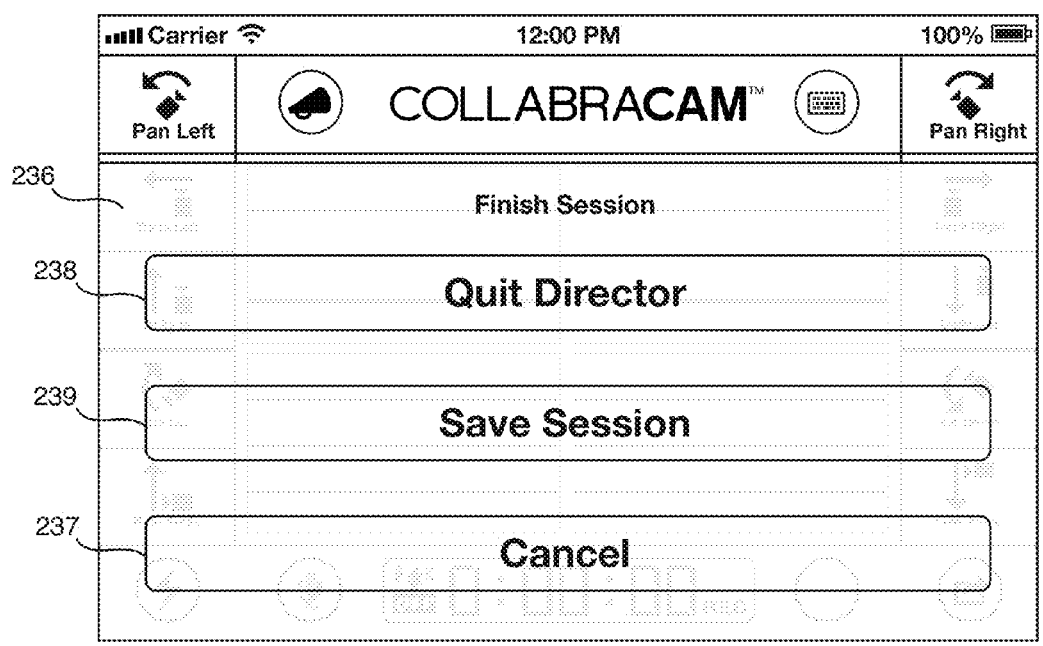
FIG. 15A illustrates an Action sheet for quitting or saving a session in the Director UI of FIG. 14A.
Figure 15B:
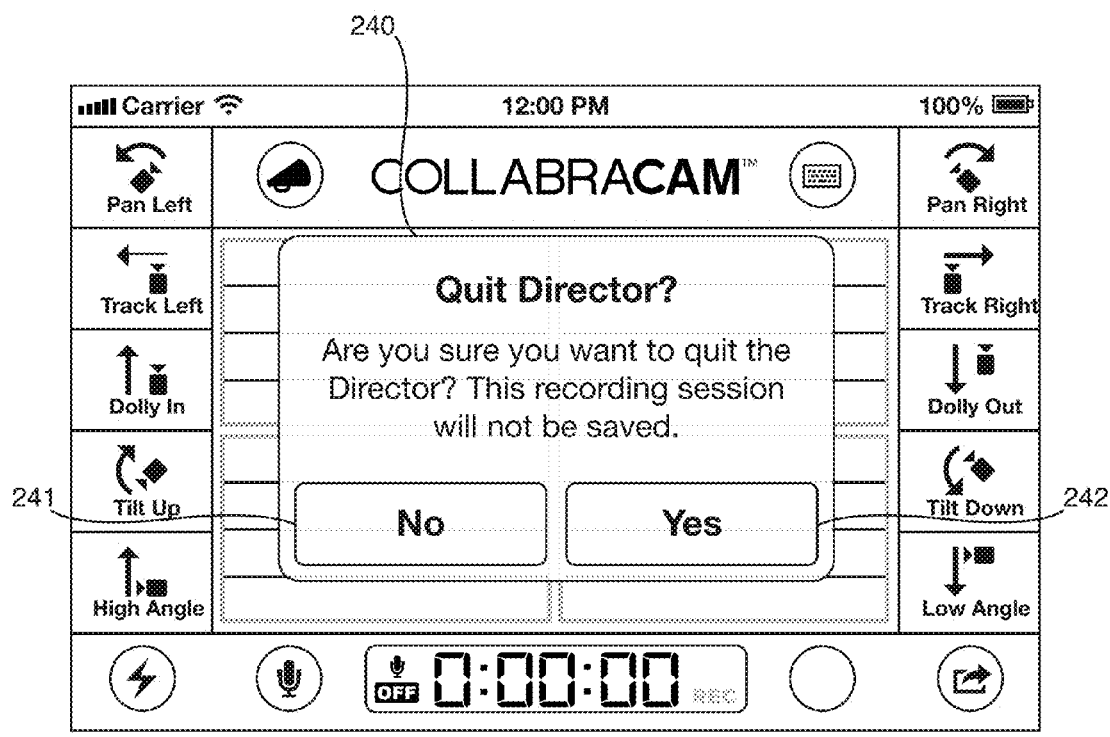
FIG. 15B illustrates a Modal Alert for quitting the Director UI of FIG. 14A.

If a director taps the Action button 235, a Finish Session Action sheet 236 is displayed to the user, as illustrated in FIG. 15A. If the camera operator taps a Cancel button 237, the Action sheet 236 is dismissed from the screen and the user remains in the Director UI 356. If the camera operator taps a Quit Director button 238, the Action sheet 236 is dismissed and a Modal Alert 240 is overlaid on the Director UI 356, as illustrated in FIG. 15B. The Modal Alert 240 questions the director, "Quit Director? Are you sure you want to quit the Director? This recording session will not be saved." If the director taps the No button 241, the Modal Alert 240 is dismissed from the screen and the wireless multi-camera video capture session in progress can be continued. If the director taps the Yes button 242, the session is cancelled without saving, the Director UI 356 is exited and the Home UI 320 or 322 is displayed to the user. If the user taps a Save Session button 239, the session is saved, the Director UI 356 is exited, an asynchronous progress indicator with assembly rate is displayed while the final movie is assembled, as depicted in FIG. 26, and the credits are generated in the background crediting the camera operator as the director and the camera operator. When the final movie assembly is complete, an Individual Session UI 374 is displayed to the camera operator, as depicted in FIG. 27A, which will be described below.

Figure 16:
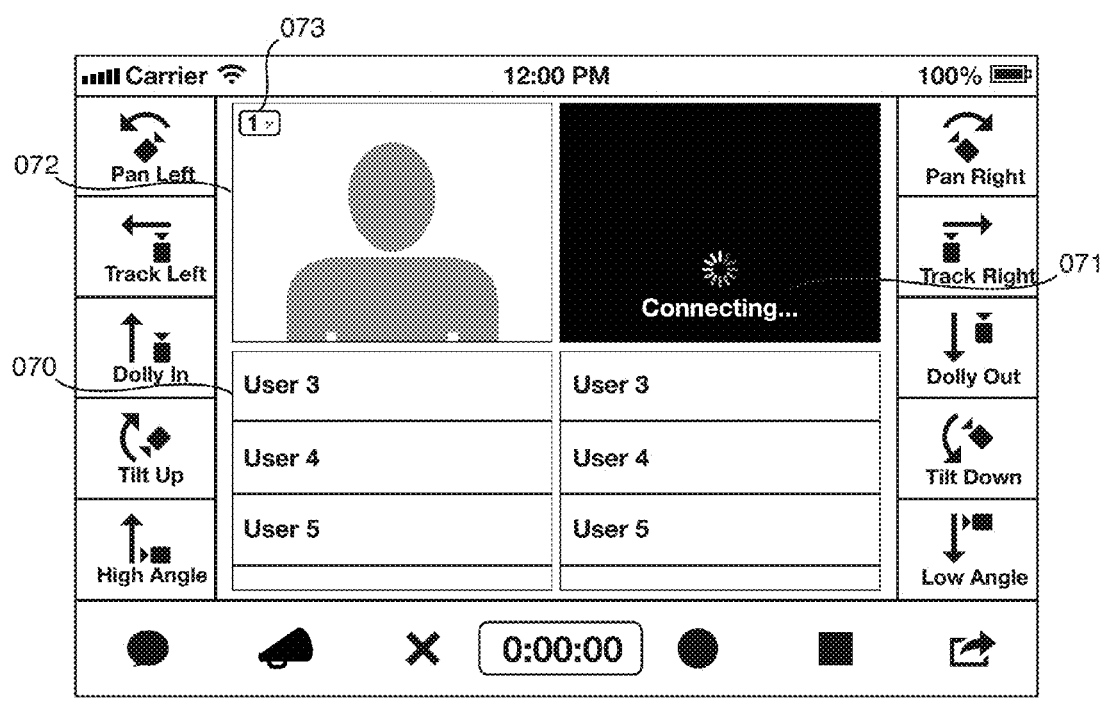
FIG. 16 illustrates the Director UI of FIG. 14 connecting to multiple cameras according to an embodiment of the invention.
Figure 16A:
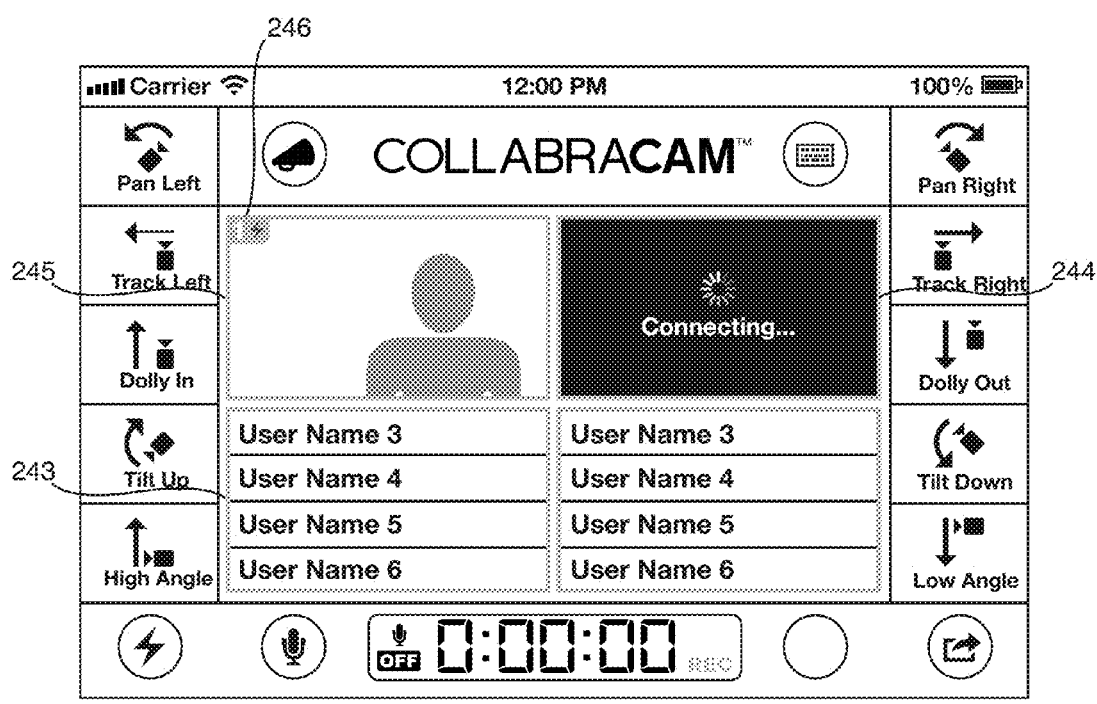
FIG. 16A illustrates the Director UI of FIG. 14A connecting to multiple cameras according to an embodiment of the invention

Initially, the four views in the Director UI 350 each contain list views 049. As the camera devices are discovered by the director's device, as depicted in FIG. 16, the lists are populated with the user names 070 the camera operators input in their Settings UI 017 in FIG. 6. The lists can scroll down to reveal all available camera devices on the network. If the director taps a name in one of the camera view lists, the director's device initiates a connection to the corresponding camera device which has become a broadcast server of video. The user name that was tapped is eliminated from the other camera view lists and the tapped view will change to black and display "Connecting . . . " with an asynchronous progress indicator 071 to inform the director that the connection to the desired camera for the selected view is in progress.

As the director connects to cameras and the video 072 from the camera devices stream into the views, the views become labeled with the Camera Number and Light Indicators 073 in the upper left corner of each camera view. Next to the Camera Number 073 is a lightning bolt icon which notifies the director whether a camera operator's device light is on or off. The Light Indicator 073 (lightning bolt) is transparent black when the camera's light is off and solid black when the light is on.

When the director has connected with the desired camera operator's devices, the users can begin the wireless multi-camera video capture session.

Figure 17:
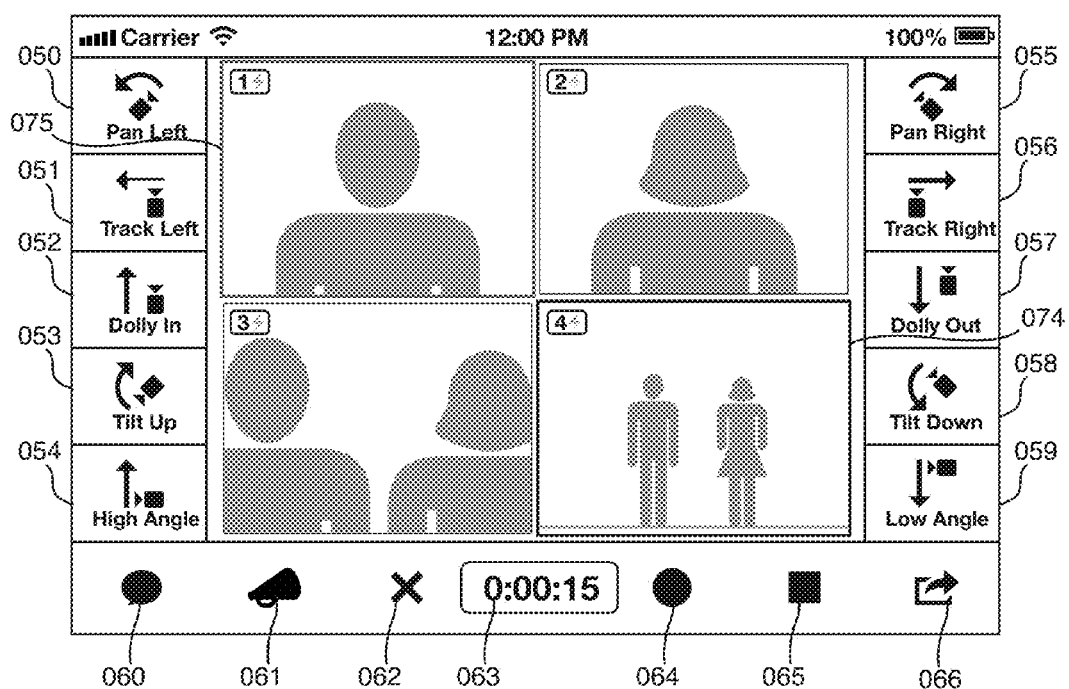
FIG. 17 illustrates the Director UI of FIG. 14 recording video.

Referring now to FIG. 17, the director views real time video streams from the camera operator's devices in the Director UI 350 and the director can transmit an operational command with a custom proprietary client/server protocol over the network, non-limiting examples of which include, initiating video recording on a camera operator's device, stopping video recording on a camera operator's device and triggering a camera operator's device to transfer saved video clips to the director's device in the background automatically once the director switched recording to another camera, as depicted in FIG. 17. If the director taps on one of the four camera views, the camera view becomes highlighted with a blue standby border 075 (thick dark grey border) designating that the corresponding camera operator's device is on standby. If the director taps the Record button 064, the director's device initiates video recording on the standby camera operator's device and the border around the corresponding camera view changes from the blue standby border 075 to the red recording border 074 (thick black border in FIG. 17), designating that the camera operator's device is recording video. As used herein, the recording camera device is considered the live or active camera device and the video captured by the live or active camera device is considered the live or active video feed.

While a camera operator's device is recording, if the director taps another camera view, the camera view becomes highlighted with the blue standby border 075 designating that the corresponding camera operator's device is on standby. If the director taps the Record button 064 again, the recording camera operator's device stops recording video, the red recording border 074 around the corresponding camera view disappears and the camera operator's device transfers the saved video clip to the director's device in the background. In the same instant, the director's device initiates video recording on the standby camera operator's device and the border around the corresponding camera view changes from the blue standby border 075 to the red recording border 074, designating that the camera operator's device is recording video.

If the director taps the Stop button 065, the recording camera operator's device stops recording video and transfers the saved video clip to the director's device in the background. If the director taps the Stop button 065 in an instance when there is a recording camera operator's device but no standby camera operator's device, the corresponding camera view's red recording border 074 reverts to the blue standby border 075. If the director taps the Stop button 065 when there is a recording camera operator's device and a standby camera operator's device, the recording camera view's red border 074 disappears and the standby camera view's blue border 075 is maintained.

Figure 17A:
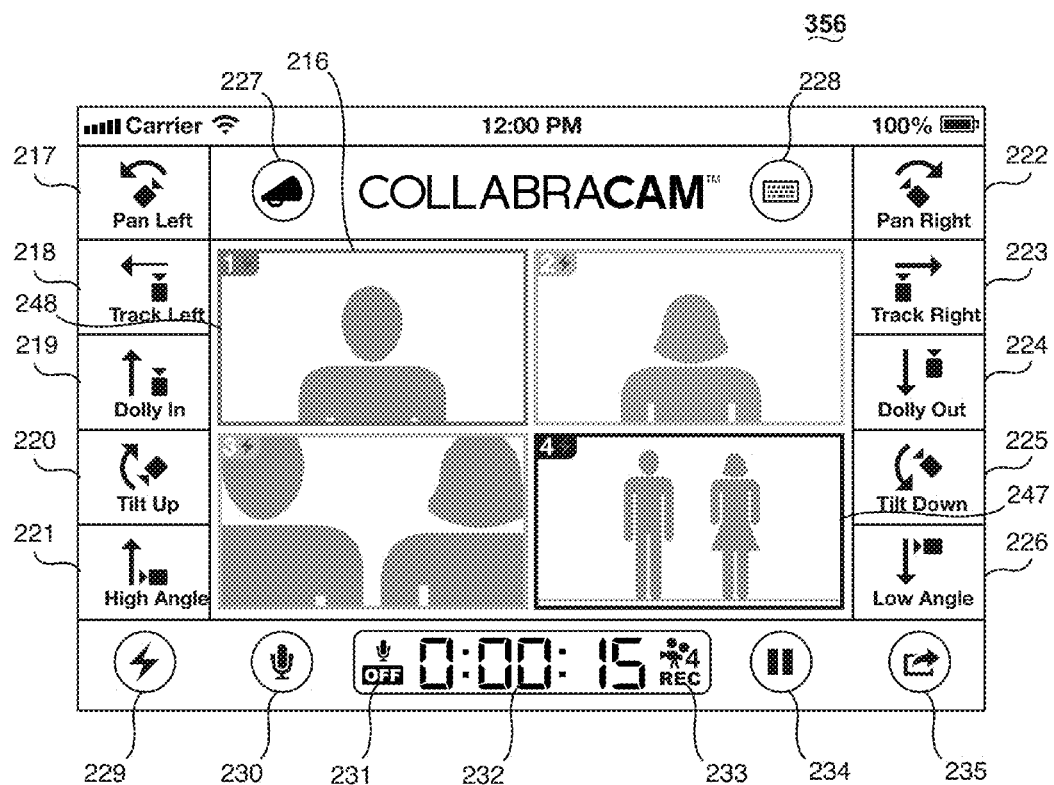
FIG. 17A illustrates the Director UI of FIG. 14A recording video.

As illustrated in FIG. 17A, the director views real time video streams from the camera operator's devices in the Director UI 356, which is similar to the Director UI 350 of FIG. 17, except for some additional functionality to improve user experience, and the director can transmit an operational command with a custom proprietary client/server protocol over the network, non-limiting examples of which include, initiating video recording on a camera operator's device, stopping video recording on a camera operator's device and triggering a camera operator's device to transfer saved video clips to the director's device in the background automatically once the director switched recording to another camera. When the director taps on a camera view, that camera view is highlighted with a blue standby border 248. When the director double taps on the same camera view, that camera view is highlighted with the red recording border 247 to indicate that the video feed from the corresponding camera is the live or active video feed being recorded and the record button toggles to the Pause button. When the user taps on another camera view that view is highlighted with the blue standby border 248. The director can additionally double tap on any camera view to switch cameras or start recording with no recording camera and forgo putting the camera on standby if necessary. It is not necessary for the director to use the record button although it can be used to start recording on a standby camera if desired, but it is necessary to tap the pause button to pause recording. If live streaming while recording, the pause button will not pause the broadcast of the live stream, but will pause the recording.

Figure 18:
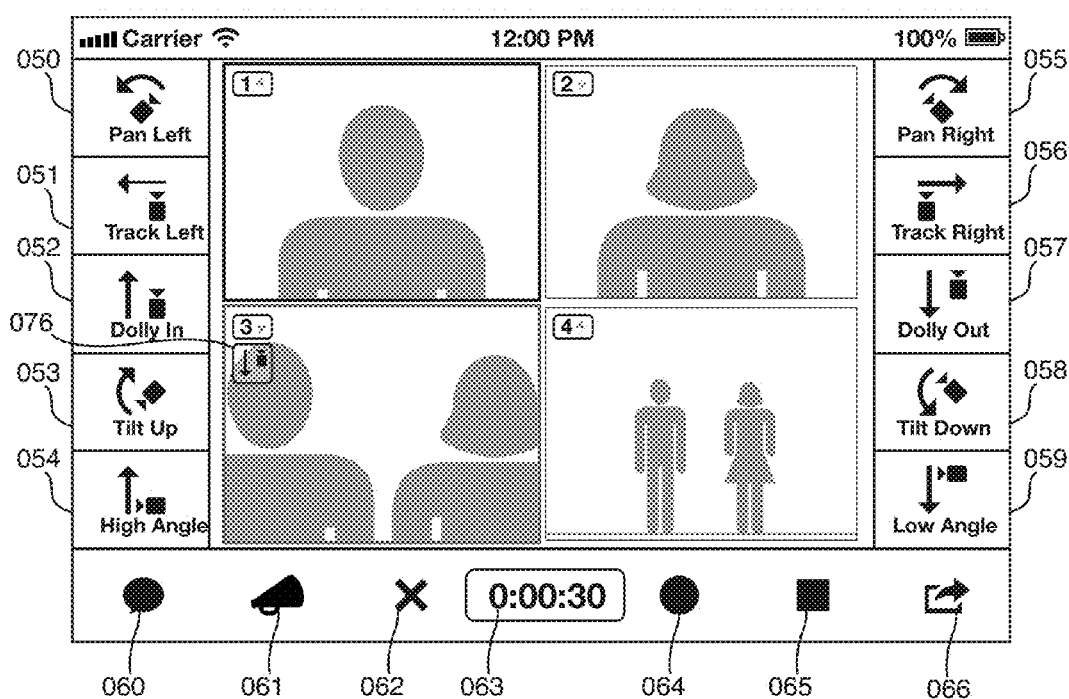
FIG. 18 illustrates the Director UI of FIG. 14 sending icon communication.
Figure 19:
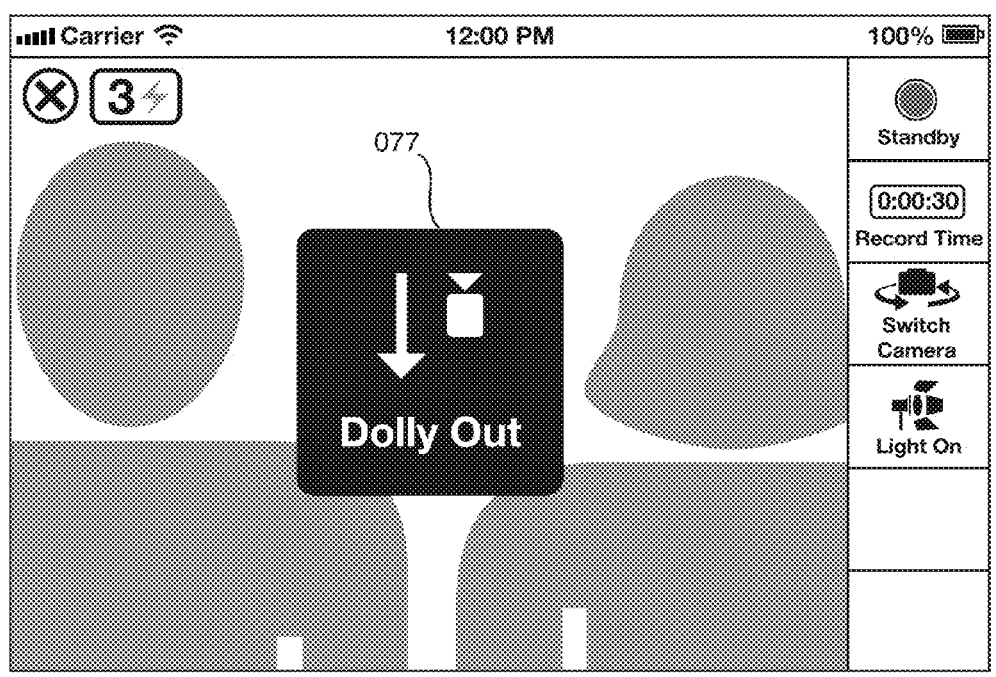
FIG. 19 illustrates the Camera UI of FIG. 9 receiving icon communication according to an embodiment of the invention.

During a multi-camera video capture session the director has multiple options for communicating operational instructions to the camera operators. The first method for communication is for the director to trigger the display of a camera move or angle request icon to a camera operator, as depicted in FIG. 18. If the director taps a camera view and then taps one of the communication buttons on either side of the Director UI 350, such as the Dolly Out button 057. The director's device triggers the camera operator's device of the tapped camera view, as depicted in FIG. 19, to temporarily display the same Dolly Out icon 077 as the tapped button overlaid on the video display of the corresponding camera operator's device and the director is given feedback that the communication icon display to the camera operator's device was triggered with the same communication icon 076 as the tapped button temporarily displayed overlaid on the corresponding camera view in the Director UI 350.

Figure 18A:
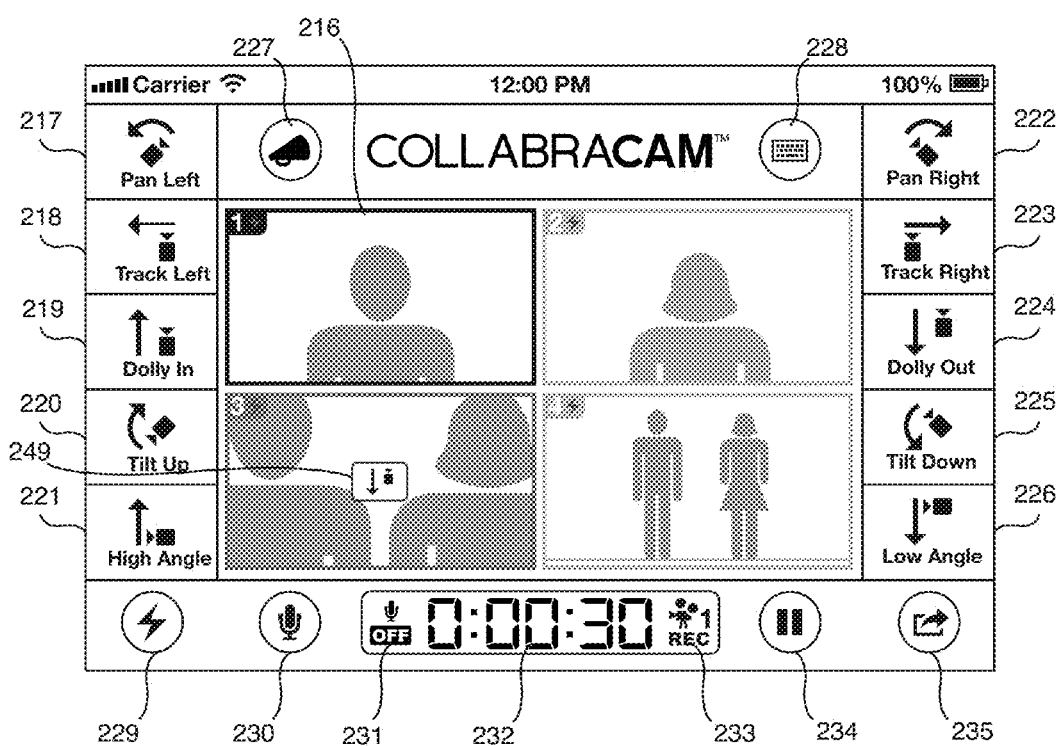
FIG. 18A illustrates the Director UI of FIG. 14A sending icon communication.
Figure 19A:
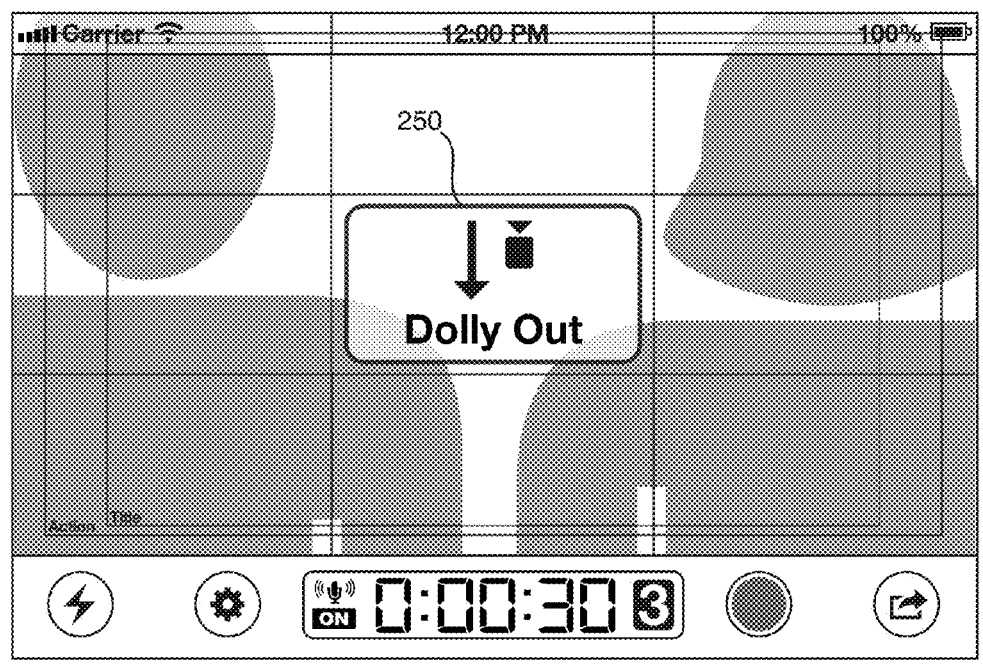
FIG. 19A illustrates the Camera UI of FIG. 9A receiving icon communication according to an embodiment of the invention.

Similarly, the director can communicate operational instructions to the camera operators in the Director UI 356, as illustrated in FIG. 18A. The director can tap on one of the silent communication buttons and the button, such as the Dolly Out button 224, becomes highlighted and remains highlighted until the director taps a camera view to send the communication. The director can tap any camera regardless of standby or recording status. The director can also tap the communication button that is highlighted to disable it or if the director taps any other button before tapping a camera view, the button is disabled. While in communication mode with a silent communication button highlighted the next single tap on a camera would not put that camera on standby it would only trigger display of the communication icon. The director's device triggers the camera operator's device of the tapped camera view, as depicted in FIG. 19A, to temporarily display the same Dolly out icon 249 as the tapped button overlaid on the video display of the corresponding camera operator's device and the director is given feedback that the communication icon display to the camera operator's device was triggered with the same communication icon 249 as the tapped button temporarily displayed overlaid on the corresponding camera view in the Director UI 356. The director is free to start recording to the camera device when the director sees the camera operator initiate or complete the camera move or angle requested in the corresponding camera view.

Figure 20:
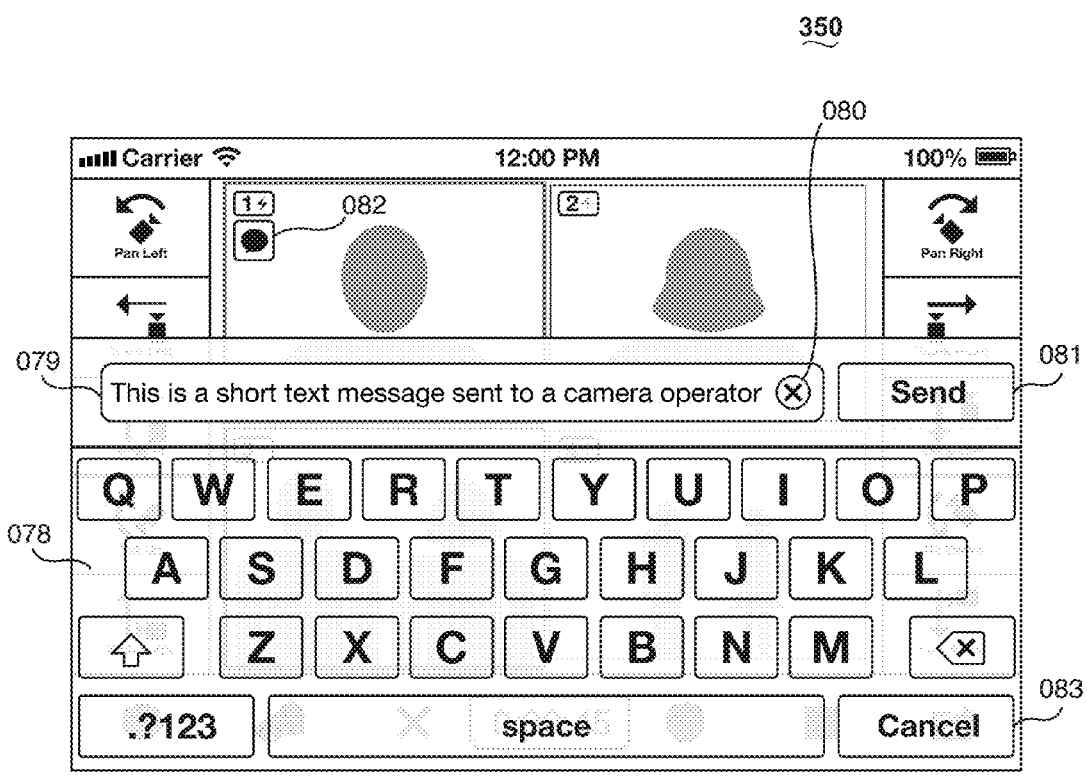
FIG. 20 illustrates the Director UI of FIG. 14 sending text message communication according to an embodiment of the invention.

The second method for communication is for the director to send a camera operator a short text message, as depicted in FIG. 20. If the director taps a camera view and then taps on the Message button 060, a keyboard 078, as illustrated in FIG. 20, is overlaid on the screen to facilitate text entry with an accompanying Message text field 079 which also contains a Delete Button 080 within the Message text field 079 and a Send button 081. If the director has input text with the keyboard 078 and then taps the Send button 081, the keyboard 078 is dismissed from the screen and the director is displayed feedback that the text message was sent to the camera operator's device with the Message icon 082 temporarily displayed overlaid on the corresponding camera view in the Director UI 350 under the camera number.

Figure 21:
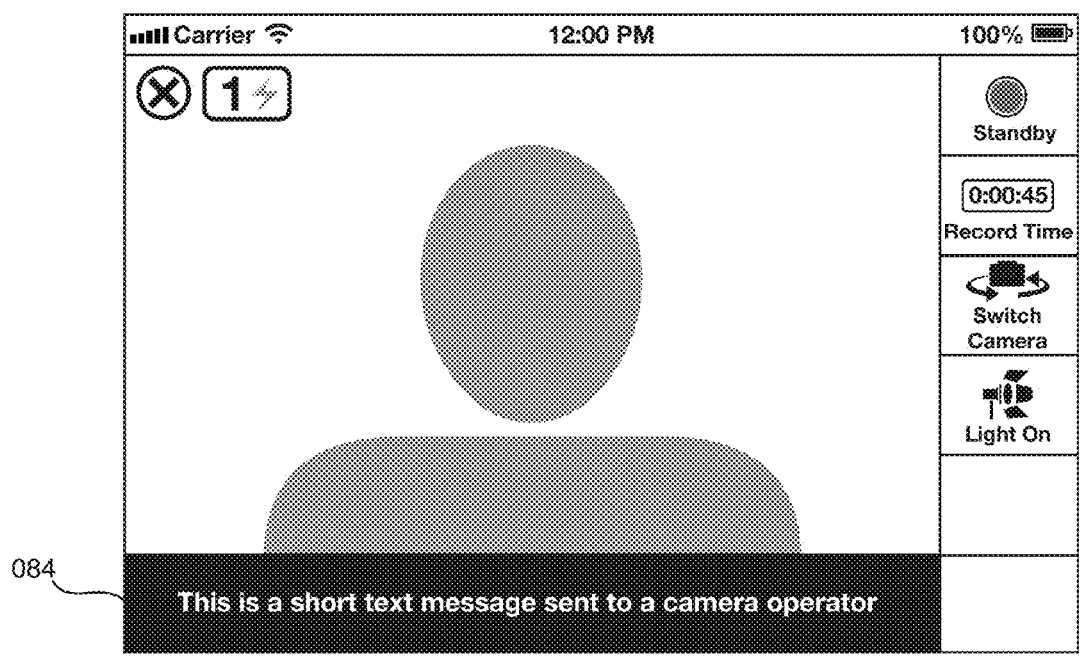
FIG. 21 illustrates the Camera UI of FIG. 9 receiving text message communication according to an embodiment of the invention.

The text input by the director in the Message text field 079 is sent to a camera operator's device, as depicted in FIG. 21, and the Text Message 084 is temporarily displayed in the lower portion of the corresponding camera operator's video display. If the director begins to type a message and is unsatisfied with what has been typed, the director can tap the Delete button 080 (FIG. 20) to delete all text in the text field 079 and start over. If the director wants to quit the text message before sending to the selected camera view, the director can tap the Cancel Button 083 (FIG. 20) to dismiss the keyboard 078 without sending a text message. If the director wants to communicate with the recording camera device's operator and taps the camera view with the red recording border 074 while there is a camera operator's device on standby, the blue standby border 075 disappears from the standby camera view and the corresponding camera operator's device is no longer on standby.

Figure 20A:
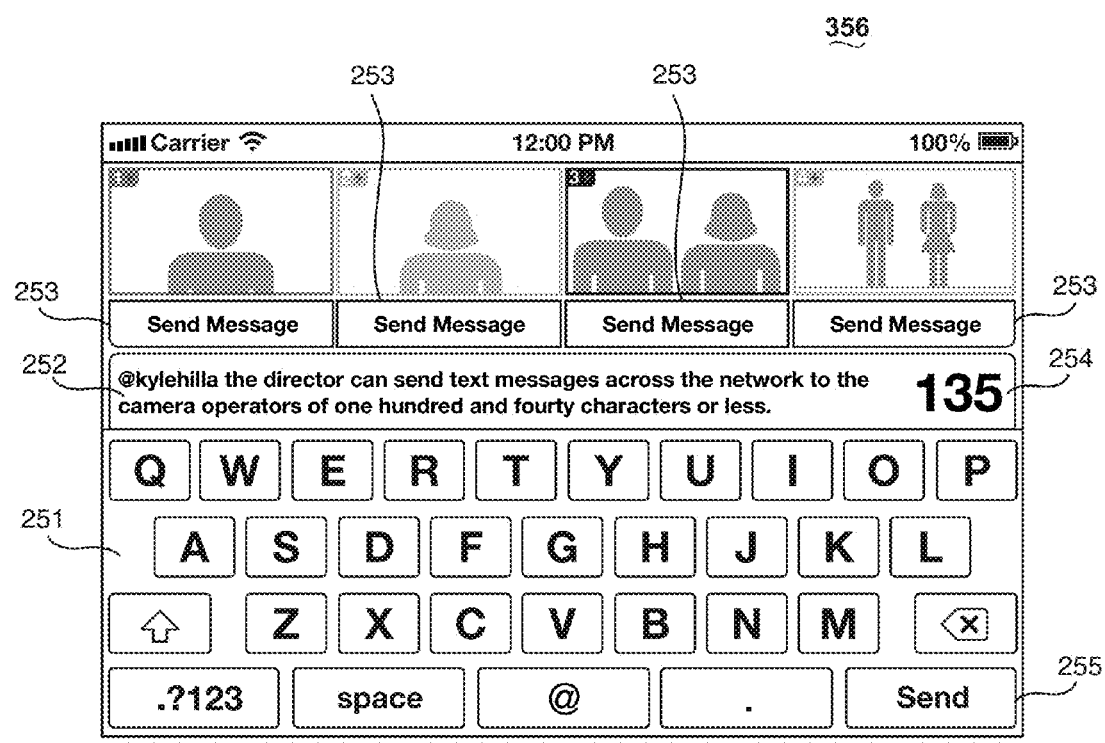
FIG. 20A-B illustrates the Director UI of FIG. 14A sending text message communication according to an embodiment of the invention.
Figure 20B:
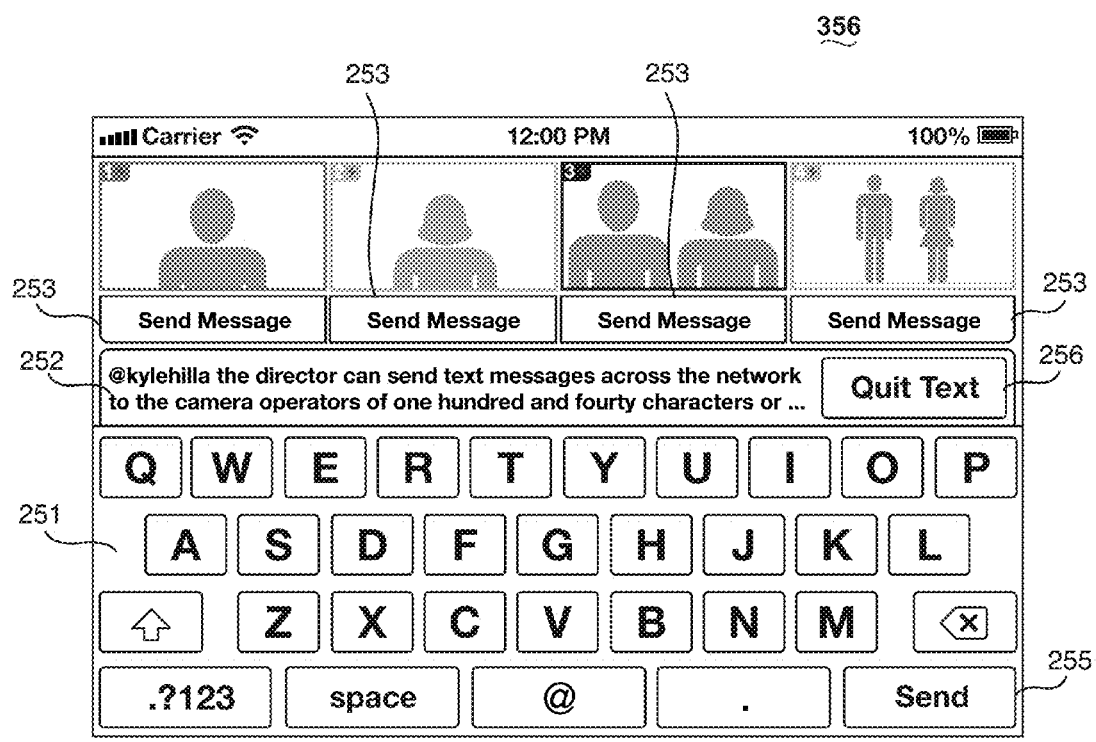

Referring again to FIG. 14A, when the director taps the keyboard button 228, the Director UI 356 enters text communication mode and a keyboard 251 is overlaid on the Director UI 356, as illustrated in FIG. 20A. The director can continue to switch cameras while in this mode, but does not have access to other features. The director can type in a message of up to one hundred and forty characters into a Text Field 252. The director can tap and highlight one or more of the camera Send Message buttons 253. The director can tap the send message button that is highlighted to disable sending the message to the corresponding camera operator. If the director taps on the Character Count 254 all of the text input into the text field 252 is deleted so the director can start over quickly. When the director taps the Send button 255 on the keyboard 251, the message is sent to the desired cameras. When the director wants to quit text communication mode, the director can swipe in the text field to reveal a Quit Text button 256, as illustrated in FIG. 20B and tap the Quit Text 256 button to exit text communication mode.

Figure 21A:
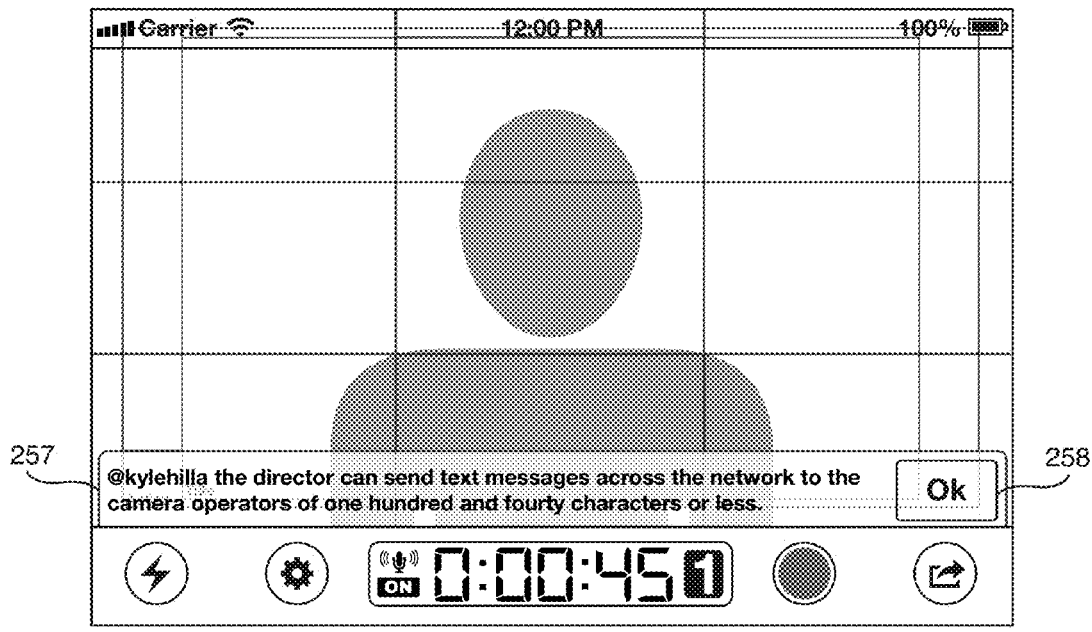
FIG. 21A illustrates the Camera UI of FIG. 9A receiving text message communication according to an embodiment of the invention.

The text input by the director in the text field 252 is sent to a camera operator's device and the Text Communication 257 is temporarily displayed in the lower portion of the corresponding camera operator's video display, as illustrated in FIG. 21A. There is also an Ok button 258 to dismiss the message faster than it automatically disappears.

Figure 22:
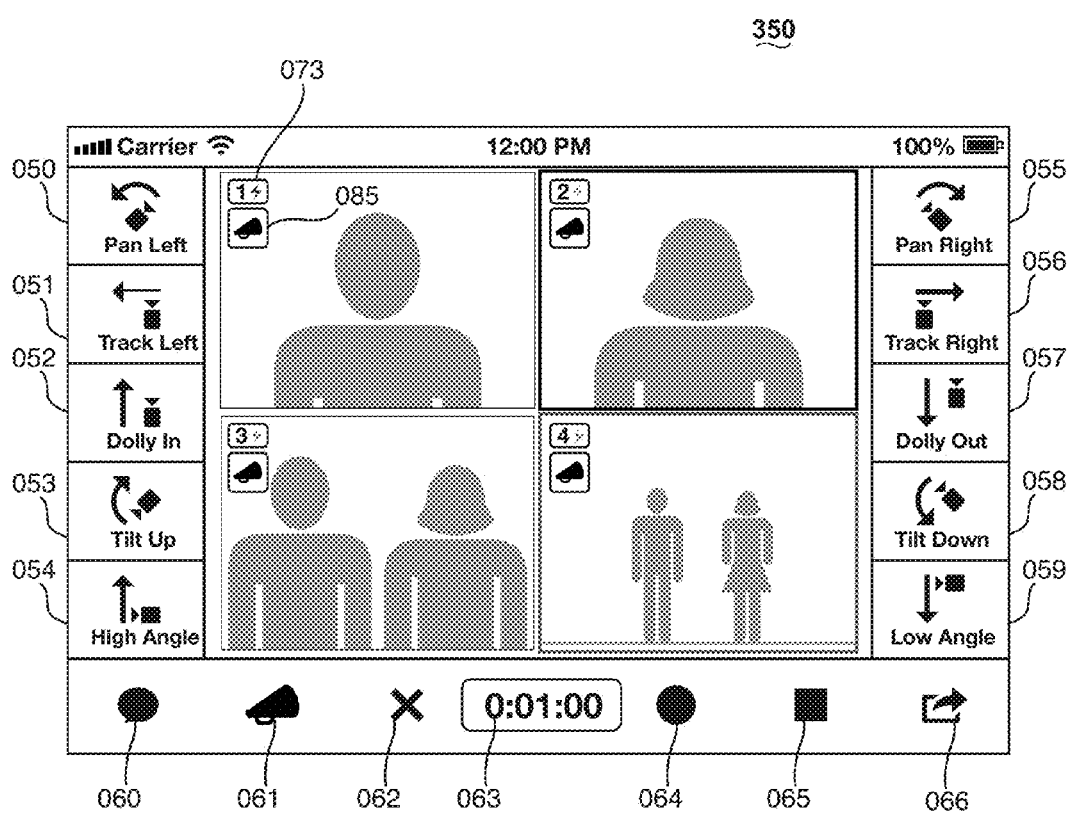
FIG. 22 illustrates the Director UI of FIG. 14 sending audible communication according to an embodiment of the invention.

The third method for communication is for the director to communicate to all camera operators vocally by transmitting the director's voice through the director device's microphone to the camera operators through the camera operators' devices' earphones, as depicted in FIG. 22. This method allows the director to communicate vocally to all camera operators at once, regardless of recording or standby status. A camera operator without earphones plugged in to the camera operator's device will not receive transmission of the director's voice because transmission of the director's voice through a camera operator's device speaker could possibly disrupt the audio of the video being captured.

Figure 23:
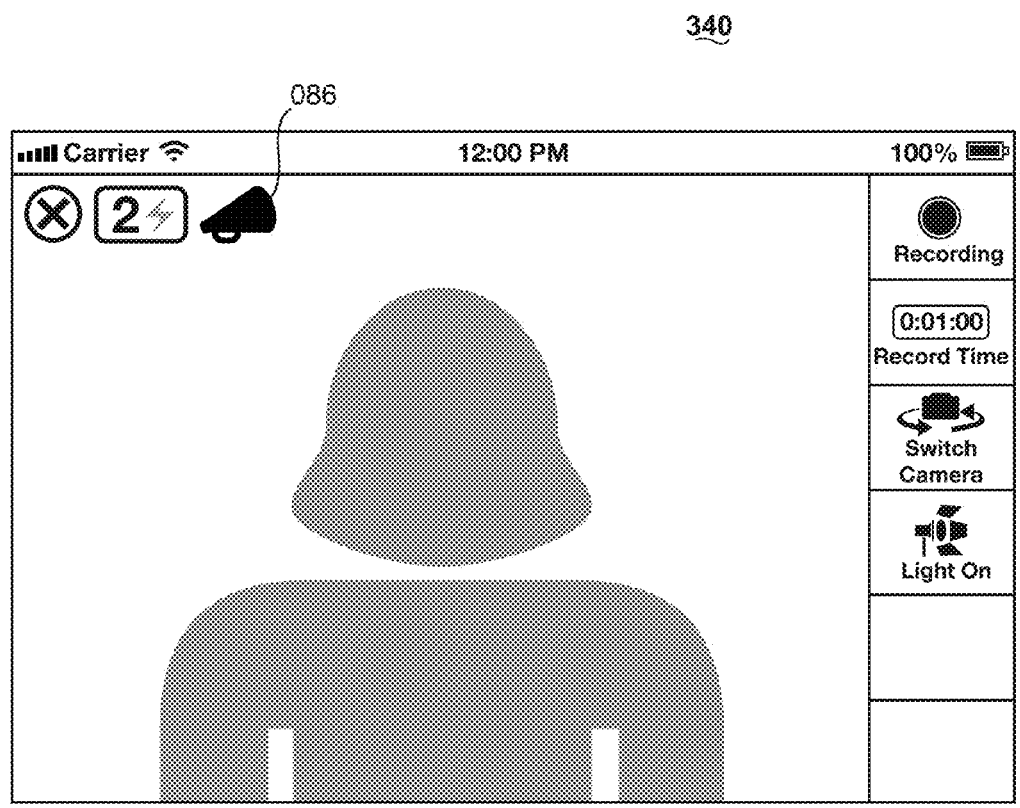
FIG. 23 illustrates the Camera UI of FIG. 9 receiving audible communication according to an embodiment of the invention.
Figure 23A:
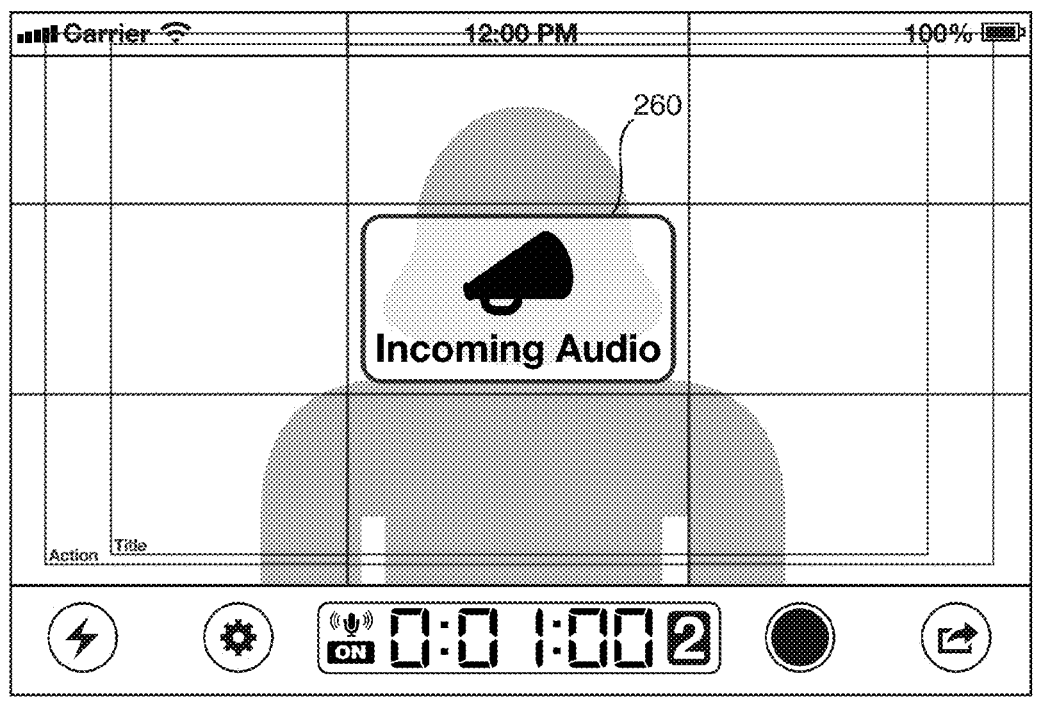
FIG. 23A illustrates the Camera UI of FIG. 9A receiving audible communication according to an embodiment of the invention.

If the director taps the Megaphone button 061, the director's device microphone is open to all camera operators' devices and the director's voice is transmitted to the camera operators through the camera operators' device's earphones. While vocal communication is in progress, as feedback to the director that the director's microphone is open and the director's voice is being transmitted to the camera operators, the Megaphone icon 085 is temporarily displayed overlaid on all camera views in the Director UI 350 under the camera numbers. In the Camera UI 340, as depicted in FIG. 23, The Megaphone icon 086 is temporarily displayed to the camera operators adjacent to the camera number to inform the camera operators that vocal communication from the director is in progress. If the director wants to end vocal communication to the camera operators, the director must tap the Megaphone button 061 again to close the director device's microphone and end voice transmission to the camera operators. Once the vocal communication is ended by the director the Megaphone icons 085 and 086 disappears from the Director UI 350 and the Camera ills 340.

Figure 22A:
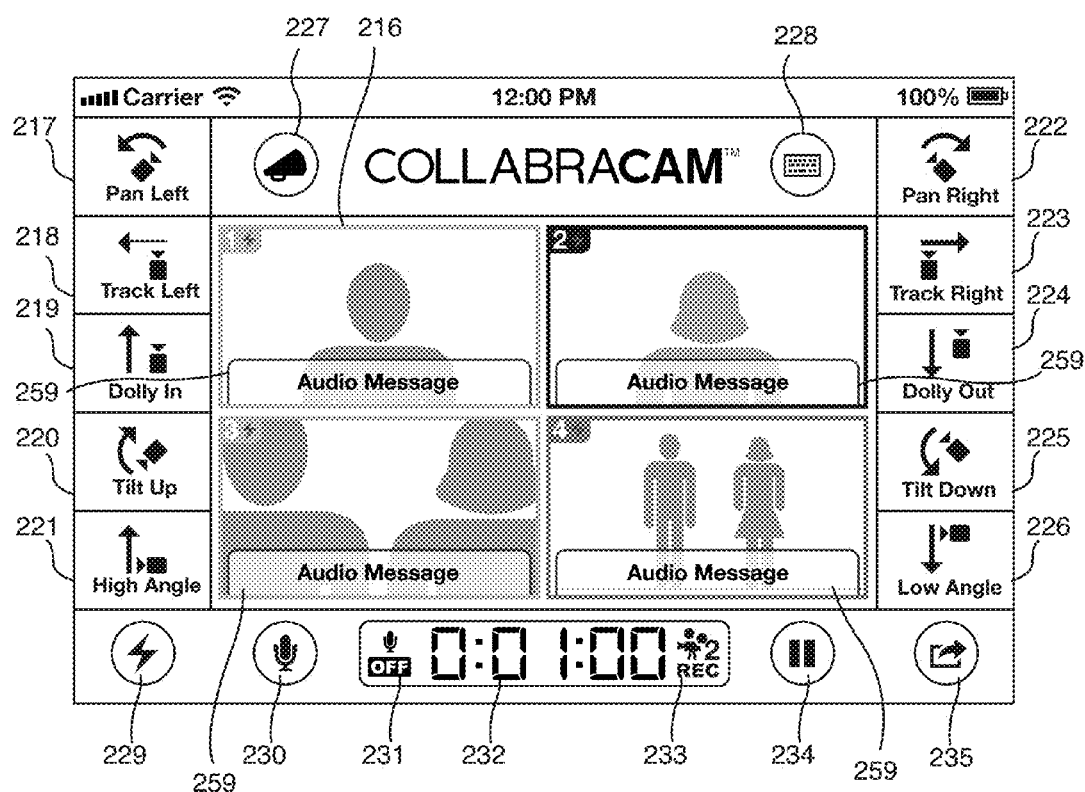
FIG. 22A illustrates the Director UI of FIG. 14A sending audible communication according to an embodiment of the invention.

Referring now to FIG. 22A, when the director taps the Megaphone button 227 an Audio Communication mode is enabled and the Megaphone button 227 becomes highlighted and remains highlighted until the director taps the Megaphone button 227 again to disable Audio Communication mode. The director can continue to switch cameras while in this mode and perform other actions but if the Keyboard button 228 is tapped, Audio Communication mode is disabled. The director can tap and highlight one or more of a camera Audio Message button 259 to give vocal commands to the camera operators. The director can tap an Audio Message button 259 that is highlighted to disable audio messaging to the corresponding camera operator. If the director is currently recording voice-over audio and taps the Megaphone button 227, the voice-over audio recording is paused until the director disables Audio Communication mode. A camera operator can only receive audio communication from the director if wearing earphones.

Figure 25:
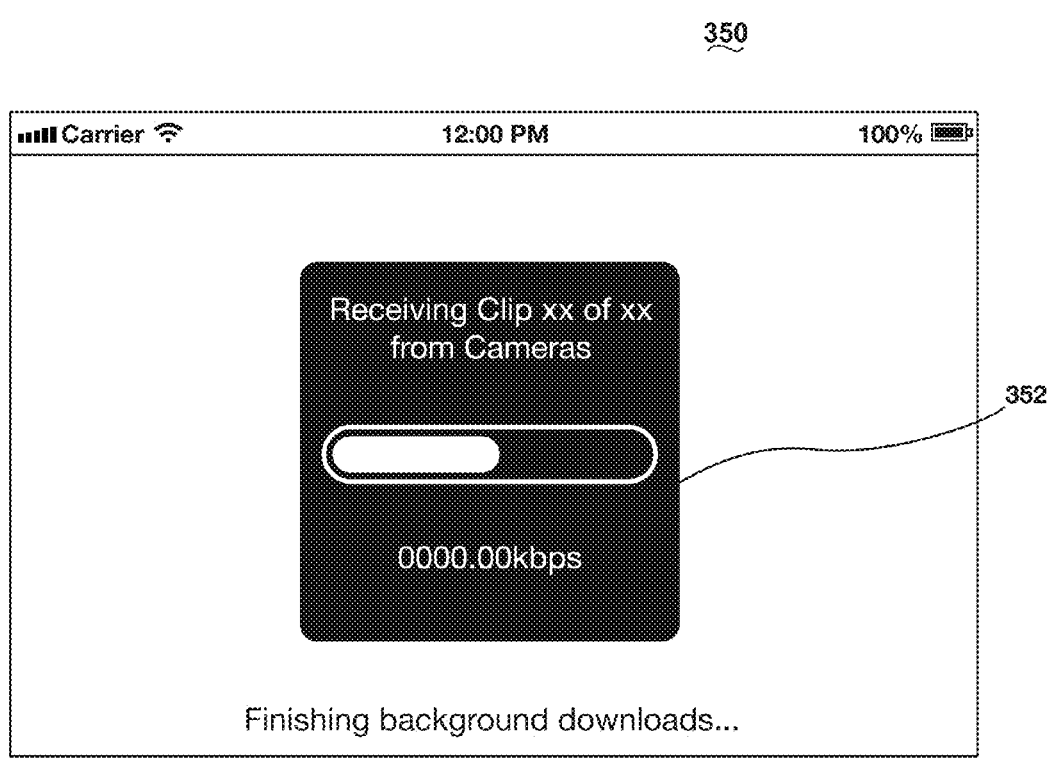
FIG. 25 illustrates the progress of the transfer of any remaining video clips from camera devices to the director's device.

Referring again to FIG. 14, when the director chooses to end a multi-camera video capture session in progress, the director must tap the Action button 066, to save the session. If the director taps the Action button 066, an Action Sheet 087, as depicted in FIG. 24, is overlaid on the Director UI 350. The Action Sheet 087 labeled "Finish Session" contains two buttons, a Cancel button 088 and a Save Session button 089. If the director taps the Cancel button 088, the Action Sheet 087 is dismissed from the screen and the director can continue the multi-camera video capture session in progress. If the director taps the Save Session button 089 the multi-camera video capture session is ended, the Director UI 350 is exited, any remaining video clips are transferred from the camera operator's devices to the director's device, and a progress bar 352 with transfer rate is displayed to a user, as depicted in FIG. 25. When the background downloads are finished, an asynchronous progress indicator 354 with assembly rate is displayed while the final movie is assembled, as depicted in FIG. 26, and the credits are generated in the background. When the final movie assembly is complete the Individual Session UI 348 of the multi-camera video capture session is displayed to the director, as depicted in FIG. 27.

After the director of a multi-camera production or the camera operator of a solo-camera production has ended a video capture session, the Individual Session UI 348, as depicted in FIG. 27, is displayed to a user. The Individual Session UI 348 contains a movie player with a Play icon 092 overlaid on the video. There is a Navigation bar at the top of the screen which contains the title of the session entered in the Title and Copyright UI 020 (FIG. 7), a Sessions button 090 and a Resume Session button 091. The Individual Session UI 348 has a Tool bar at the bottom of the screen with an Export Movie button 093, an Export Clips button 094 and an Action button 095.

Figure 28:
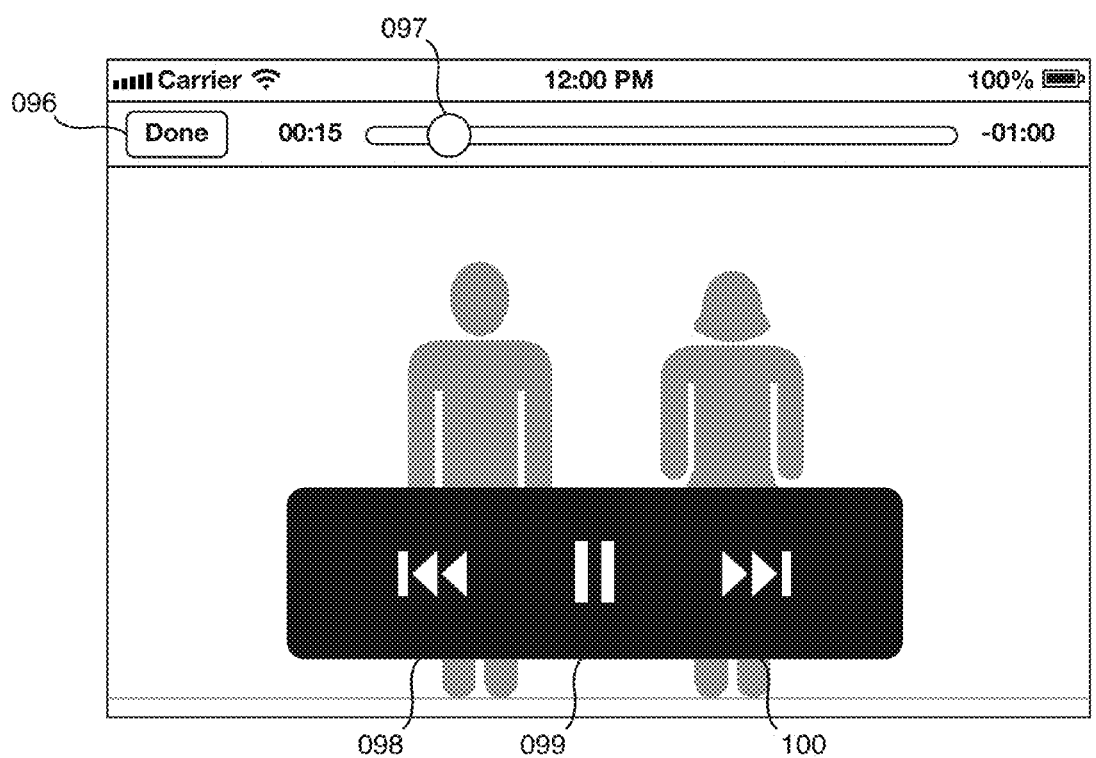
FIG. 28 illustrates a Movie Player UI according to an embodiment of the invention.

When a user taps the Play icon 092 in the Individual Session UI 348, a Movie Player UI 358, as depicted in FIG. 28, is displayed to a user. There is a Navigation bar at the top of the screen which contains a Done button 096 and the Timeline 097. If a user taps the Done button 096, the Movie Player UI 358 is exited and the Individual Session UI 348 is displayed to a user. When the Movie Player is displayed to a user the movie automatically starts playing. There are buttons temporarily displayed overlaid on the screen which are, a Rewind button 098, a Pause/Play button 099 and a Fast Forward button 100. If the buttons disappear from the screen a user can tap the screen and the buttons will again be temporarily displayed.

If a user taps the Pause/Play button 099 while the movie is playing, the movie will pause and the button which is initially a Pause button changes to a Play button. If a user taps the Play button, the movie begins playing again and the button reverts to the Pause button. If a user taps the Rewind button 098, the movie playback goes back to the first frame and the button in the Timeline 097 goes back to the start. If a user taps the Fast Forward button 100, the movie playback goes forward to the last frame and the button in the Timeline 097 goes to the end. The Timeline 097 displays the length of time the movie has played on the left and the time remaining on the right. If a user wants to play the movie at a specific time, a user can tap and drag the button in the Timeline 097 to any specific point. When a user "scrubs" the Timeline in this manner, the movie is paused and a user can tap play to start movie play back again. A user can tap the Done button 096 to exit the Movie Player UI 358 and the Individual Session UI 348 is displayed to a user.

Figure 29:
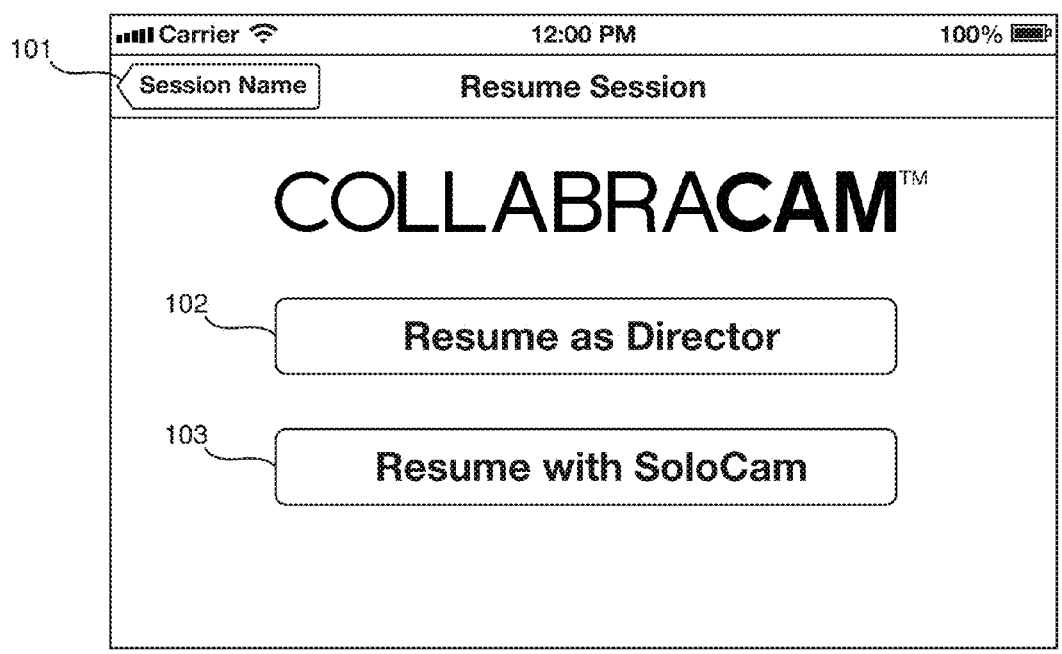
FIG. 29 illustrates a Resume Session UI according to an embodiment of the invention.

Referring again to FIG. 27, when a user chooses to resume a session and taps the Resume Session button 091, a Resume Session UI 360, as depicted in FIG. 29, is displayed to a user. There is a Navigation bar at the top of the screen which contains a button with a session name 101. The Resume Session UI 360 contains two buttons, a Resume as Director button 102 and a Resume with SoloCam button 103. If a user taps the button 101 with the session name, the Resume Session UI 360 is exited and the Individual Session UI 348 is displayed to a user. If a user taps the Resume as Director button 102, the Director UI 350 is displayed to a user and the user can resume the session as the director of a multi-camera video capture session, as previously described. If a user taps the Resume with SoloCam button 103, the Camera UI in Solo-Camera Production mode 342 is displayed to a user and the user can resume the session as the camera operator of a solo-camera video capture session, as previously described. When a resumed session is ended and the final movie is assembled, the credits are regenerated to include the previous session's users and the resumed session's users to reflect any change to the credits if new users participate in the resumed session.

Figure 30:
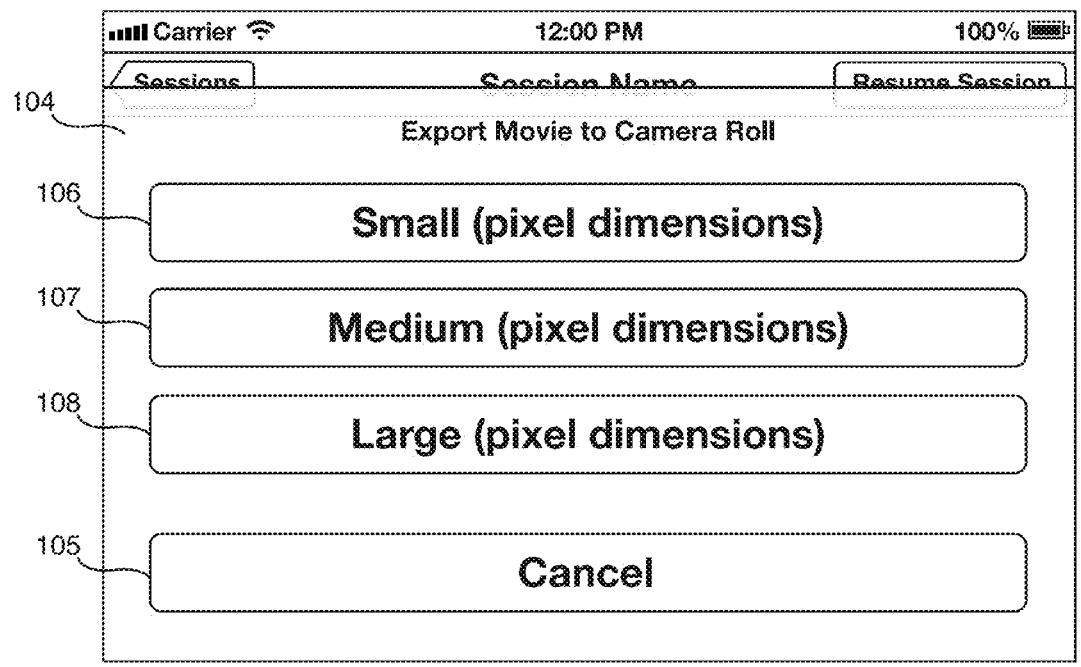
FIG. 30 illustrates the Individual Session UI of FIG. 27 with an Action Sheet for exporting a movie according to an embodiment of the invention.
Figure 31:
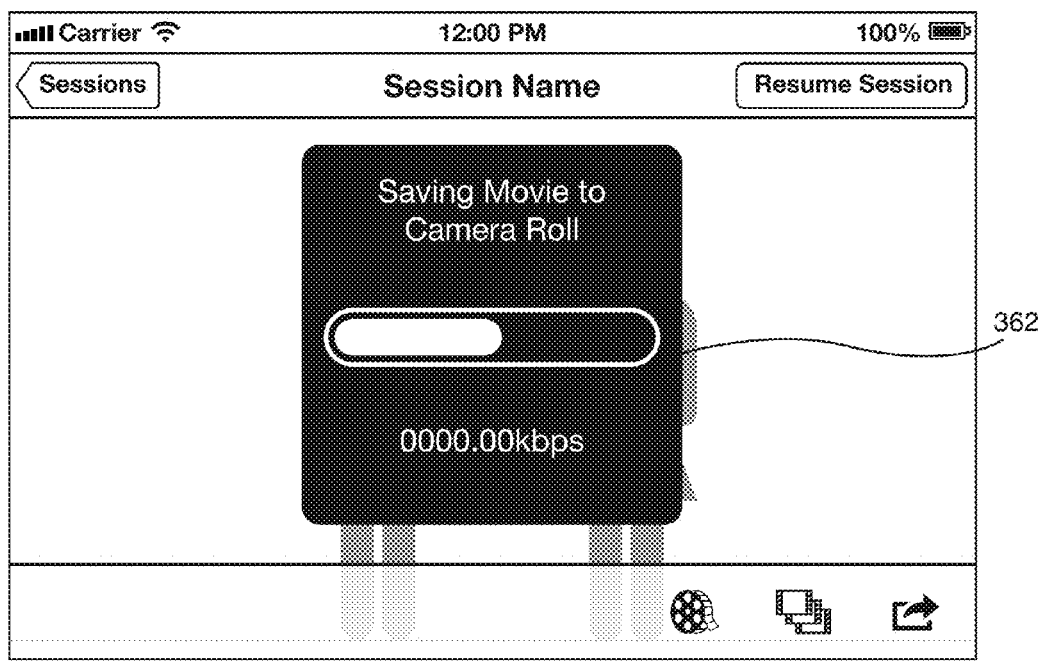
FIG. 31 illustrates the progress of the export of a movie.
Figure 32:
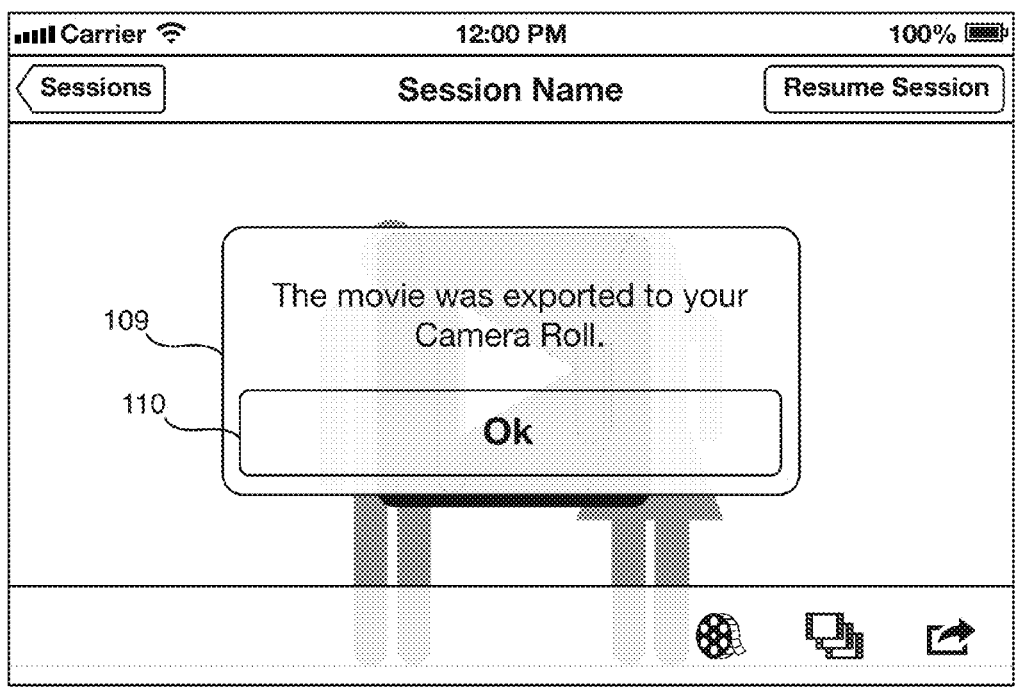
FIG. 32 illustrates a Modal Alert of an exported movie.

Referring again to FIG. 27, when a user chooses to export the session as a movie, a user must tap the Export Movie button 093, and an Action Sheet 104 is overlaid on the Individual Session UI 348, as depicted in FIG. 30. The Action Sheet 104 contains a Cancel button 105, a Small button 106, a Medium button 107 and a Large button 108. Each button 105-107 will display the pixel dimensions of the size of the video to be exported. The Large button 108 exports the movie at the captured pixel dimensions. The Medium button 107 and Small button 106 export the movie at pixel dimensions less than the captured pixel dimensions. If a user taps the Cancel button 105, the Action Sheet 104 is dismissed from the screen. If a user taps one of the export movie size buttons 106-108, the movie is exported from the application to the default device storage area for movies in the movie size indicated by the button tapped, and a progress bar 362 with export rate is displayed to a user, as depicted in FIG. 31. When the export is complete, a Modal Alert 109 is overlaid on the Individual Session UI 348, as depicted in FIG. 32. The Modal Alert 109 states, "The movie was exported to your Camera Roll." If the user taps the Ok button 110, the Modal Alert 109 is dismissed from the screen.

Figure 33:
FIG. 33 illustrates the Individual Session UI of FIG. 27 with an Action Sheet for exporting video clips according to an embodiment of the invention.
Figure 34:
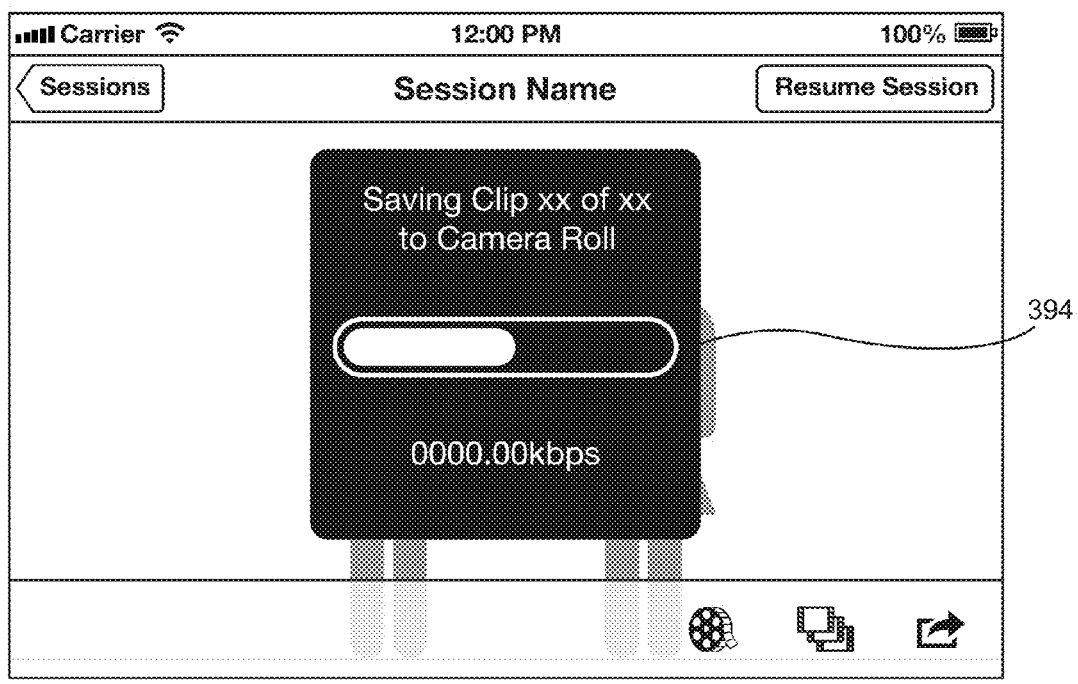
FIG. 34 illustrates the progress of the export of video clips.
Figure 35:
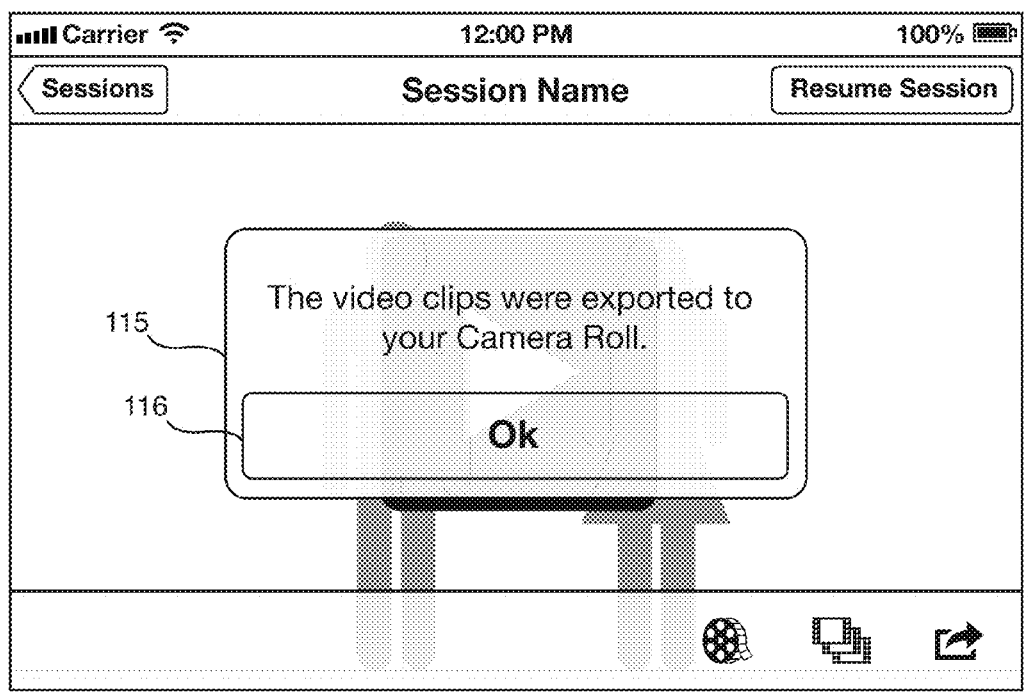
FIG. 35 illustrates a Modal Alert of exported video clips.

Referring back again to FIG. 27, when a user chooses to export the session as video clips, a user can tap the Export Clips button 094, and an Action Sheet 111 is overlaid on the Individual Session UI 348, as depicted in FIG. 33. The Action Sheet 111 contains three buttons, a Cancel button 112, an Export All Clips button 113 and an Export New Clips button 114. If a user taps the Cancel button 112, the Action Sheet 111 is dismissed from the screen. When video clips are exported, the clips are exported at the captured pixel dimensions. The Export All Clips button 113 exports all video clips from the session. The Export New Clips button 114 exports only the new clips captured in a resumed session. When a user taps one of the export clips buttons, the video clips are exported from the application to the device's storage area for movies, and a progress bar 394 with export rate is displayed to a user, as depicted in FIG. 34. When the export is complete, a Modal Alert 115 is overlaid on the Individual Session UI 348, as depicted in FIG. 35. The Modal Alert 115 states, "The video clips were exported to your Camera Roll." If the user taps the Ok button 116, the Modal Alert 115 is dismissed from the screen.

Figure 36:
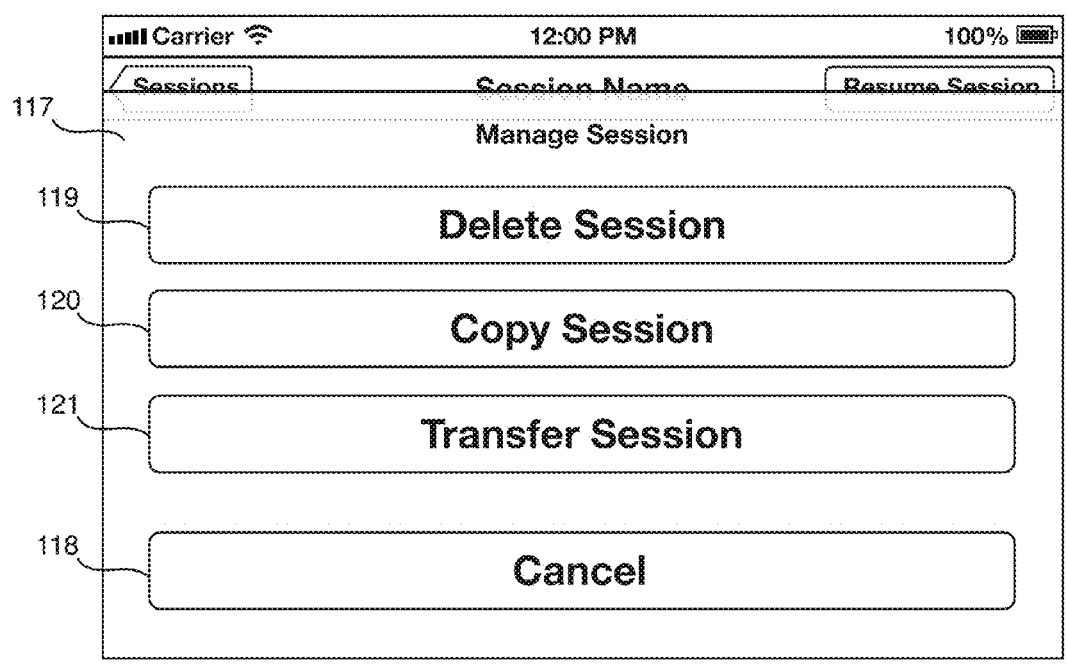
FIG. 36 illustrates the Individual Session UI of FIG. 27 with an Action Sheet for managing a session.
Figure 37:
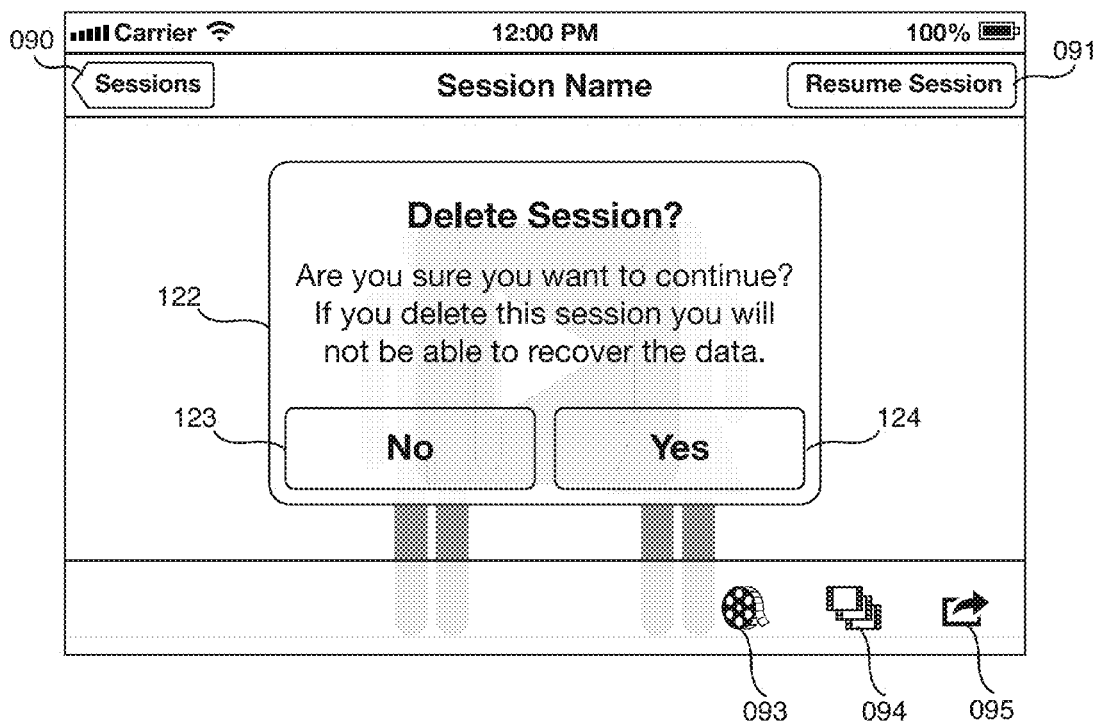
FIG. 37 illustrates a Modal Alert for deleting a session.
Figure 42:
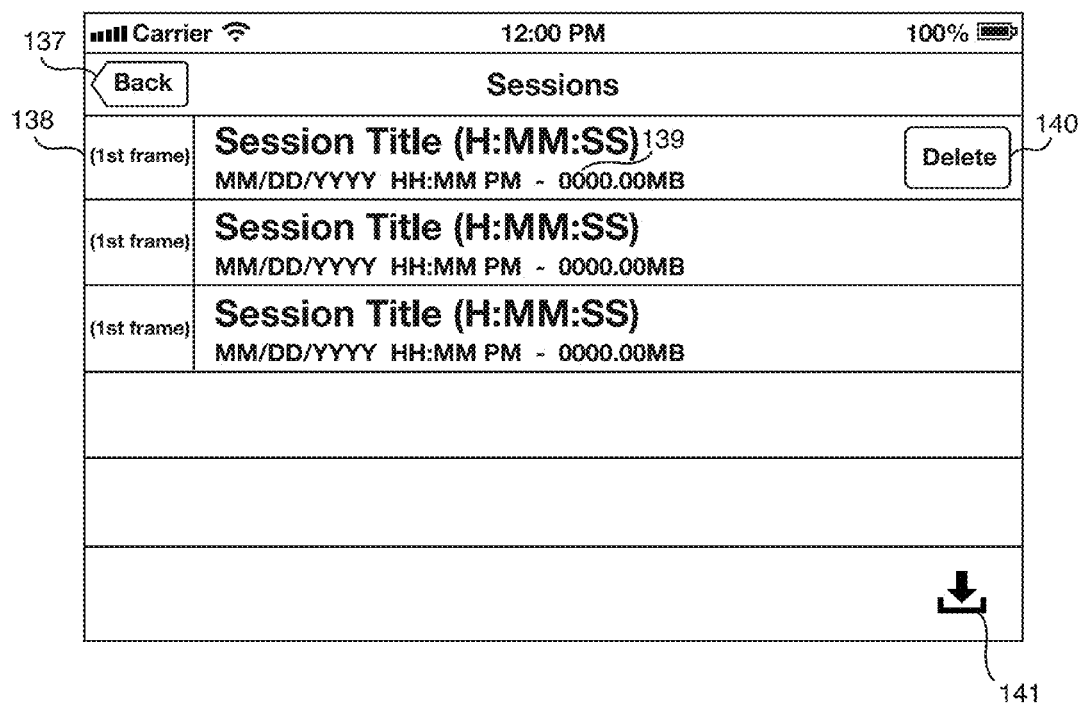
FIG. 42 illustrates a Session UI according to an embodiment of the invention.

Referring back again to FIG. 27, when a user chooses to manage the data of a session, a user can tap the Action button 095, and an Action Sheet 117 is overlaid on the Individual Session UI 348, as depicted in FIG. 36. The Action Sheet 117 contains four buttons: a Cancel button 118, a Delete Session button 119, a Copy Session button 120 and a Transfer Session button 121. If a user taps the Cancel button 118, the Action Sheet 117 is dismissed from the screen. If a user taps the Delete Session button 119, the Action Sheet 117 is dismissed from the screen and a Modal Alert 122 is overlaid on the Individual Session UI 348, as depicted in FIG. 37. The Modal Alert 122 questions a user, "Delete Session? Are you sure you want to continue? If you delete this session you will not be able to recover the data." The Modal Alert 122 contains a No button 123 and a Yes button 124. If a user taps the No button 123, the Modal Alert 122 is dismissed from the screen and the data of the session remains. If a user taps the Yes button 124, the session is deleted, the Individual Session UI 348 is exited and a Sessions UI 366, as depicted in FIG. 42, is displayed to the user.

Figure 38:
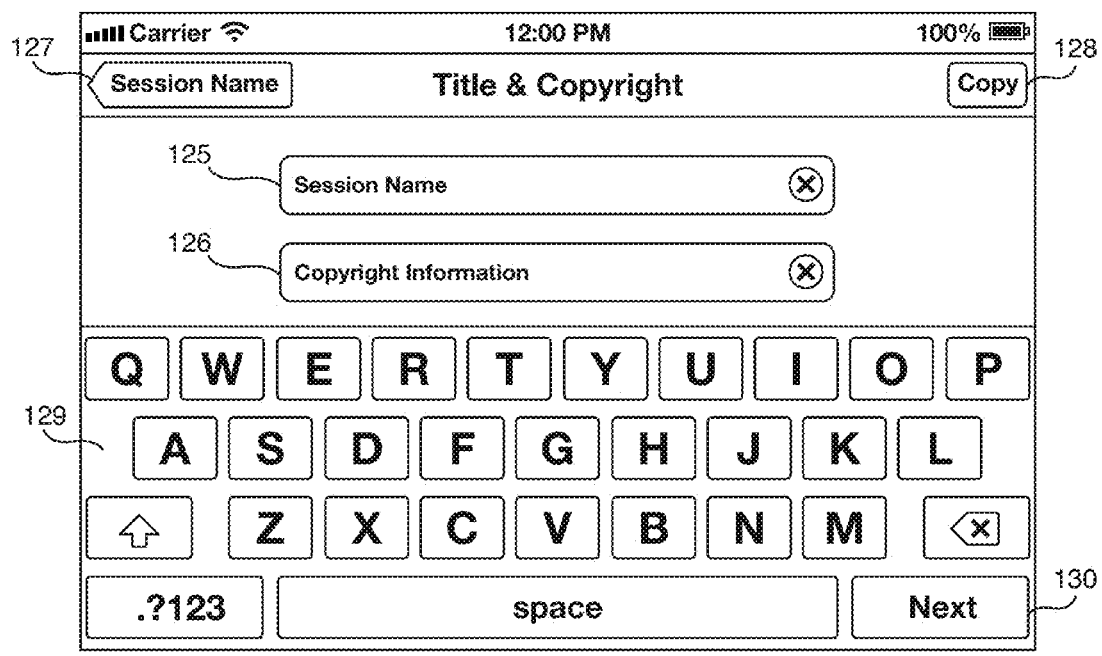
FIG. 38 illustrates a Copy Session UI according to an embodiment of the invention.

If a user taps the Copy Session button 120 in the Action Sheet 117, a Copy Session UI 368, as depicted in FIG. 38, is displayed to a user. The Copy Session UI 368 is a modified version of the Title and Copyright UI 334 (FIG. 7). The Copy Session UI 368 contains a Session Name text field 125 and a Copyright Information text field 126. There is a Navigation bar at the top of the screen which contains a button with the session name 127 and a Copy button 128. If a user taps the button 127 with the session name, the Copy Session UI 368 is exited and the Individual Session UI 348 is displayed to a user. If a user filled in the text fields at the start of a session, the same information will be contained in the Session Name and Copyright Information text fields 125 and 126.

If a user taps the Copy button 128 without changing any text in the Session Name and Copyright Information text fields 125 and 126, the title and copyright will remain the same for the copied session. If a user taps on the Session Name text field 125, a cursor appears in the text field at the end of the text that was input and a keyboard 129 is overlaid on the screen to facilitate text entry. A user can delete the information in the Session Name text field 125 to change the name of the session. If a user changes the title and taps a Next button 130 on the keyboard 129, the Copyright Information text field 126 is given focus; the cursor appears at the end of the text input in the Copyright Information text field 126 and the Next button 130 changes to a Done button to denote that the next time a user taps the button, text entry in the Copy Session UI 368 is complete and the session will be copied. If a user changes the copyright holder information and taps the Done button or the Copy button, the session is copied and the Copy Session UI 368 is exited to the Individual Session UI 348.

Figure 39:
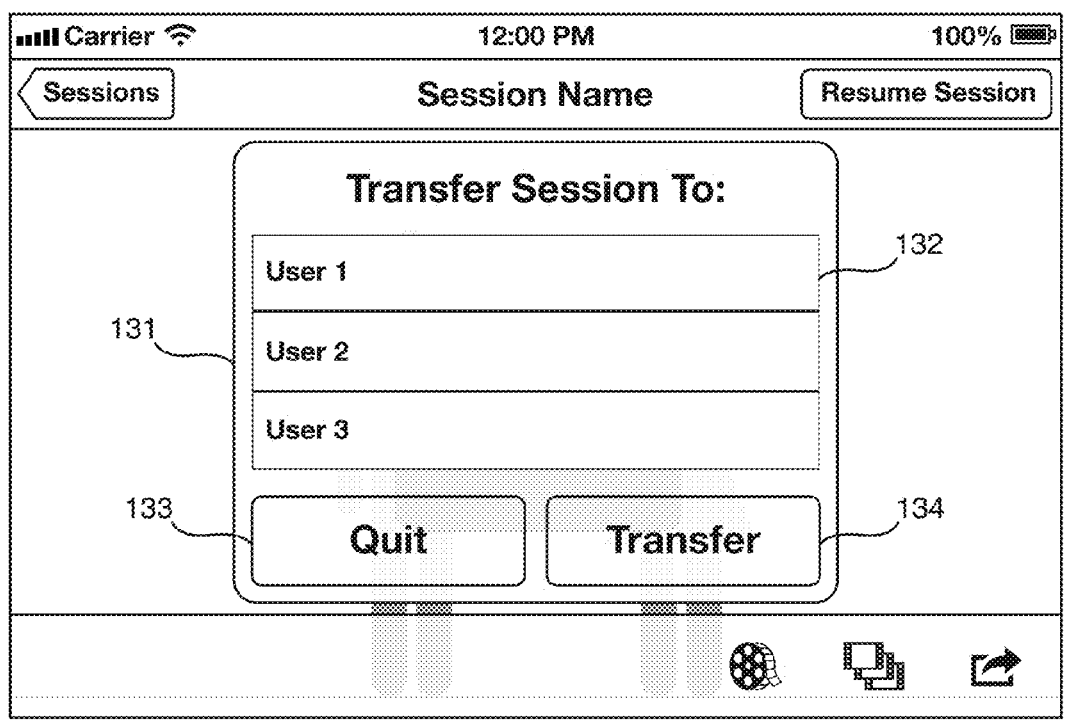
FIG. 39 illustrates a Modal Alert to transfer a session to another user.
Figure 40:
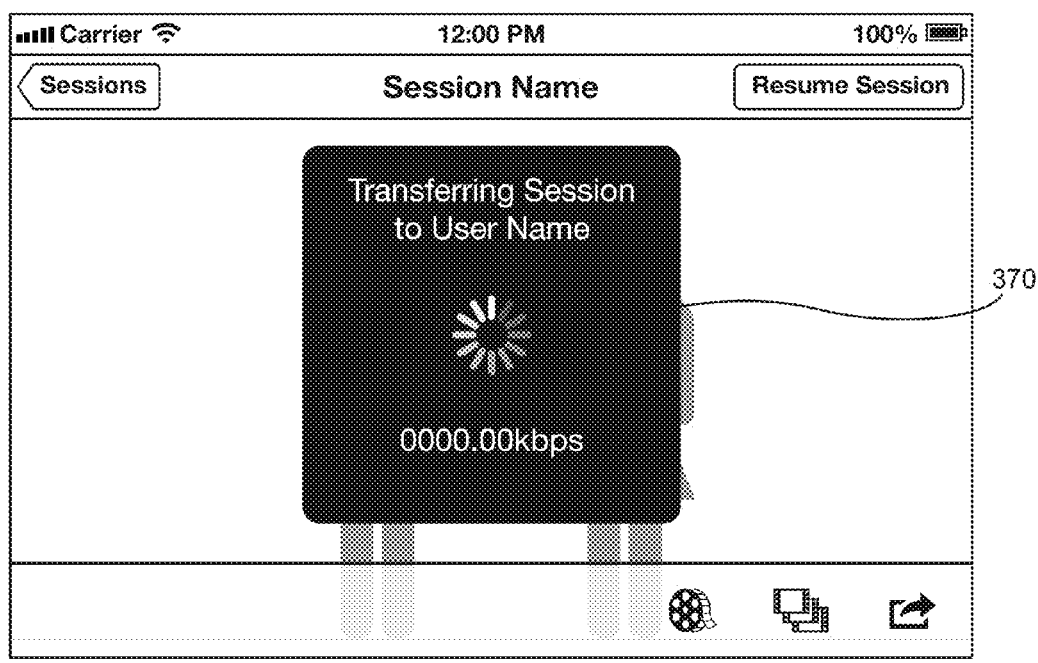
FIG. 40 illustrates the progress of transferring of a session to another user.
Figure 41:
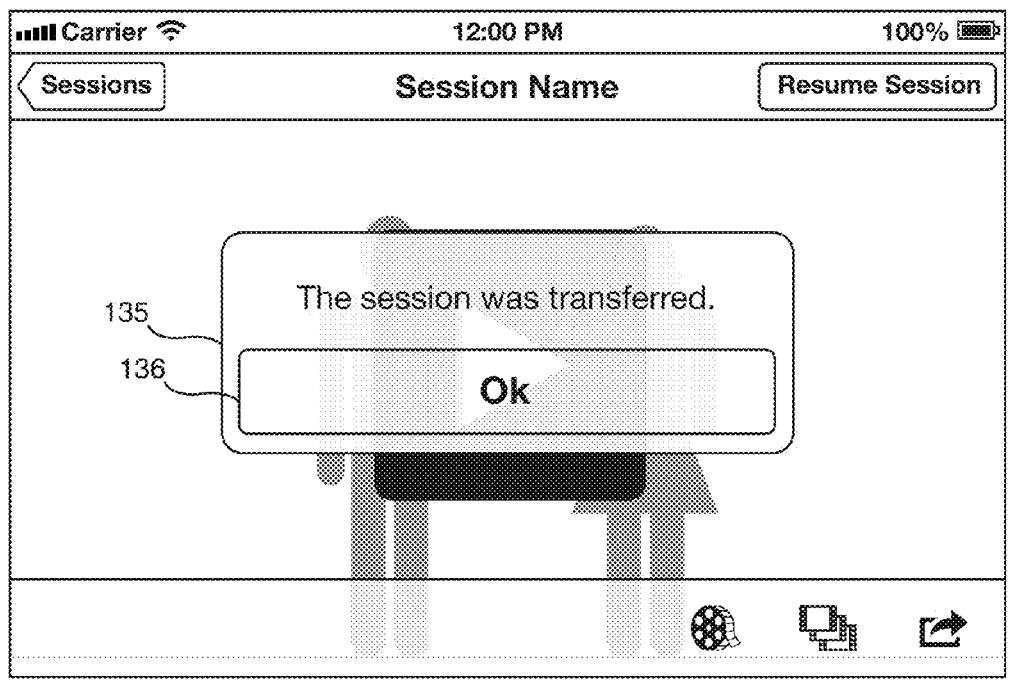
FIG. 41 illustrates a Modal Alert of a transferred session.

Referring again to FIG. 36, if a user taps the Transfer Session button 121 in the Action Sheet 117, the Action Sheet 117 is dismissed and a Modal Alert 131 is overlaid on the Individual Session UI 348, as depicted in FIG. 39. The Modal Alert 131 is labeled "Transfer Session To:" and contains a list view 132 of users ready to accept the session transfer, which will be later described in detail. The Modal Alert 131 also contains a Quit button 133 and a Transfer button 134. If a user taps the Quit button 133, the Modal Alert 131 is dismissed and reveals the underlying Individual Session UI 348 and the session is not transferred. If a user taps a user name to select a user to transfer the session to and then taps the Transfer button 134, the session begins transferring to the receiving user and an asynchronous progress indicator 370 with transfer rate is displayed to a transferring user, as depicted in FIG. 40. When the transfer is complete, a Modal Alert 135 is overlaid on the Individual Session UI 348, as depicted in FIG. 41. The Modal Alert 135 states, "The session was transferred." If the user taps the Ok button 136, the Modal Alert 135 is dismissed from the screen.

Referring again to FIG. 27, when a user taps the Sessions button 090 in an Individual Session UI 348, the Individual Session UI 348 is exited and the Sessions UI 366, as depicted in FIG. 42, is displayed to a user. The Session UI 366 can also be accessed when starting the application from the Home UI 320 by tapping the Sessions button 003 (FIG. 2). There is a Navigation bar at the top of the screen which contains a Back button 137. If a user taps the Back button 137, the Sessions UI 366 is exited and the Home UI 320 is displayed to a user. The Sessions UI 366 contains all sessions created as a director or solo-camera operator. The sessions are displayed in a list view with an icon 138 of the first frame of video along with session information 139 which includes: session title, runtime (H:MM:SS), date of session formatted as MM/DD/YYYY, time of session formatted as HH:MM AM/PM and file size formatted as 0000.00 MB.

Figure 43:
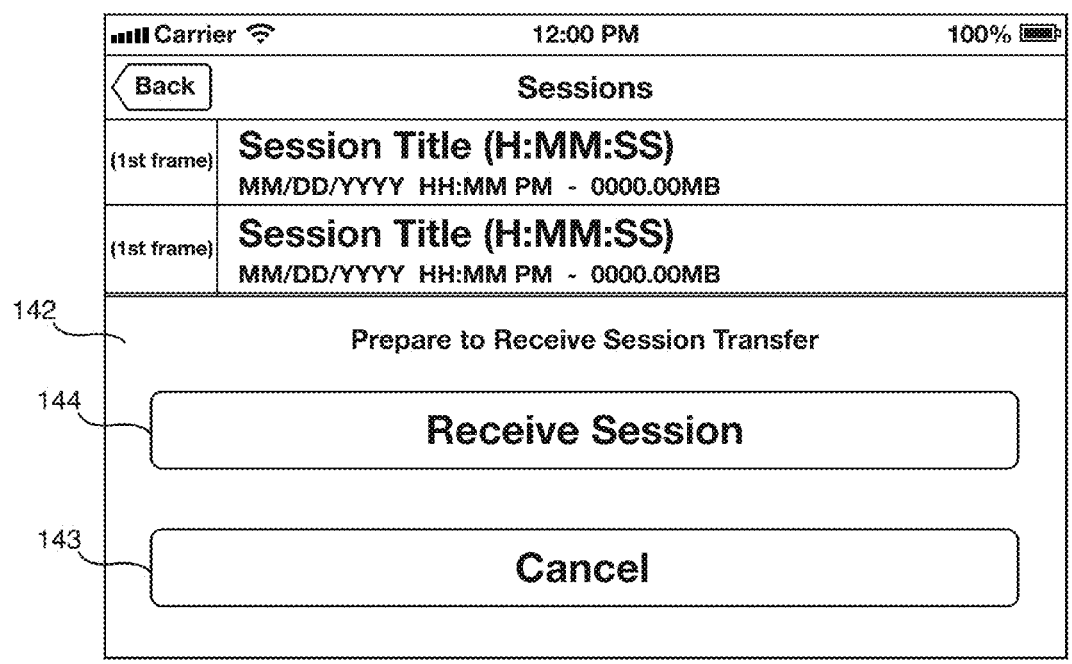
FIG. 43 illustrates the Session UI with Action Sheet for receiving a session transfer from another user.

If a user taps a session in the list, the Individual Session UI 348 for that session is displayed to a user. If a user swipes across a session in the list, a Delete button 140 is displayed to a user. If a user taps the Delete button 140, the session is permanently deleted as is all of the data. If a user taps the session after swiping to reveal the Delete button 140, the Delete button 140 disappears. The Session UI 366 has a Tool bar at the bottom of the screen with a Receive Transfer button 141. If a user taps the Receive Transfer button 141, an Action Sheet 142 is overlaid on the Sessions UI 366, as depicted in FIG. 43. The Action Sheet 142 contains two buttons, a Cancel button 143 and a Receive Session button 144. If a user taps the Cancel button 143, the Action Sheet 142 is dismissed from the screen. If a user taps the Receive Session button 144, the user's device broadcasts for discovery to the transferring user who has initiated a session transfer from an Individual Session UI 348, as depicted in FIG. 39.

Figure 44:
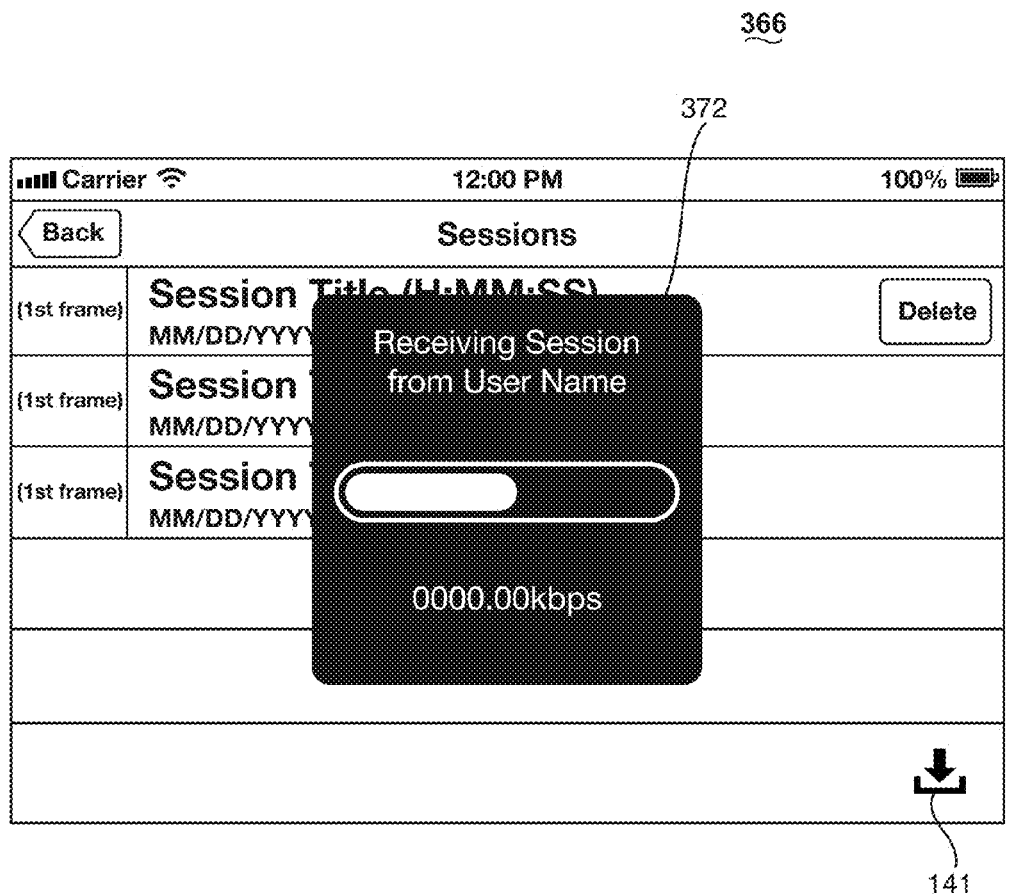
FIG. 44 illustrates the progress of receiving a session transfer from another user.
Figure 45:
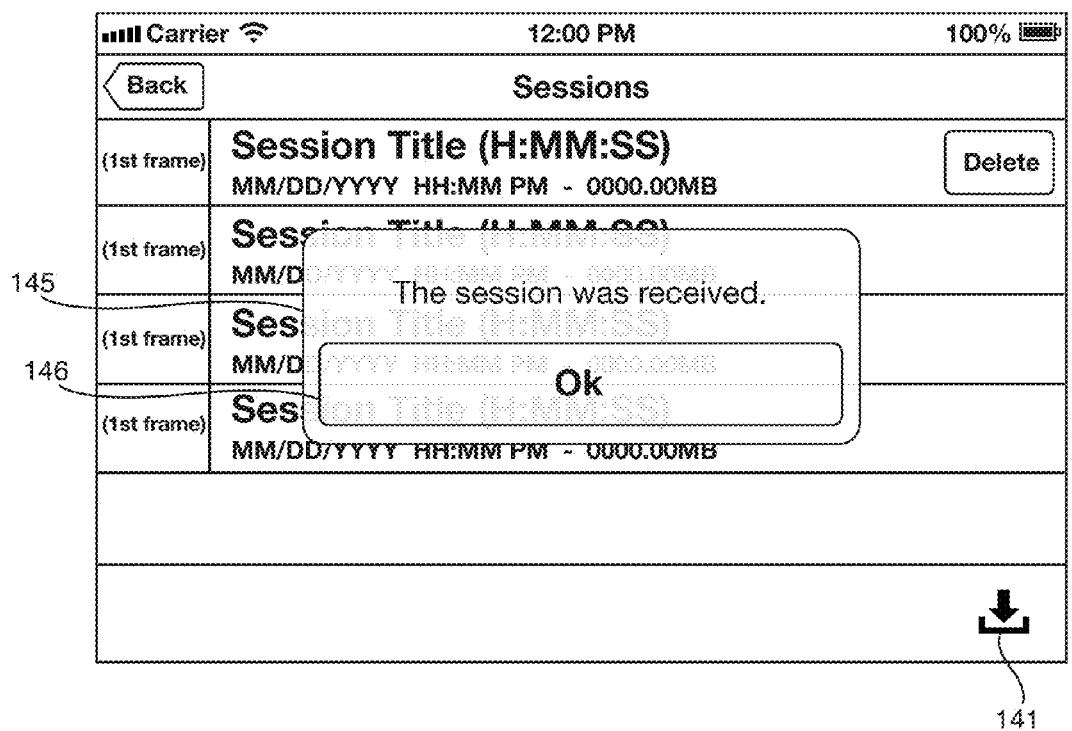
FIG. 45 illustrates a Modal Alert a session transfer was received.
Figure 46:
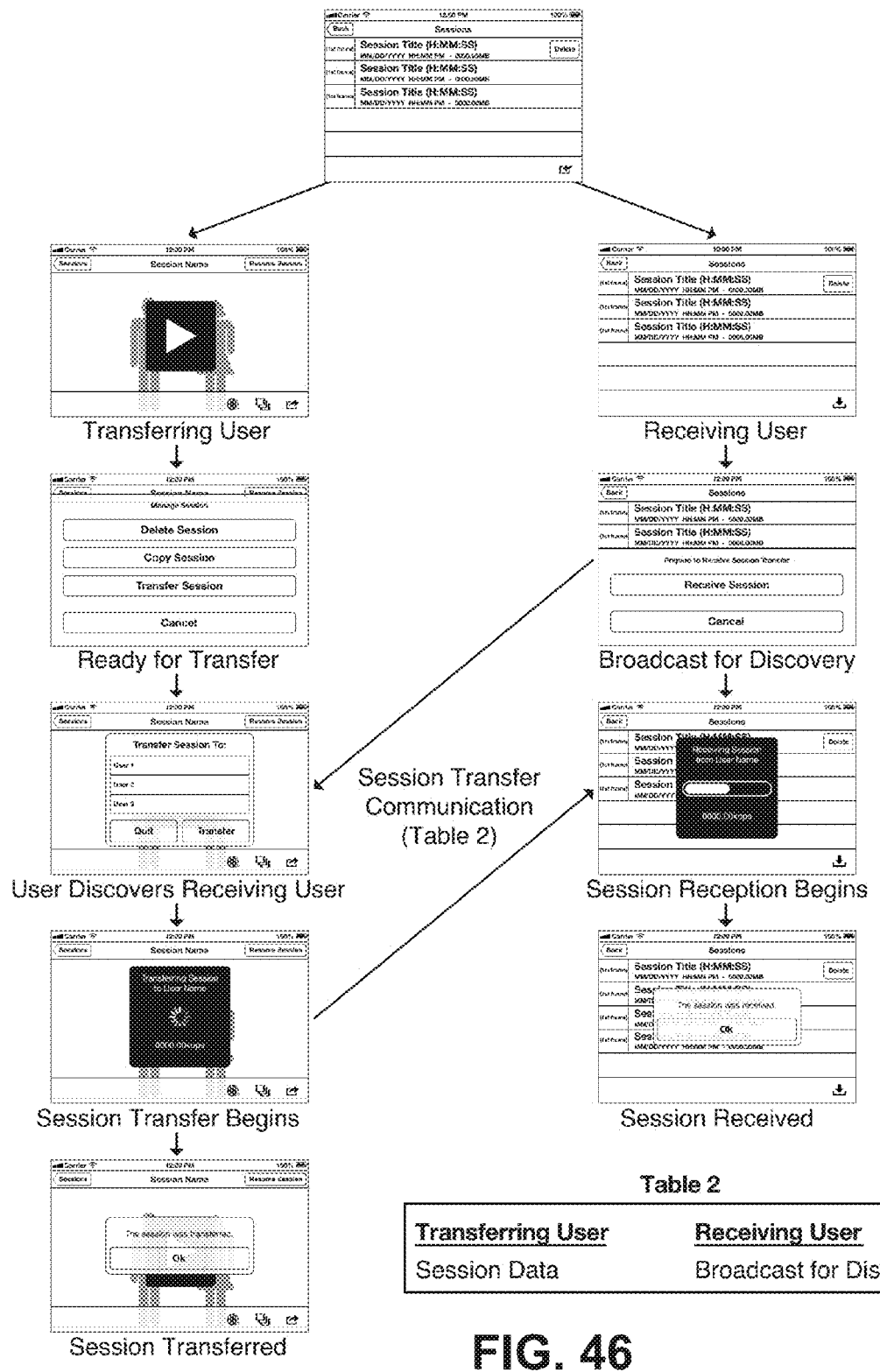
FIG. 46 is a schematic depiction of a session transfer illustrated in the preceding figures according to an embodiment of the invention.

Referring again to FIG. 39, if the transferring user taps the receiving user's name in the list view 131 and taps the Transfer button 134, the session transfer begins and a progress bar 372 with transfer rate is displayed to a receiving user, as depicted in FIG. 44. When the transferred session is received, the data is saved, the session is added to the sessions list and a Modal Alert 145 is overlaid on the Session UI 366, as depicted in FIG. 45. The Modal Alert 145 states, "The session was received." If a user taps the Ok button 146, the Modal Alert 145 is dismissed from the screen. A schematic of a session transfer as just described is depicted in FIG. 46.

Figure 29A:
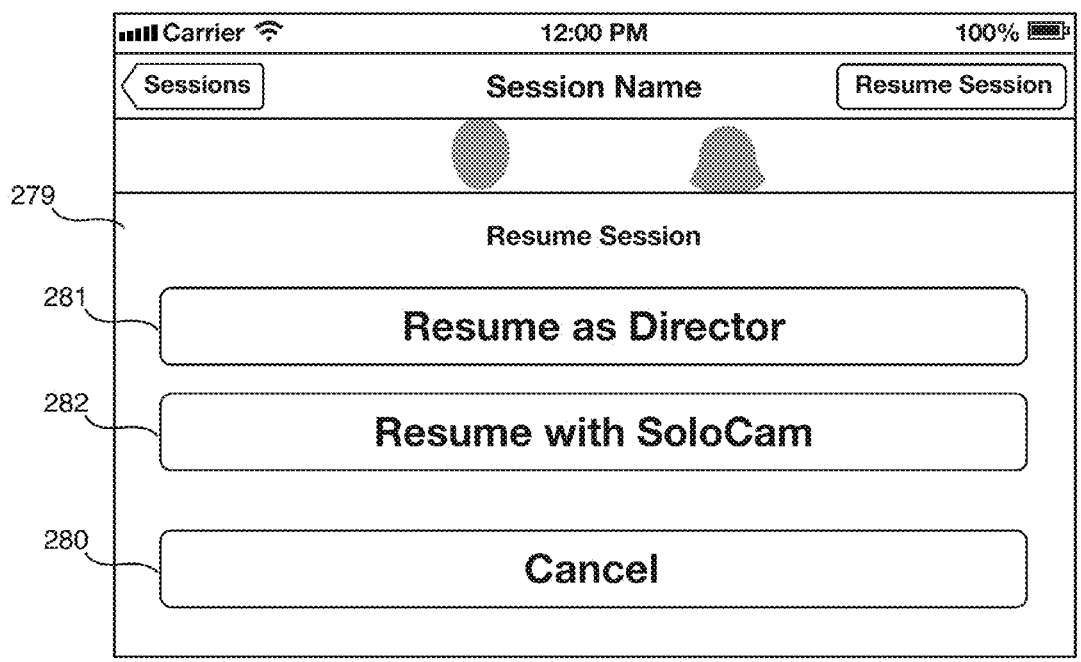
FIG. 29A illustrates an alternative Resume Session UI according to an embodiment of the invention.

FIG. 27A illustrates an alternative Individual Session UI 374, which is similar to the Individual Session UI 348 of FIG. 27, except for the appearance of the UI and some additional features, which will be explained below. The Individual Session UI 374 includes a Navigation bar at the top of the screen which includes a Sessions button 261 which works in a manner similar to that described above for the Sessions button 090 of the Individual Session UI 348. The Navigation bar also includes a Resume Session button 262, which is similar to the Resume Session button 091 of the Individual Session UI 348, except for when selected by the user, an Action sheet 279, as illustrated in FIG. 29A is displayed rather than the Resume Session UI 360. The user can tap a Cancel button 280 to dismiss the Action sheet 279 from the screen and display the underlying Individual Session UI 374. If a user taps a Resume as Director button 281, the Director UI 356 is displayed to a user and the user can resume the session as the director of a multi-camera video capture session, as previously described. If a user taps a Resume with SoloCam button 282, SoloCam UI 346 is displayed to a user and the user can resume the session as the camera operator of a solo-camera video capture session, as previously described. The Individual Session UI 374 also includes a Play icon 263 overlaid on the video.

The Individual Session UI 374 also includes a Tool bar along the bottom of the screen which includes an Export Movie button 267, an Export Clips button 268 and an Action button 269, which are similar to the Export Movie button 093, Export Clips button 094 and Action button 095 of the Individual Session UI 348 of FIG. 27 described above. The Tool bar additionally includes a Cloud Sync button 264 to sync a session with a cloud storage system, a Sharing button 265 and an Edit UI button 266. If a user taps the Sharing button 265, sharing options from FIG. 6C 174 that have been logged into are displayed to share the final movie to a video site, social media, blog or FTP upload site (not shown).

Figure 28A:
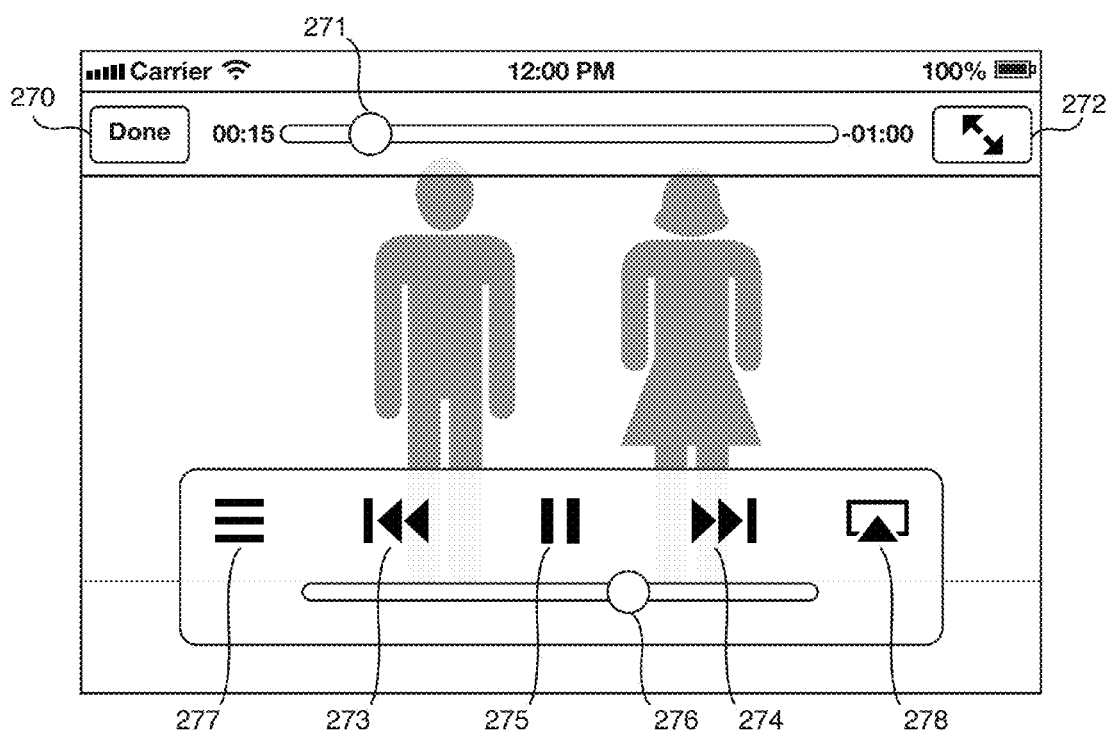
FIG. 28A illustrates an alternative Movie Player UI according to an embodiment of the invention.

When the user taps the Play icon 263, a Movie player UI 376, as illustrated in FIG. 28A, is displayed on the screen. The Movie Player UI 376 is similar to the Movie Player UI 358 of FIG. 28 except for the appearance of the UI and some additional features. The Movie player UI 376 includes a Navigation bar at the top of the screen which contains a Done button 270 and a Timeline 271 which works in a manner similar to that describe above for the Movie player UI 358. The Navigation bar also includes a Fill Screen button 272 that expands the video to fill the screen. An additional set of buttons is temporarily displayed on the screen when the user taps the screen. The buttons include a Rewind button 273, a Pause/Play button 275 and a Fast Forward button 274 which work in a manner similar to that described above for the Movie player UI 358. The temporarily displayed set of buttons also includes a Volume control bar 276, an Edit UI button 277 and an Airplay Video button 278. The Edit UI button 277 opens an Edit UI 378 or 386. The Airplay Video button 278 streams the movie to an Apple TV for playback on an HDTV or monitor.

It is also within the scope of the invention for all of the connected camera devices of a multi-camera production to record for the entire time, rather than each camera device recording individual clips. As discussed above, the director can use the application to record a video as a series of clips from one or more cameras. Alternatively, the director can choose to record video on all of the cameras for the entire duration of a session and generate clips in an edited video by selecting segments of the camera's recorded video to use in the edited video. In this manner, when the director selects a particular camera as the live camera, the director is not initiated recording, but rather creating an edit point in an Edit Decision List of the edited video. The director can still perform a live "edit" of the production in real-time by creating the Edit Decision List. At the end of the session the director receives the full recorded video from each of the camera devices. Once all of the video is received, the user can enter a mode to make edits to an Edit Decision List which was generated during production. Because all of the video captured from all of the camera devices is saved, any subsequent editing to the production is non-destructive, meaning all of the video is available so that the director can experiment with different edits multiple times without destroying or losing any captured video.

The Edit Decision List is essentially a list of data representative of the active camera video feed used in the edited video. The user can make changes to the Edit Decision List to change which camera video feed is active at a particular time in the edited video and the duration of the active feed from a particular camera. The edited video can be considered to be comprised of a series of clips of various lengths of recorded video feed from an active camera unit used during recording of the production. The length and the source of the video feed for each clip in the edited video can be changed to make changes to the Edit Decision List.

Figure 47:
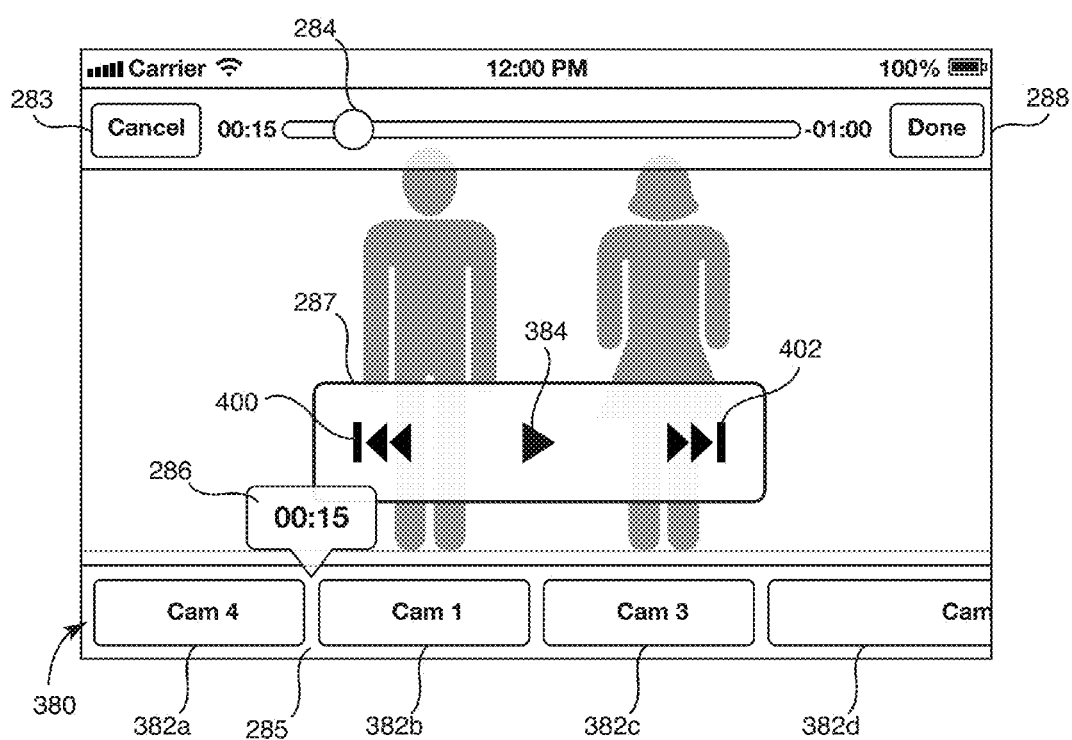
FIG. 47 illustrates an Edit UI according to an embodiment of the invention.

FIG. 47 illustrates an Edit UI 378 which allows a user to make edits to an Edit Decision List 380 of an edited video. The Edit UI 378 is designed for devices having a small screen with limited screen real estate, such as a mobile phone (e.g. iPhone®), although the Edit UI 378 can also be used on a device having a large screen, such as a tablet (e.g. iPad®). Each clip 382*a-d* in the edited video is represented by a button, which is labeled with the camera number corresponding to the source of the video for that clip. The Edit Decision List 380 may be composed of many more clips than can be displayed on the screen at one time. A timeline slider 284 in a Navigation bar at the top of the screen will scrub the timeline to the time corresponding to the users drag, the video will advance or rewind to that time, the Edit Decision List 380 will scroll across the bottom of the screen, the current clip in the Edit Decision List 380 will be highlighted and the current clip will also show a vertical line through it as a visual representation of the current time (not shown). If the user wishes to lengthen a clip and shorten the following clip or shorten a clip and lengthen the previous clip, the user can tap and hold a space 285 between two clips, such as clips 382*a* and 382*b*, and a small popover 286 with the time of the edit point is displayed 286. Then while still holding, the user can drag to the left or right and the popover and the space 285 between the clips 382*a* and 382*b* will follow with the drag, the time in the popover automatically changes accordingly. The user can then release the tap/hold and then review the change to the Edit Decision List 380 by dragging the slider 284 in the timeline back to before the edit and then tap the video display to view a Playback control 287 and tap a Play button 384. The Playback controls 287 also include a Rewind button 400 and Fast Forward button 402. When the user taps the Play button 384, it toggles to display a Pause button (not shown). The Playback controls 287 will fade out with a few moments of inactivity or quickly after tapping outside of the Playback control 287. Tapping the Play button 384 would have the same effect on the Edit Decision List as dragging the timeline slider 284 as well as the timeline slider 284 advancing as the video plays.

Alternatively before releasing the tap/hold, if the user drags upward, the popover 286 would disappear, the change to the edit point would not be performed and the space 285 between the clips 382a and 382b would snap back to the original position. The user can make multiple changes to any of the edit points in the Edit Decision List 380 of the video. If the user is satisfied with the change made to the Edit Decision List 380, the user can tap a Done button 288 and the change to the Edit Decision List 380 is saved and the Individual Session UI 348 or 374 for that session is displayed. If the user decides they do not want to save the changes to the Edit Decision List 380, the user would simply tap a Cancel button 283 and return to the Individual Session UI 348 or 374 for that session.

Figure 48:
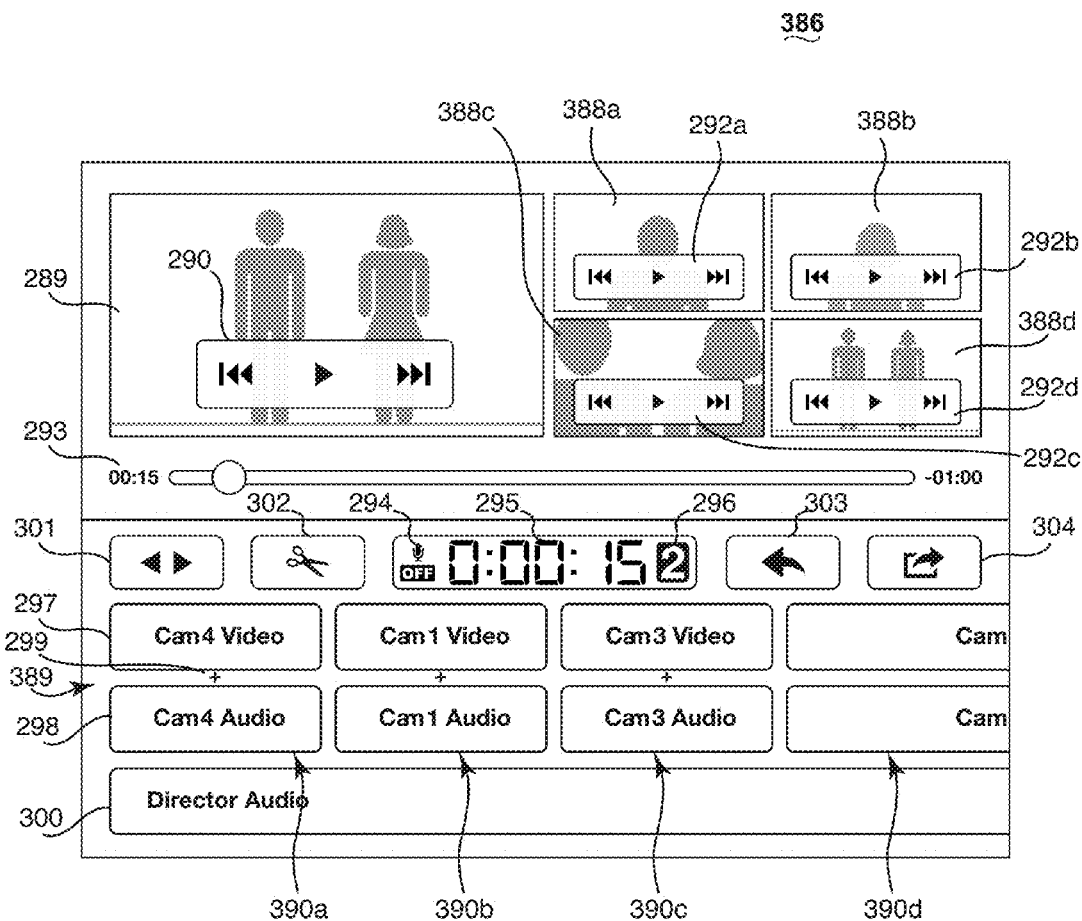
FIGS. 48-52 illustrates an alternative Edit UI according to an embodiment of the invention.

FIG. 48 illustrates an alternative Edit UI 386 which is configured for use on devices with larger screens, such as an iPad®, although it is within the scope of the invention for the Edit UI 386 to be used on a device having any suitable sized screen. The Edit UI 386 is operates in a manner similar to the Edit UI 378, except that the Edit UI 386 includes additional views and features that are more easily used on a device with a larger screen.

Still referring to FIG. 48, the Edit UI 386 includes an edited video display 289 of the of the full "edited" video and camera displays 388a-d for the raw video recorded by each of the camera devices. Each of the edited view display 289 and the camera displays 388a-d includes Playback controls 290 and 292a-d, which appear when a user taps on one of the five displays. The Playback controls 290 and 292a-d fade out after a few moments of inactivity or quickly after tapping outside of the Playback controls 290, 292a-d. Any of the Play buttons in the Playback controls 290 and 292a-d would have the same effect as the Play button 384 in FIG. 47.

Below the five video displays 289 and 388a-d is a timeline slider 293 which can be scrubbed and all five of the video displays 289 and 388a-d scrub when a user taps and drags the timeline slider 293 to a specific time and has the other same effects as the timeline slider 284 in FIG. 47. On the left side of the timeline slider 293 is a display of the time of the videos have played and on the right side of the timeline slider 293 is a display of the remaining time. An Audio Indicator 294 displays whether a camera's microphone was on or off. A Time Counter 295 displays the time of the edited video where the slider is currently in the timeline slider 293 and a number on the end displays a Camera Number 296 of the camera that recorded the video of the current clip where the slider is in the timeline slider 293.

There are four buttons in line with the Time Counter 295, a Move Edit button 301, a Split Clip button 302, an Undo button 303 and an Action Button 304. Below the controls is a display of an Edit Decision List 389 based on video clips 390a-d from each of the camera devices corresponding to the edited video displayed in the edited video display 289. The Edit Decision List 389 includes three different timelines, a Camera Video Timeline 297, a Camera Audio Timeline 298 and a Director Audio Timeline 300. The Edit Decision List 389 may be composed of many more clips than can be displayed in the timelines on the screen at one time.

Figure 49:
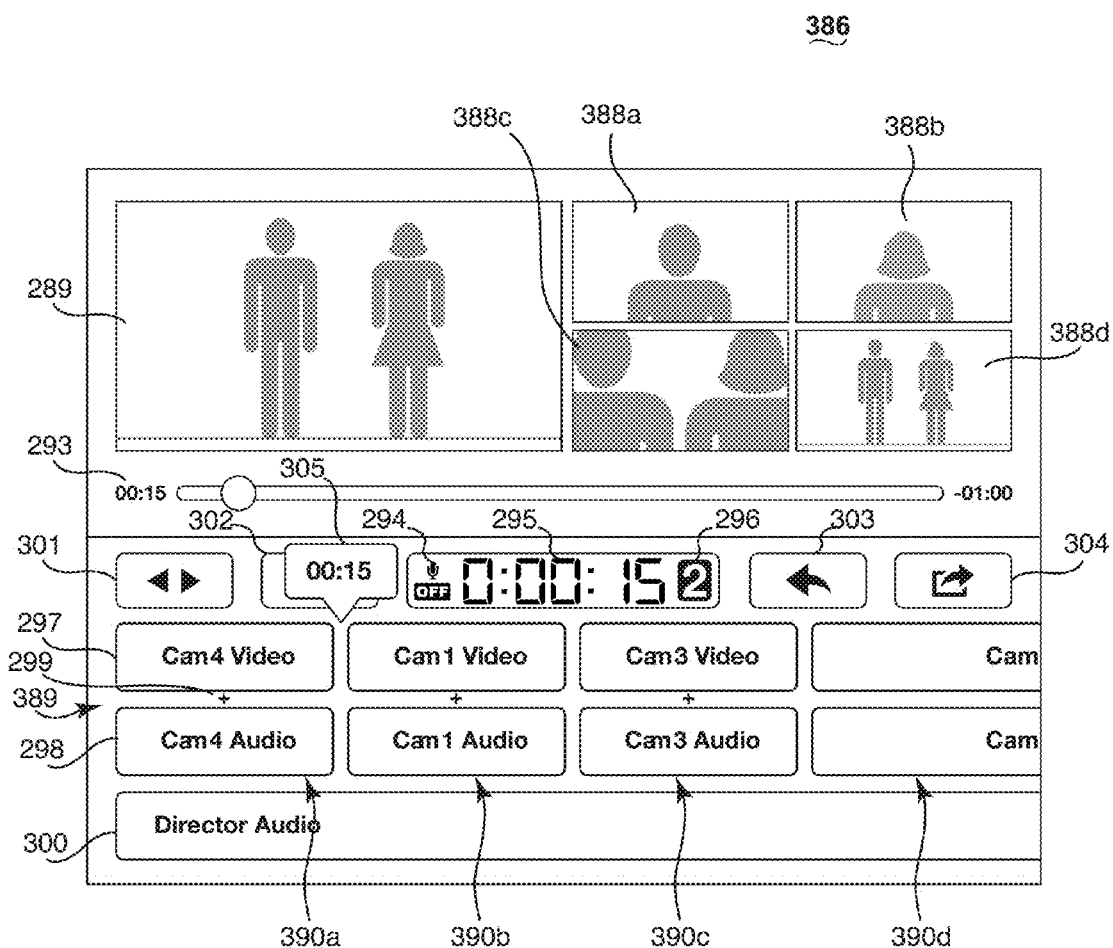

As illustrated in FIG. 49, if the user wishes to lengthen a clip 390a-d and shorten the following clip 390a-d or shorten a clip 390a-d and lengthen the previous clip 390a-d (this function affects both the Camera Video and Audio Timelines 297 and 298), the user would tap the Move Edit button 301 which would toggle to a highlighted state to activate the Move Edit Point function. Then the user would tap and hold a space between clips 390a and 390b, for example, and a small popover 305 with the time of the edit is displayed. Then, while still holding, the user can drag to the left or right and the popover 305 and the space between the clips 390a and 390b will follow with the drag and the time in the popover 305 will change accordingly. The slider in the timeline slider 293 will scrub the timeline slider 293 to the time corresponding to the location of the drag and the video in all five video displays 289 and 388a-d will advance or rewind to that time. The user can then release the tap/hold and then review the edit to the Edit Decision List by dragging the slider in the timeline slider 293 back to before the edit and tapping the edited video display 289 to show the Playback controls 290 and tap play.

Alternately before releasing, if the user drags upward, the popover 305 would disappear, the change to the edit point would not be performed and the space between the clips 390a and 390b would snap back to the original position. The user can then tap the Move Edit button 301 to disable the Move Edit Point function.

Figure 50:
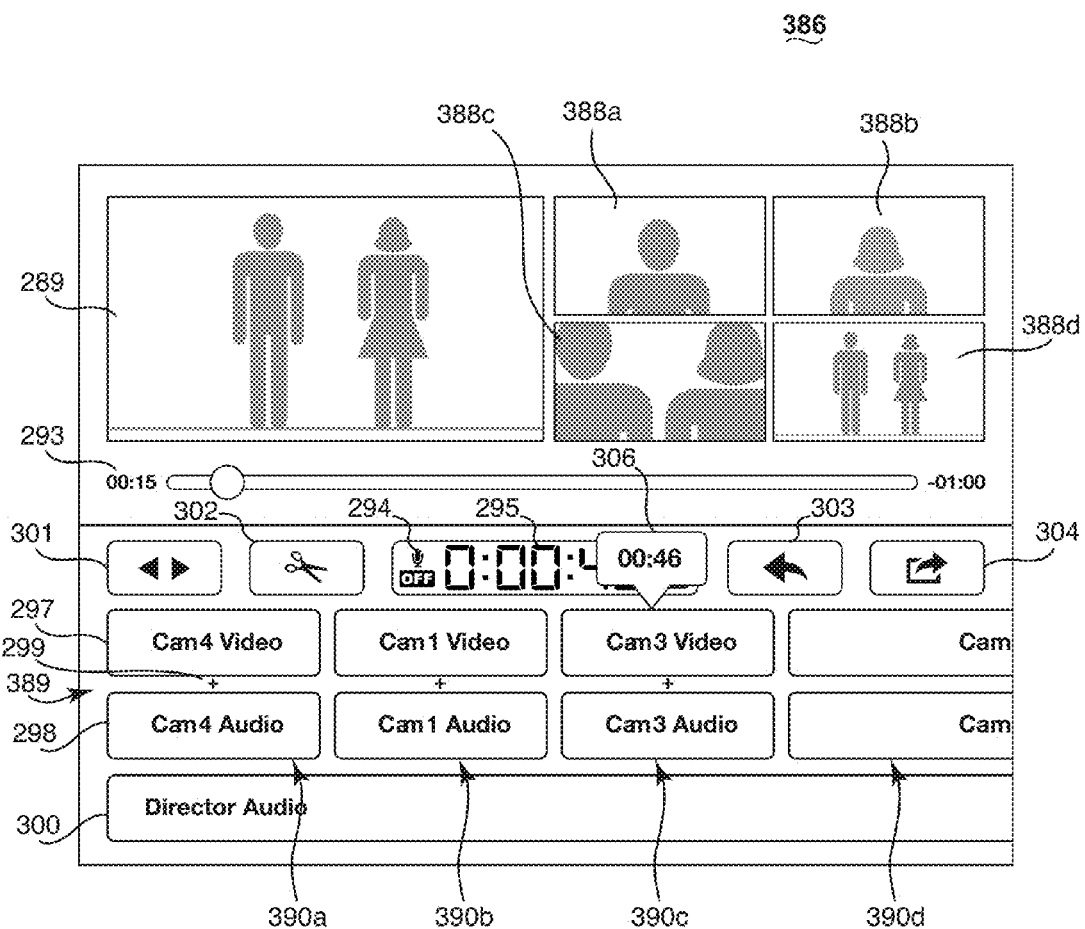
Figure 51:
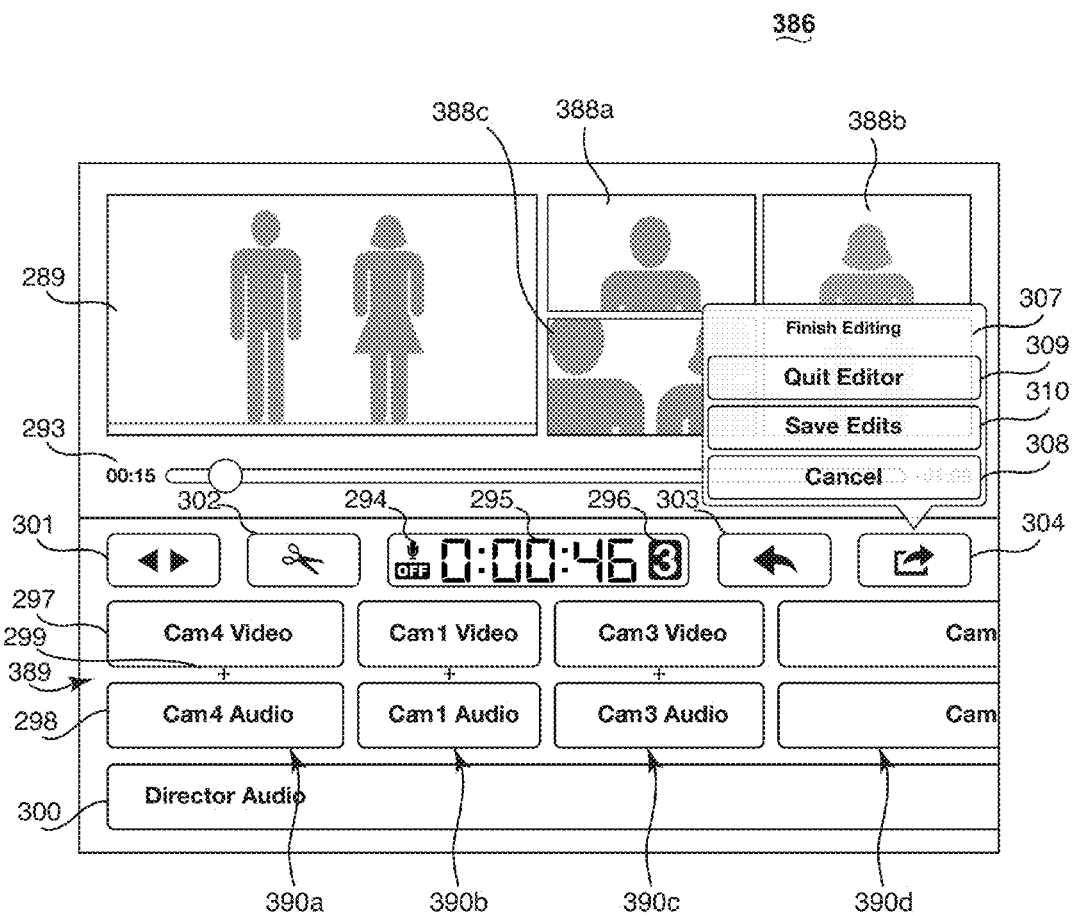

If the user wishes to split a clip (this function would affect both the Camera Video and Audio Timelines 297 and 298), the user would tap the Split Clip button 302 which would toggle to a highlighted state to activate a Clip Splitting function. Then, as illustrated in FIG. 50, the user would tap and hold on a clip, such as clip 390c, and a small popover 306 with the time of the video where the user tapped is displayed. Then, while still holding, the user can drag to the left or right and the popover 306 will follow with the drag and the time in the popover 306 will change accordingly. The slider in the timeline slider 293 will scrub the timeline to that time and the video in all five video displays 289 and 388a-d will advance or rewind to that time. The user can then release the tap/hold and then review the edit to the Edit Decision List 389 by dragging the slider in the timeline 293 back to before the edit and tapping the edited video display 289 to show the Playback controls 290 and tap play. Alternatively, if the user drags upward before releasing, the popover 306 would disappear, the clip 390c would not be split and the space between the clips would snap back to the original position. The user can then tap the Split Clip button 302 to disable the Clip Splitting function.

If the user decides that a different camera had a better shot than the camera used in the original edit, the user can tap and hold one of the camera displays 388a-b and drag it onto a clip 390a-d in the Camera Video Timeline 297 below. If the user drags the selected camera display 388a-b and releases on a clip in the Camera Video Timeline 297, only the video is replaced. If the user drags the selected camera display 388a-b and releases on a clip in the Camera Audio Timeline 298, only the audio is replaced. If the user drags the selected camera display 388a-b and releases on the Plus 299 between the Camera Video and Audio Timelines 297 and 298 in the Edit Decision List 389, both the video and the audio is replaced. When replacing video in a clip from another camera the exact time and duration of video is used from the video from the newly selected video and the label on the clip would change to the name of the newly chosen camera's video clip.

If the user wishes to undo any edits they have made the user can simply tap the Undo button 303 and each tap would undo an edit and changes would revert in the Edit UI 386 to reflect the undo.

If the Director recorded Voice-over during the live edit the audio would be in a Director Audio Timeline 300.

Figure 52:
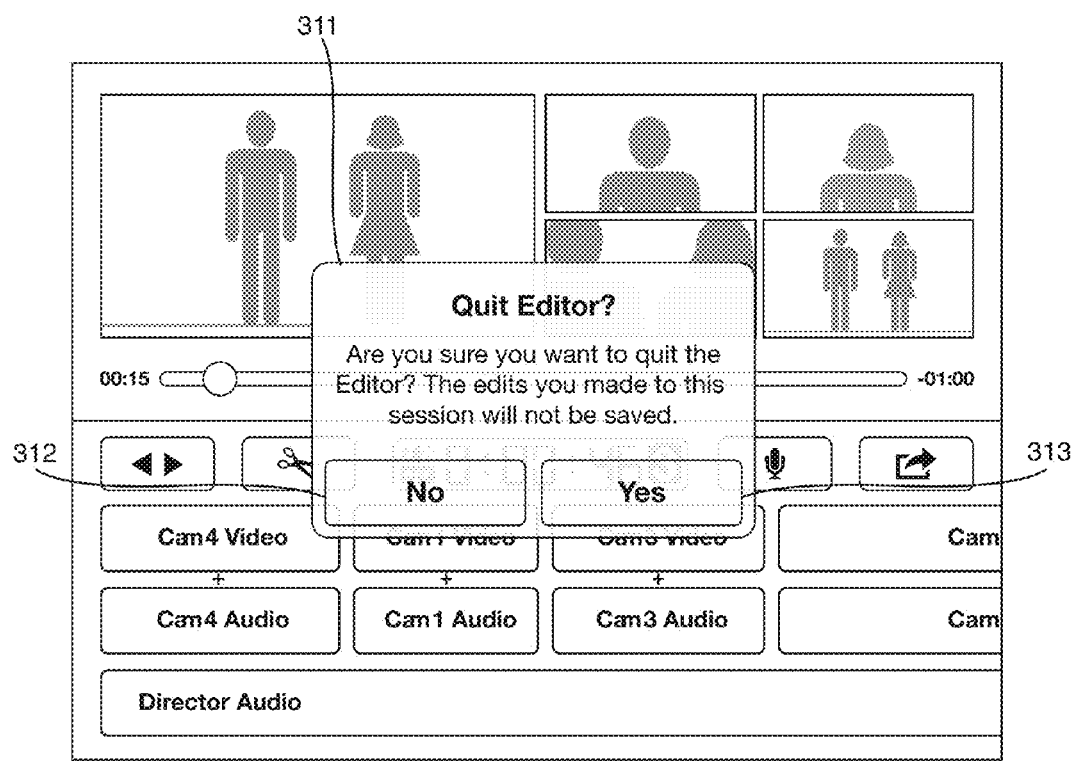

If the user wishes to exit the Edit Decision List editing mode, the user can tap the Action button 304. The Action Button 304 displays an Action sheet popover 307 labeled Finish Editing containing three button options: a Cancel button 308, a Quit Editor button 309 and a Save Edits button 310. If the user taps the Cancel button 308, the Action sheet popover 307 is dismissed from the screen and the user can continue editing. If the user taps the Quit Editor button 309, a Modal Alert 311 is overlaid on the Editor UI 386, as depicted in FIG. 52. The Modal Alert 311 is a secondary step in the quitting process to ensure that it was not an accidental tap and the user does want to quit the editing in progress. The Modal Alert 311 questions the user, "Quit Editor? Are you sure you want to quit the Editor? The edits you made to this session will not be saved." The Modal Alert 311 contains a No button 312 and a Yes button 313. If the user taps the No button 312, the Modal Alert 311 is dismissed from the screen and the user can continue editing. If the user taps the Yes button 313, the Editor UI 386 is exited and the Individual Session UI 348 or 372 for that session is displayed.

Figure 53:
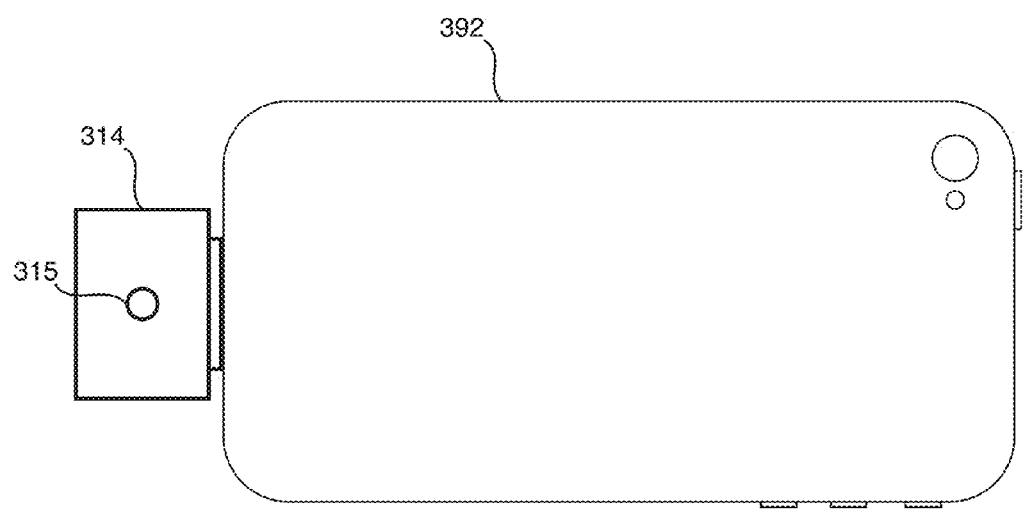
FIG. 53 illustrates a recording indicating device according to an embodiment of the invention.

FIG. 53 illustrates a mobile device 392 having video capturing capability, such as an iPhone®, and a recording indicating device 314 that plugs into a port (not shown) on the mobile device 392. The port can be a USB port or a dock connector port and the recording indicating device 314 can include a suitable adapter to plug into the particular port. The recording indicating device 314 includes an indicator 315, such as an LED light that visually indicates when the video capture of the mobile device 392 is on standby and when the mobile device 392 is recording video. For example, the indicator 315 can turn blue when the mobile device 392 is on standby and red when the mobile device 392 is recording (live). The indicator 315 can be configured to face away from the user of the mobile device 392 such that the indicator 315 is visible to the subject(s) being recorded. It is also within the scope of the invention for the recording indicating device 314 to include a built-in microphone that can be used to record audio.

Figure 53A:
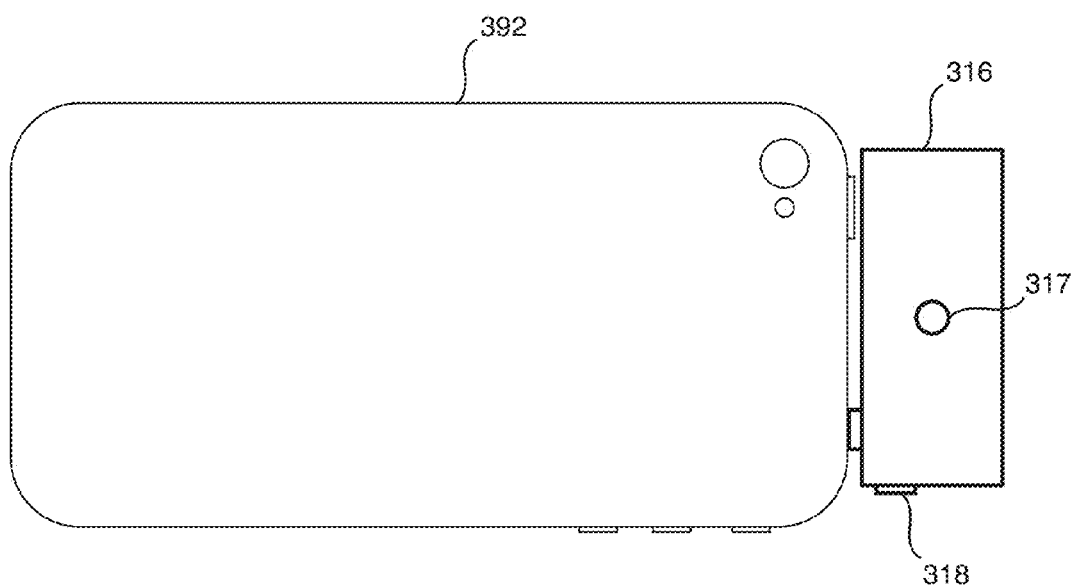
FIG. 53A illustrates an alternative recording indicating device according to an embodiment of the invention.

FIG. 53A illustrates another recording indicating device 316, which is similar to the recording indicating device 314, except that the recording indicating device 316 plugs into the earphone jack of the mobile device 392. The recording indicating device 316 also includes a passthru port 318 for earphones to be plugged into so that the operator of the mobile device 392 can still receive audio communication from the director, as previously described. The recording indicating device 316 also includes an indicator 317 that indicates when the mobile device 392 is in standby mode and when it is recording video.

The recording indicating device 316 can also give audible cues if earphones are plugged into the passthru port 318 to indicate whether the mobile device 392 is in standby mode or recording. For example, a computer generated or recorded voice could say "Camera X in standby" or "Camera X you're live," depending on the status of the camera as controlled by the director as described above. The audible indicator can be issued to the user of the mobile device 392 through earphones plugged into the passthru port 318. The recording indicating device can also have a built-in microphone (not shown) to capture better audio than the device microphone.

There are several advantages to the system with the application software and the methods disclosed herein. Current methods and systems of multi-camera video transfer and editing are not accessible, cost effective or mobile solutions for most casual users. Typically, casual users do not have the financial resources or incentive to invest in the equipment or software necessary to overcome the barrier to entry for multi-camera video production with wired solutions. The cost of a basic setup for multi-camera video production at the low end starts at several thousand dollars to tens of thousands of dollars at the high end. Additionally, while the major time investment of post-production may be eliminated when utilizing these methods on location, a significant time investment is still required for the transport, set up, teardown, repacking and loading of equipment for transport back to the studio.

Another problem with conventional wired solutions is the physical limitations of cables. While cables do allow for some freedom of movement, cables are limited to their physical length and can be extremely cumbersome to manage. There is also a great possibility that a cable connection can become loose at either end and dislodge from the camera or computer, causing the video stream from that camera to be lost, possibly disrupting the production.

Finally, the major problem not addressed with prior attempts is the lack of a convenient means of communication from the director to the camera operators during a multi-camera video production. Currently, the only solution to this problem is the use of additional, external walkie-talkies and a headset type system for audio communication from the director to the camera operators, which will not disrupt the audio track of the video production. However, this solution is only viable if the director is positioned a distance away from the cameras while communicating directions to the camera operators to ensure that the director's voice is not captured in the audio track of the video production. The distance the director can be from the cameras echoes the previously stated problem and is in direct correlation to the length of camera cables.

The embodiments described herein provide a convenient, easy to use, cost effective, mobile, all-inclusive wireless method of multi-camera video production, which facilitates the video production process through the unique, integrated communication system. The most significant barrier to entry of multi-camera video production is the financial investment in the equipment and software. The system and method of the invention has been initially created as an application for use on wireless mobile devices millions of people already own, usually carry with them and are accepted as necessities for everyday life, namely, smart phones, MP3 players and to some extent tablet devices and laptop computers. Anyone can take part in a multi-camera video production with a wireless device, the earphones that came with their device, the application, and a wireless network connection; no other equipment is necessary. Additionally, as professional level video cameras with wireless networking capability become available and "smart" like the existing mobile devices did, the system and method for Director/Camera Communication could also be extended to high-end professional users and integrated into dedicated video cameras to connect with director software on any computer.

The time investment is eliminated with no need to prepare a substantial amount of equipment and no need for post-production editing. It is easier for a casual group of users to produce a video spontaneously with a wireless multi-camera video production than it is for a group of professionals to do so with a wired multi-camera video production. Since it is a wireless solution, the physical limitations of cables are eliminated. Most importantly, communication is facilitated with the unique, integrated communication system with no need for additional, external audio communication equipment. Silent communication allows the director to be near the action, to see and hear the action and to see camera positions in relation to the action. If the director has sufficient distance from camera operators and vocal directions will not disrupt the audio in the video being captured, the director can also communicate through the director's device microphone to the camera operators through earphones plugged into their devices.

In addition to offering the ability for a director to record clips from cameras to produce an edited video immediately once the production is done, the ability for all of the cameras to record video during a production helps eliminate human error when editing video live. Decisions need to be made quickly when editing live and sometimes a director might switch cameras too soon or later decide that a different camera had a better shot after it was too late. When all of the cameras are recording during the production and the director switches cameras the director is creating an Edit Decision List which can later be modified to eliminate any human error, since the video has already been "edited" non-destructively. With access to all of the raw camera footage and a huge head start on post-production with an Edit Decision List, it is quite easy to tweak the edit to get it just right or remix the video to quickly export a different video than was originally "edited".

Solo-Camera Production is provided as a bonus feature for a single camera operator to use the application without other users. Solo-Camera Production allows a single camera operator to switch between the back and front facing cameras of their device on-the-fly while recording video and/or to also perform "in camera" editing by allowing the camera operator to record multiple clips to be merged into a single video at the end of the video production. The ability to perform "In camera" editing is typically not a standard feature with many mobile devices, which usually take one video clip at a time and save the clips individually forcing the user to edit clips together in post-production.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A wireless video camera recording system comprising:
   at least one field mobile communications device having a camera with a video camera recording function;
   a director mobile communications device having a camera with a video camera recording function;
   an interface provided on the director mobile communications device configured to display real time video from a plurality of the cameras on (a) the director mobile communications device and at least one of the at least one field mobile communications device or (b) at least two of the at least one field mobile communications device, and wherein the interface is configured to allow a user of the director mobile communications device to place one of the plurality of the cameras into a live recording mode and another of the plurality of the cameras into a standby mode;
   a communication link established between the director mobile communications device and each of the at least one field mobile communications device capable of streaming video from each of the at least one field mobile communications device to the director mobile communications device; and
   a data store accessible by the director mobile communications device and the at least one field mobile communications device over the communication link;
   wherein the director mobile communications device has a selector interface configured to display real time video as viewed by the at least one field mobile communications device or the director mobile communications device and to select at least one of the field mobile communications device or the director mobile communications device as an active feed for storage to the data store; and
   wherein the interface includes at least one interface component configured to send at least one operational instruction to at least one selected device, wherein when the at least one interface component is actuated, a visual indicator of the at least one operational instruction is located on the director mobile communications device associated with the displayed real time video on the interface of the at least one selected device as well as on the at least one selected device to which the at least one operational instruction was sent.

2. The wireless video camera recording system of claim 1 wherein the director mobile communications device is configured to transmit at least one operational command to a selected one of the at least one field mobile communications device, the at least one operational command comprising a command issued by the director mobile communications device to a selected at least one field mobile communications device which causes the selected at least one field mobile communications device to perform an action selected from the group consisting of: initiating recording, stopping recording, turning on a light on the selected field mobile communications device, turning off a light on the selected field mobile communications device, and initiating transfer of video from the at least one field mobile device to at least one of the data store or the director mobile communications device.

3. The wireless video camera recording system of claim 1 wherein the selected at least one field mobile communications device comprises one of a single field mobile communications device, multiple field communication devices or all of the field mobile communications devices having the communication link established with the director mobile communications device.

4. The wireless video camera recording system of claim 1 wherein the wireless video recording system comprises at least a first field mobile communications device and a second field mobile communications device and the director mobile communications device is configured to switch recording video between the first field mobile communications device and the second field mobile communications device in real time.

5. The wireless video camera recording system of claim 1 wherein the director mobile communications device is configured to discover and receive broadcast of a live video feed connection with at least one field mobile communications device over a communications network.

6. The wireless video camera recording system of claim 1 wherein the at least one operational instruction comprises an instruction issued by the director mobile communications device to a selected at least one field mobile communications device to direct a user operating the camera of the selected field mobile communications device to operate the camera of the selected field mobile communications device in a manner selected from the group consisting of: initiating recording, stopping recording, turning on a light on the selected field mobile communications device, turning off a light on the selected field mobile communications device, zooming the camera of the selected field mobile communications device, panning on the camera of the selected field mobile communications device, moving the camera of the selected field mobile communications device in a particular direction, or directing the camera of the selected field mobile communications device in a particular direction.

7. The wireless video camera recording system of claim 1 wherein the at least one operational instruction is issued in the form of at least one of an icon, a text message or a combination thereof visible on the selected at least one field mobile communications device.

8. The wireless video camera recording system of claim 1 wherein the director mobile communications device is further configured to transmit at least one operational instruction in the form of an oral instruction audibly perceptible by a user of the selected at least one field mobile communications device through the selected at least one field mobile communications device.

9. The wireless video camera recording system of claim 8 further comprising at least one earphone coupled with the selected at least one field mobile communications device, and wherein the oral instruction is audible through the at least one earphone.

10. The wireless video camera recording system of claim 1 wherein a user of the director mobile communications device can transfer director capabilities to a selected one of the at least one field mobile communications device, whereby the current director mobile communications device becomes one of the at least one field mobile communications devices and the selected one of the at least one field mobile communications device becomes the director mobile communications device.

11. The wireless video camera recording system of claim 1 wherein each of the at least one field mobile communications device records its video to the data store regardless of whether any portion of its video was indicated by the director mobile communications device as the active video feed at any time.

12. The wireless video camera recording system of claim 1, further comprising an edit decision list comprising a list of video feed selections by the director during a recording session.

13. The wireless video camera recording system of claim 12 wherein the wireless video camera recording system comprises at least a first field mobile communications device and a second field mobile communications device which are recording video simultaneously, and the director mobile communications device is configured to create an edit decision list of the recorded video from the at least first and second field mobile communications devices in real time.

14. The wireless video camera recording system of claim 12 wherein the edit decision list comprises data representative of (1) an active camera feed at a given time; and (2) at least one of a duration or an end time of the active camera feed.

15. The wireless video camera recording system of claim 12 wherein the director mobile communications device includes an interface having a first timeline corresponding to an active video feed and a second timeline corresponding to an active audio feed, and wherein a user of the director mobile communications device can select video from the first timeline from each of the at least one field mobile communications devices and audio from the second timeline from each of the at least one field mobile communications devices.

16. The wireless video camera recording system of claim 15 wherein the user of the director mobile communications device can at least one of compress, extend, cut, insert, or replace portions of the selected video and audio in the first and second timelines to edit the final video product.

17. The wireless video camera recording system of claim 1 wherein the data store records video feeds from the selected active feed from the at least one director mobile communications device and the at least one field mobile communications device.

18. The wireless video camera recording system of claim 1 wherein the data store records video from each of the at least one field mobile communications device.

19. The wireless video camera recording system of claim 1 wherein the data store is on at least one of the director mobile communications device, at least one field mobile communications device or a combination of the director mobile communications device and at least one of the at least one field mobile communications device.

20. The wireless video camera recording system of claim 1 wherein the data store is a network attached storage device for receiving video feeds from at least one of the director mobile communications device or the at least one field mobile communications device.

21. The wireless video camera recording system of claim 1 wherein the director mobile communications device comprises at least one of a smart phone, MP3 player device or tablet device.

22. The wireless video camera recording system of claim 1 wherein the at least one field mobile communications device comprises at least one of a smart phone, MP3 player device or tablet device.

23. The wireless video camera recording system of claim 1 wherein the communication link is at least one of a cellular network, a wireless network, 3G, 4G, WiMax, LTE or a Wi-Fi network.

* * * * *